US011767258B2

(12) United States Patent
Gross et al.

(10) Patent No.: US 11,767,258 B2
(45) Date of Patent: Sep. 26, 2023

(54) GLASS COMPOSITIONS AND METHODS FOR STRENGTHENING VIA STEAM TREATMENT

(71) Applicant: CORNING INCORPORATED, Corning, NY (US)

(72) Inventors: Timothy Michael Gross, Corning, NY (US); Adam Robert Sarafian, Painted Post, NY (US); Jingshi Wu, Painted Post, NY (US); Zheming Zheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 446 days.

(21) Appl. No.: 16/682,063

(22) Filed: Nov. 13, 2019

(65) Prior Publication Data

US 2020/0156996 A1 May 21, 2020

Related U.S. Application Data

(60) Provisional application No. 62/768,359, filed on Nov. 16, 2018.

(51) Int. Cl.
C03C 3/097 (2006.01)
C03C 21/00 (2006.01)

(52) U.S. Cl.
CPC ............ *C03C 21/007* (2013.01); *C03C 3/097* (2013.01)

(58) Field of Classification Search
CPC ...................................................... C03C 3/097
See application file for complete search history.

(56) References Cited

U.S. PATENT DOCUMENTS

| | | |
|---|---|---|
| 2,273,778 A | 2/1942 | Berthold |
| 2,377,062 A | 5/1945 | Frederick et al. |
| 3,275,470 A | 9/1966 | Charles |
| 3,395,998 A | 8/1968 | Olcott |
| 3,485,647 A | 12/1969 | Harrington |
| 3,498,802 A | 3/1970 | Stookey et al. |
| 3,498,803 A | 3/1970 | Stookey |
| 3,653,864 A | 4/1972 | Rothermel et al. |
| 3,756,798 A | 9/1973 | Ernsberger |
| 3,811,853 A | 5/1974 | Bartholomew et al. |
| 3,843,344 A | 10/1974 | Galey |
| 3,912,481 A | 10/1975 | Bartholomew |
| 3,915,720 A | 10/1975 | Tarcza |
| 3,948,629 A | 4/1976 | Bartholomew et al. |
| 4,042,405 A | 8/1977 | Krohn et al. |
| 4,053,679 A | 10/1977 | Rinehart |
| 4,098,596 A | 7/1978 | Wu |
| 4,099,978 A | 7/1978 | Bartholomew et al. |
| 4,102,693 A | 7/1978 | Owen et al. |
| 4,133,665 A | 1/1979 | Bartholomew et al. |
| 4,175,942 A | 11/1979 | Lipp |
| 4,201,561 A | 5/1980 | Pierson et al. |
| 4,214,886 A | 7/1980 | Shay et al. |
| 5,475,528 A | 12/1995 | LaBorde |
| 5,698,019 A | 12/1997 | Frank et al. |
| 6,200,137 B1 | 3/2001 | Höland et al. |
| 6,376,402 B1 | 4/2002 | Pannhorst et al. |
| 7,534,734 B2 | 5/2009 | Ellison |
| 7,666,511 B2 | 2/2010 | Ellison et al. |
| 7,833,919 B2 | 11/2010 | Danielson et al. |
| 7,846,857 B2 | 12/2010 | Höland et al. |
| 7,851,394 B2 | 12/2010 | Ellison |
| 7,891,212 B2 | 2/2011 | Isono |
| 7,937,967 B2 | 5/2011 | Minazawa |
| 8,075,999 B2 | 12/2011 | Barefoot et al. |
| 8,158,543 B2 | 2/2012 | Dejneka et al. |
| 8,187,987 B2 | 5/2012 | Amin et al. |
| 8,232,218 B2 | 7/2012 | Dejneka et al. |
| 8,586,492 B2 | 11/2013 | Barefoot et al. |
| 8,598,056 B2 | 12/2013 | Ellison et al. |
| 8,759,238 B2 | 6/2014 | Chapman et al. |
| 8,802,581 B2 | 8/2014 | Dejneka et al. |
| 8,854,623 B2 | 10/2014 | Fontaine et al. |
| 8,969,226 B2 | 3/2015 | Dejneka et al. |
| 9,156,724 B2 | 10/2015 | Gross |
| 9,162,919 B2 | 10/2015 | Ellison et al. |
| 9,321,677 B2 | 4/2016 | Chang et al. |
| 9,346,703 B2 | 5/2016 | Bookbinder et al. |
| 9,527,767 B2 | 12/2016 | Ellison et al. |
| 9,622,483 B2 | 4/2017 | Bookbinder et al. |

(Continued)

FOREIGN PATENT DOCUMENTS

| | | |
|---|---|---|
| BE | 382736 A | 9/1931 |
| CN | 104411648 A | 3/2015 |

(Continued)

OTHER PUBLICATIONS

ENSS, "Investigations on the Dependency of the Relative Susceptibility of Glass to Attack by Water on its Chemical Composition", Glastech Ber. vol. 5, No. 11, p. 509, 1927.
Fett et al. "Effect of water on the inert strength of silica glass: role of water penetration", J Am Ceram Soc 95(12) 2012. pp. 3847-3853.
Fett et al. "Estimation of ion exchange layers for soda-lime-silicate glass from curvature measurements" J Mater Sci 41, 2006. pp. 5006-5010.
Fett et al. "Stresses in ion-exchange layers of soda-soda-lime-silicate glass", Fatigue Fract Engng Mater Struct 28, 2005. pp. 507-514.
Fett et al., "Interpretation of effects at the static fatigue limit of soda-lime-silicate glass" Engineering Fracture Mechanics, vol. 72, 2774-2791 (2005.

(Continued)

*Primary Examiner* — Elizabeth A. Bolden
(74) *Attorney, Agent, or Firm* — Russell S. Magaziner

(57) ABSTRACT

Glass-based articles that include a compressive stress layer extending from a surface of the glass-based article to a depth of compression are formed by exposing glass-based substrates to water vapor containing environments. The methods of forming the glass-based articles may include elevated pressures and/or multiple exposures to water vapor containing environments.

26 Claims, 13 Drawing Sheets

(56) References Cited

U.S. PATENT DOCUMENTS

| | | |
|---|---|---|
| 9,682,885 B2 | 6/2017 | Gross |
| 9,783,453 B2 | 10/2017 | Gross |
| 9,802,857 B2 | 10/2017 | Bowden et al. |
| 9,815,733 B2 | 11/2017 | Dejneka et al. |
| 9,890,073 B2 | 2/2018 | Kase |
| 9,969,644 B2 | 5/2018 | Gross et al. |
| 9,975,803 B2 | 5/2018 | Gross |
| 10,017,412 B2 | 7/2018 | Bookbinder et al. |
| 10,611,675 B2 | 4/2020 | Beall et al. |
| 11,104,602 B2 | 8/2021 | Gross |
| 11,214,510 B2 | 1/2022 | Gross et al. |
| 2004/0107733 A1 | 6/2004 | Yashizawa |
| 2005/0223746 A1 | 10/2005 | Yoshizawa et al. |
| 2009/0018007 A1 | 1/2009 | Siebers et al. |
| 2009/0098998 A1 | 4/2009 | Minazawa |
| 2009/0129061 A1 | 5/2009 | Fechner et al. |
| 2009/0325776 A1 | 12/2009 | Murata |
| 2010/0035745 A1 | 2/2010 | Murata |
| 2010/0215993 A1 | 8/2010 | Yagi et al. |
| 2011/0014475 A1 | 1/2011 | Murata |
| 2011/0092353 A1 | 4/2011 | Amin et al. |
| 2011/0294648 A1 | 12/2011 | Chapman et al. |
| 2012/0108414 A1 | 5/2012 | Ruedinger et al. |
| 2012/0135226 A1 | 5/2012 | Bookbinder et al. |
| 2012/0277085 A1 | 11/2012 | Bookbinder et al. |
| 2013/0115422 A1 | 5/2013 | Murata |
| 2013/0122284 A1 | 5/2013 | Gross |
| 2013/0122313 A1 | 5/2013 | Gross |
| 2013/0136909 A1 | 5/2013 | Mauro et al. |
| 2013/0186139 A1 | 7/2013 | Tanii |
| 2013/0288001 A1 | 10/2013 | Murata et al. |
| 2013/0295353 A1 | 11/2013 | Drake et al. |
| 2013/0316162 A1 | 11/2013 | Murata et al. |
| 2013/0330599 A1 | 12/2013 | Kroll et al. |
| 2013/0343166 A1 | 12/2013 | Matsumoto et al. |
| 2014/0154661 A1 | 6/2014 | Bookbinder et al. |
| 2014/0170380 A1 | 6/2014 | Murata et al. |
| 2014/0335331 A1 | 11/2014 | Ellison et al. |
| 2015/0064474 A1 | 3/2015 | Dejneka et al. |
| 2015/0079398 A1 | 3/2015 | Amin et al. |
| 2015/0140336 A1 | 5/2015 | Sakagami et al. |
| 2015/0230476 A1 | 8/2015 | Bookbinder et al. |
| 2015/0259244 A1 | 9/2015 | Amin et al. |
| 2015/0299035 A1 | 10/2015 | Kuksenkov |
| 2015/0329413 A1 | 11/2015 | Beall et al. |
| 2016/0122239 A1* | 5/2016 | Amin ............ C03C 3/097 428/220 |
| 2016/0137549 A1 | 5/2016 | Meiss et al. |
| 2016/0145152 A1 | 5/2016 | Martin et al. |
| 2016/0225396 A1 | 8/2016 | Shimojima |
| 2017/0008797 A1 | 1/2017 | Wagner |
| 2017/0022093 A1 | 1/2017 | Demartino et al. |
| 2017/0217827 A1 | 8/2017 | Aitken et al. |
| 2017/0283304 A1 | 10/2017 | Yamazaki et al. |
| 2017/0297308 A1 | 10/2017 | Golyatin et al. |
| 2017/0361574 A1 | 12/2017 | Kiczenski et al. |
| 2018/0265398 A1 | 9/2018 | Yamazaki et al. |
| 2018/0282201 A1 | 10/2018 | Hancock, Jr. et al. |
| 2018/0317496 A1 | 11/2018 | Bookbinder et al. |
| 2019/0152838 A1 | 5/2019 | Gross et al. |
| 2019/0195510 A1 | 6/2019 | Weiss et al. |
| 2019/0367408 A1 | 12/2019 | Harris et al. |
| 2020/0156994 A1 | 5/2020 | Li et al. |
| 2020/0156996 A1 | 5/2020 | Gross et al. |
| 2020/0156997 A1 | 5/2020 | Gross et al. |
| 2020/0308047 A1 | 10/2020 | Glacki et al. |
| 2021/0214269 A1* | 7/2021 | Yuki ............... C03C 10/0009 |

FOREIGN PATENT DOCUMENTS

| | | |
|---|---|---|
| CN | 105765499 A | 7/2016 |
| CN | 108341595 A | 7/2018 |
| DE | 4026814 A1 | 2/1992 |
| DE | 102016109085 A1 | 11/2017 |
| DE | 202018102537 U1 | 5/2018 |
| EP | 0690030 A1 | 1/1996 |
| EP | 0885856 A2 | 12/1998 |
| EP | 1888474 A1 | 2/2008 |
| GB | 1454335 A | 11/1976 |
| JP | 06-092674 B2 | 11/1994 |
| JP | 08-290936 A | 11/1996 |
| JP | 2001226138 A | 8/2001 |
| JP | 2016-183091 A | 10/2016 |
| JP | 06474041 B2 | 2/2019 |
| SU | 1100252 A1 | 6/1984 |
| WO | 2007013538 A1 | 2/2007 |
| WO | 2009/055745 A1 | 4/2009 |
| WO | 2014/201318 A1 | 12/2014 |
| WO | 2016/094282 A1 | 6/2016 |
| WO | 2016/104454 A1 | 6/2016 |
| WO | 2018/136388 A1 | 7/2018 |
| WO | 2019055745 A1 | 3/2019 |
| WO | 2019/099814 A1 | 5/2019 |
| WO | 2020/102127 A2 | 5/2020 |
| WO | 2020/102147 A2 | 5/2020 |

OTHER PUBLICATIONS

Gehrke et al; "Fatigue Limit and Crack Arrest in Alkali-Containing Silicate Glasses"; Journal of Materials Science; 26 (1991) pp. 5445-5455.

Haider et al., "The Diffusion of 'Water' Into Some Simple Silicate and Aluminosilicate Glasses At Temperatures Near the Transformation Range", Glass Technology vol. 11 No 6, Dec. 1970.

Kuznetsova et al., "Effect of the Composition of Complex Silicate Glasses on Water and Gas Leaching", Fizika i khimiya Stekla, vol. 15, No. 2, pp. 245-251, 1989.

Lanford et al. "Hydration of soda-lime glass", Journal of Non-Crystalline Solids 33, 1979. pp. 249-266.

Leko, "Influence of Composition and Temperature on the Absorption Band Intensity for Water in Alkali Silicate Blasses", Glass Physics and Chemistry, vol. 23, No. 3, pp. 214-224, 1997.

Li and Tomozawa, "Mechanical strength increase of abraded silica glass by high pressure water vapor treatment", Journal of Non-Crystalline Solids 168 (1994) 287-292.

Liu et al. "Nanocrystal formation and photoluminescence in the Yb3+/Er3+ codoped phosphosilicate glasses", Journal of Non-Crystalline Solids, 2014, vol. 383, p. 141-145.

Sarkisov et al, "Effect of the liquation structure on the chemical stability of glasses of the $SiO_2$—CaO—$Al_2O_3$—$K_2O$—$P_2O_5$ System", Phsyics and Chemistry of Glass 14(3) 1988, pp. 445-451.

Scholze, "Gases and Water in Glass", Part Two; Institute for Glass and Ceramics, University of Berlin, Lectures on Glass and Technology Rensselaer Polytechnic Institute, Troy, N.Y, Mar. 30-Apr. 1, 1966, pp. 622-628.

Spierings, "The near Infared Absorption of Water in Glasses", Physics and Chemistry of Glasses, vol. 23, No. 4, pp. 129-134, Aug. 1982.

Steklo et al., "Molar Volumes and Refractive Indices of Water-Containing Aluminosilicate Glasses", Steklo, No. 2, p. 65, 1978.

Takata et al., "Effect of Water Content on Mechanical Properties of $Na_2O$—$SiO_2$ Glasses," Communications of the American Ceramic Society, 1982, C-156-C157.

Tsong et al., "Evidence for interdiffusion of hydronium and alkali ions in leached glasses" Applied Physics Letters, vol. 39, 669-670 (1981.

Wiederhorn et al. "Effect of water penetration on the strength and toughness of silica glass", J Am Ceram Soc 94(S1) 2011, pp. S196-S203.

Wiederhorn et al. "Volume expansion caused by water penetration into silica glass", J Am Ceram Soc 98(1) 2015, pp. 78-87.

Wiederhorn et al. "Water penetration—its effect on the strength and toughness of silica glass", Metallurgical and Materials Transactions A, 44A, Mar. 2013. pp. 1165-1174.

Yoko et al, "Hydration of silicate, phosphate and borate glasses in an autoclave", Riv. Staz. Sper. Vetro, vol. 14, No. 5, pp. 99-194, 1984.

(56) References Cited

OTHER PUBLICATIONS

Yoko et al., "Hydration of Silicate Glasses by Water Vapor at High Temperature", Glastech. Ber. vol. 56K, pt 1, pp. 350-655, 1983.
Invitation to Pay Additional Fees of the European International Searching Authority; PCT/US2019/060819; dated Apr. 8, 2020; 12 pgs.
Bartholomew; "Water in Glass"; Treatise on Materials Science and Technology; vol. 22, Glass III Eda. M. Tomozawa and RH Doremus. (Academic Press 1982) 75-127.

\* cited by examiner

GLASS COMPOSITIONS AND METHODS FOR STRENGTHENING VIA STEAM TREATMENT

CROSS-REFERENCE TO RELATED APPLICATIONS

This application claims the benefit of priority of U.S. Provisional Application Ser. No. 62/768,359 filed on Nov. 16, 2018, the content of which is relied upon and incorporated herein by reference in its entirety.

BACKGROUND

Field

This disclosure relates to glass-based articles strengthened by steam treatment, glass compositions utilized to form the glass-based articles, and methods of steam treatment to strengthen the glass-based articles.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the display covers and housings used in these portable electronic devices also get smaller and thinner, resulting in higher performance requirements for the materials used to form these components.

Accordingly, a need exists for materials that exhibit higher performance, such as resistance to damage, along with lower cost and ease of manufacture for use in portable electronic devices.

SUMMARY

In aspect (1), a glass-based article is provided. The glass-based article comprises: a compressive stress layer extending from a surface of the glass-based article to a depth of compression; and a thickness of less than or equal to 2 mm. The depth of compression is greater than 5 µm, the compressive stress layer comprises a compressive stress greater than or equal to 10 MPa, and the glass-based article is substantially free of $Li_2O$ and $Na_2O$.

In aspect (2), the glass-based article of aspect (1) is provided, further comprising a hydrogen-containing layer extending from the surface of the glass-based article to a depth of layer, wherein a hydrogen concentration of the hydrogen-containing layer decreases from a maximum hydrogen concentration to the depth of layer.

In aspect (3), the glass-based article of aspect (2) is provided, wherein the depth of layer is greater than 5 µm.

In aspect (4), the glass-based article of aspect (2) is provided, wherein the depth of layer is greater than or equal to 10 µm.

In aspect (5), the glass-based article of any of aspects (1) to (4) is provided, wherein the depth of compression is greater than or equal to 7 µm.

In aspect (6), the glass-based article of any of aspects (1) to (5) is provided, wherein the depth of compression is less than or equal to 200 µm.

In aspect (7), the glass-based article of any of aspects (1) to (6) is provided, wherein the compressive stress is greater than or equal to 150 MPa.

In aspect (8), the glass-based article of any of aspects (1) to (7) is provided, wherein the compressive stress is less than or equal to 500 MPa.

In aspect (9), the glass-based article of any of aspects (1) to (8) is provided, wherein the glass-based article is substantially free of $Cs_2O$ and $Rb_2O$.

In aspect (10), the glass-based article of any of aspects (1) to (9) is provided, wherein the center of the glass-based article comprises: greater than or equal to 47 mol % to less than or equal to 70 mol % $SiO_2$; greater than or equal to 1 mol % to less than or equal to 17 mol % $Al_2O_3$; greater than or equal to 3 mol % to less than or equal to 15 mol % $P_2O_5$; and greater than 0 mol % to less than or equal to 23 mol % $K_2O$.

In aspect (11), the glass-based article of aspect (10) is provided, wherein the center of the glass-based article comprises:
greater than or equal to 47 mol % to less than or equal to 70 mol % $SiO_2$;
greater than or equal to 5 mol % to less than or equal to 17 mol % $Al_2O_3$;
greater than or equal to 4 mol % to less than or equal to 15 mol % $P_2O_5$; and
greater than or equal to 4.5 mol % to less than or equal to 23 mol % $K_2O$.

In aspect (12), the glass-based article of aspect (10) is provided, wherein the center of the glass-based article comprises:
greater than or equal to 47 mol % to less than or equal to 70 mol % $SiO_2$;
greater than or equal to 2.5 mol % to less than or equal to 17 mol % $Al_2O_3$;
greater than or equal to 4 mol % to less than or equal to 15 mol % $P_2O_5$; and
greater than 10 mol % to less than or equal to 23 mol % $K_2O$.

In aspect (13), the glass-based article of any of aspects (1) to (12) is provided, wherein the center of the glass-based article comprises:
greater than or equal to 0 mol % to less than or equal to 6 mol % $B_2O_3$;
greater than or equal to 0 mol % to less than or equal to 2 mol % $Rb_2O$;
greater than or equal to 0 mol % to less than or equal to 6 mol % MgO;
greater than or equal to 0 mol % to less than or equal to 5 mol % ZnO; and
greater than or equal to 0 mol % to less than or equal to 0.5 mol % $SnO_2$.

In aspect (14), the glass-based article of any of aspects (1) to (13) is provided, wherein the thickness is less than or equal to 1 mm.

In aspect (15), a consumer electronic product is provided. The consumer electronic product comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display. At least a portion of at least one of the housing or the cover substrate comprises the glass-based article of any of aspects (1) to (14).

In aspect (16), a glass is provided. The glass comprises: greater than or equal to 47 mol % to less than or equal to 70 mol % $SiO_2$; greater than or equal to 5 mol % to less than or equal to 17 mol % $Al_2O_3$; greater than or equal to 4 mol % to less than or equal to 15 mol % $P_2O_5$; and greater than or equal to 4.5 mol % to less than or equal to 23 mol % $K_2O$.

In aspect (17), the glass of aspect (16) is provided, wherein the glass is substantially free of $Li_2O$, $Na_2O$, $Cs_2O$ and $Rb_2O$.

In aspect (18), the glass of aspect (16) or (17) is provided, wherein the glass comprises: greater than or equal to 0 mol % to less than or equal to 6 mol % $B_2O_3$; greater than or equal to 0 mol % to less than or equal to 2 mol % $Rb_2O$; greater than or equal to 0 mol % to less than or equal to 6 mol % MgO; greater than or equal to 0 mol % to less than or equal to 5 mol % ZnO; and greater than or equal to 0 mol % to less than or equal to 0.5 mol % $SnO_2$.

In aspect (19), a glass is provided. The glass comprises: greater than or equal to 47 mol % to less than or equal to 70 mol % $SiO_2$; greater than or equal to 2.5 mol % to less than or equal to 17 mol % $Al_2O_3$; greater than or equal to 4 mol % to less than or equal to 15 mol % $P_2O_5$; and greater than 10 mol % to less than or equal to 23 mol % $K_2O$.

In aspect (20), the glass of aspect (19) is provided, wherein the glass is substantially free of $Li_2O$, $Na_2O$, $Cs_2O$ and $Rb_2O$.

In aspect (21), the glass of aspect (19) or (20) is provided, wherein the glass comprises: greater than or equal to 0 mol % to less than or equal to 6 mol % $B_2O_3$; greater than or equal to 0 mol % to less than or equal to 2 mol % $Rb_2O$; greater than or equal to 0 mol % to less than or equal to 6 mol % MgO; greater than or equal to 0 mol % to less than or equal to 5 mol % ZnO; and greater than or equal to 0 mol % to less than or equal to 0.5 mol % $SnO_2$.

In aspect (22), a glass-based article is provided. The glass-based article comprises: a compressive stress layer extending from a surface of the glass-based article to a depth of compression; and a hydrogen-containing layer extending from the surface of the glass-based article to a depth of layer. The compressive stress layer comprises a compressive stress greater than or equal to 10 MPa, a hydrogen concentration of the hydrogen-containing layer decreases from a maximum hydrogen concentration to the depth of layer, and the depth of layer is greater than 5 μm.

In aspect (23), the glass-based article of aspect (22) is provided, wherein the depth of compression is greater than 5 μm.

In aspect (24), the glass-based article of aspect (22) or (23) is provided, wherein the depth of layer is greater than or equal to 10 μm.

In aspect (25), the glass-based article of any of aspects (22) to (24) is provided, wherein the depth of compression is greater than or equal to 7 μm.

In aspect (26), the glass-based article of any of aspects (22) to (25) is provided, wherein the depth of compression is less than or equal to 200 μm.

In aspect (27), the glass-based article of any of aspects (22) to (26) is provided, wherein the compressive stress is greater than or equal to 150 MPa.

In aspect (28), the glass-based article of any of aspects (22) to (27) is provided, wherein the compressive stress is less than or equal to 500 MPa.

In aspect (29), the glass-based article of any of aspects (22) to (28) is provided, wherein the center of the glass-based article comprises: greater than or equal to 47 mol % to less than or equal to 70 mol % $SiO_2$; greater than or equal to 1 mol % to less than or equal to 17 mol % $Al_2O_3$; greater than or equal to 3 mol % to less than or equal to 15 mol % $P_2O_5$; and greater than 0 mol % to less than or equal to 23 mol % $K_2O$.

In aspect (30), the glass-based article of aspect (29) is provided, wherein the center of the glass-based article comprises: greater than or equal to 47 mol % to less than or equal to 70 mol % $SiO_2$; greater than or equal to 5 mol % to less than or equal to 17 mol % $Al_2O_3$; greater than or equal to 4 mol % to less than or equal to 15 mol % $P_2O_5$; and greater than or equal to 4.5 mol % to less than or equal to 23 mol % $K_2O$.

In aspect (31), the glass-based article of aspect (29) is provided, wherein the center of the glass-based article comprises: greater than or equal to 47 mol % to less than or equal to 70 mol % $SiO_2$; greater than or equal to 2.5 mol % to less than or equal to 17 mol % $Al_2O_3$; greater than or equal to 4 mol % to less than or equal to 15 mol % $P_2O_5$; and greater than 10 mol % to less than or equal to 23 mol % $K_2O$.

In aspect (32), the glass-based article of any of aspects (22) to (31) is provided, wherein the center of the glass-based article comprises: greater than or equal to 0 mol % to less than or equal to 6 mol % $B_2O_3$; greater than or equal to 0 mol % to less than or equal to 5 mol % $Li_2O$; greater than or equal to 0 mol % to less than or equal to 19 mol % $Na_2O$; greater than or equal to 0 mol % to less than or equal to 2 mol % $Rb_2O$; greater than or equal to 0 mol % to less than or equal to 6 mol % MgO; greater than or equal to 0 mol % to less than or equal to 5 mol % ZnO; and greater than or equal to 0 mol % to less than or equal to 0.5 mol % $SnO_2$.

In aspect (33), a consumer electronic product is provided. The consumer electronic product comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display. At least a portion of at least one of the housing or the cover substrate comprises the glass-based article of any of aspects (22) to (32).

In aspect (34), a method is provided. The method comprises exposing a glass-based substrate to an environment with a pressure greater than 0.1 MPa and a water partial pressure of greater than or equal to 0.05 MPa to form a glass-based article with a compressive stress layer extending from a surface of the glass-based article to a depth of compression. The depth of compression is greater than 5 μm, and the compressive stress layer comprises a compressive stress greater than or equal to 10 MPa.

In aspect (35), the method of aspect (34) is provided, wherein the relative humidity is 100%.

In aspect (36), the method of aspect (34) or (35) is provided, wherein the pressure is greater than or equal to 1 MPa.

In aspect (37), the method of any of aspects (34) to (36) is provided, wherein the exposing takes place at a temperature greater than or equal to 100° C.

In aspect (38), the method of any of aspects (34) to (37) is provided, wherein the glass-based article comprises a hydrogen-containing layer extending from the surface of the glass-based article to a depth of layer, wherein a hydrogen concentration of the hydrogen-containing layer decreases from a maximum hydrogen concentration to the depth of layer.

In aspect (39), the method of aspect (38) is provided, wherein the depth of layer is greater than 5 μm.

In aspect (40), the method of any of aspects (34) to (39) is provided, wherein the glass-based substrate is substantially free of $Li_2O$ and $Na_2O$.

In aspect (41), the method of any of aspects (34) to (40) is provided, wherein the glass-based substrate comprises: greater than or equal to 47 mol % to less than or equal to 70 mol % $SiO_2$; greater than or equal to 1 mol % to less than or equal to 17 mol % $Al_2O_3$; greater than or equal to 3 mol % to less than or equal to 15 mol % $P_2O_5$; and greater than 0 mol % to less than or equal to 23 mol % $K_2O$.

In aspect (42), the method of any of aspects (34) to (41) is provided, wherein the glass-based substrate is not subjected to an ion-exchange treatment with an alkali ion source.

In aspect (43), the method of any of aspects (34) to (42) is provided, wherein the glass-based substrate has a thickness less than or equal to 2 mm.

In aspect (44), a method is provided. The method comprises: exposing a glass-based substrate to a first environment with a first water partial pressure and first temperature for a first time period to form a first glass-based article with a first compressive stress layer extending from a surface of the first glass-based article to a first depth of compression; and exposing the first glass-based article to a second environment with a second water partial pressure and second temperature for a second time period to form a second glass-based article with a second compressive stress layer extending from a surface of the second glass-based article to a second depth of compression. The first water partial pressure and the second water partial pressure are greater than or equal to 0.05 MPa; and the first compressive stress layer comprises a first maximum compressive stress, the second compressive stress layer comprises a second maximum compressive stress, and the first maximum compressive stress is less than the second maximum compressive stress.

In aspect (45), the method of aspect (44) is provided, wherein the second depth of compression is greater than 5 µm.

In aspect (46), the method of aspect (44) or (45) is provided, wherein the second maximum compressive stress is greater than or equal to 50 MPa.

In aspect (47), the method of any of aspects (44) to (46) is provided, wherein the first temperature is greater than or equal to the second temperature.

In aspect (48), the method of any of aspects (44) to (47) is provided, wherein the first time period is less than the second time period.

In aspect (49), the method of any of aspects (44) to (48) is provided, wherein at least one of the first environment and the second environment has a pressure greater than 0.1 MPa.

In aspect (50), the method of any of aspects (44) to (49) is provided, wherein at least one of the first environment and the second environment has a relative humidity of 100%.

In aspect (51), the method of any of aspects (44) to (50) is provided, wherein the glass-based substrate, the first glass-based article, and the second glass-based article are not subjected to an ion-exchange treatment with an alkali ion source.

In aspect (52), the method of any of aspects (44) to (51) is provided, wherein the glass-based substrate comprises: greater than or equal to 47 mol % to less than or equal to 70 mol % $SiO_2$; greater than or equal to 1 mol % to less than or equal to 17 mol % $Al_2O_3$; greater than or equal to 3 mol % to less than or equal to 15 mol % $P_2O_5$; and greater than 0 mol % to less than or equal to 23 mol % $K_2O$.

In aspect (53), the method of any of aspects (44) to (52) is provided, wherein the glass-based substrate is substantially free of $Li_2O$ and $Na_2O$.

In aspect (54), the method of any of aspects (44) to (53) is provided, further comprising exposing the second glass-based article to a third environment with a third water partial pressure and third temperature for a third time period to form a third glass-based article with a third compressive stress layer extending from a surface of the third glass-based article to a third depth of compression, wherein the third water partial pressure is greater than or equal to 0.05 MPa.

These and other aspects, advantages, and salient features will become apparent from the following detailed description, the accompanying drawings, and the appended claims.

DETAILED DESCRIPTION

Figure 1:
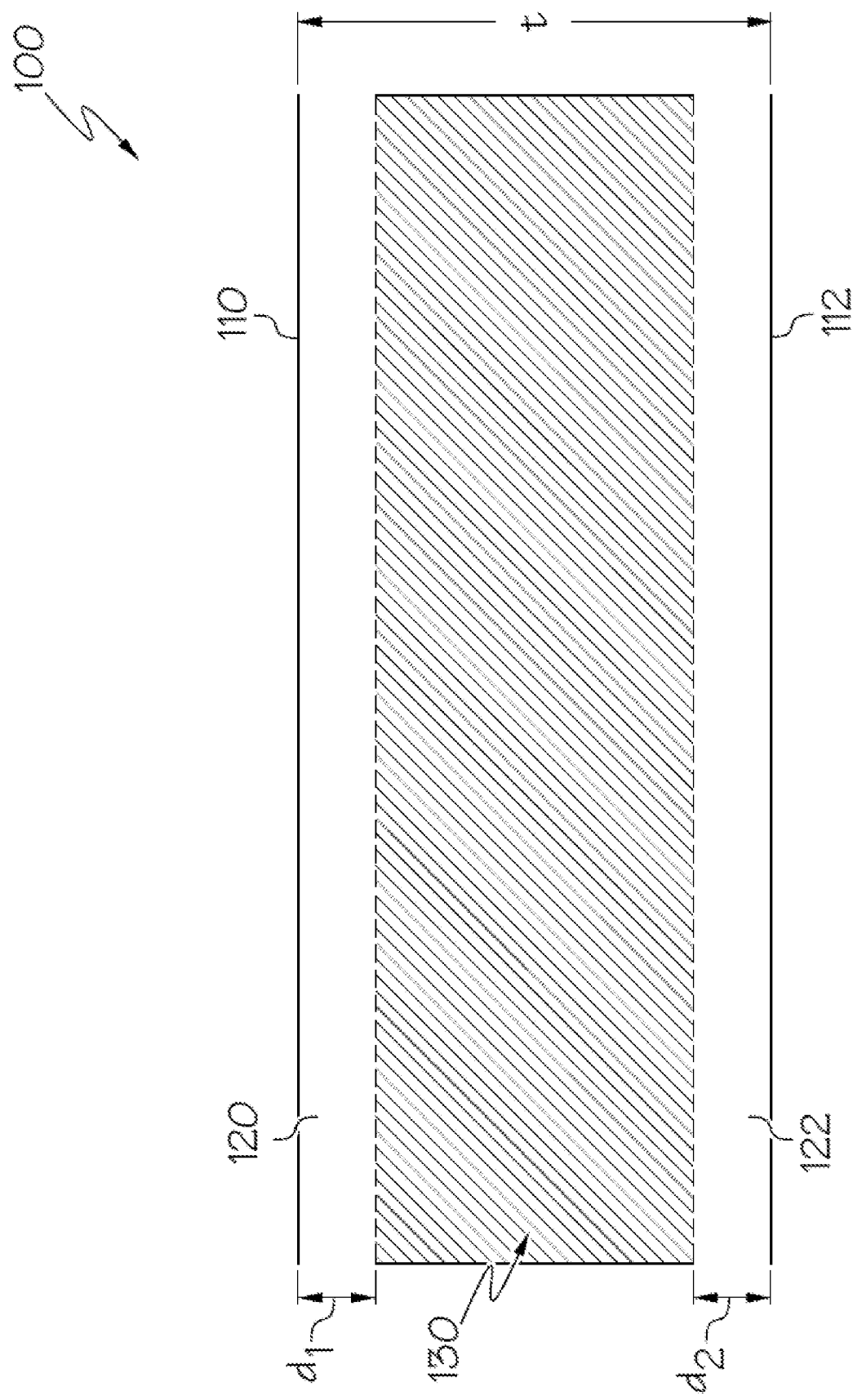
FIG. 1 is a representation of a cross-section of a glass-based article according to an embodiment.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Unless otherwise specified, a range of values, when recited, includes both the upper and lower limits of the range as well as any sub-ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass-based" is used in its broadest sense to include any objects made wholly or partly of glass, including glass ceramics (which include a crystalline phase and a residual amorphous glass phase). Unless otherwise specified, all compositions of the glasses described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass, but may be present in very small amounts as a contaminant, such as in amounts of less than about 0.1 mol %. As utilized herein, when the term "about" is used to modify a value, the exact value is also disclosed. For example, the term "greater than about 10 mol %" also discloses "greater than or equal to 10 mol %."

Reference will now be made in detail to various embodiments, examples of which are illustrated in the accompanying examples and drawings.

The glass-based articles disclosed herein are formed by steam treating a glass-based substrate to produce a compressive stress layer exending from surface of the article to a depth of compression (DOC). The compressive stress layer includes a stress that decreases from a maximum stress to the depth of compression. In some embodiments, the maximum compressive stress may be located at the surface of the glass-based article. As used herein, depth of compression (DOC) means the depth at which the stress in the glass-based article changes from compressive to tensile. Thus, the glass-based article also contains a tensile stress region having a maximum central tension (CT), such that the forces within the glass-based article are balanced.

The glass-based articles further include a hydrogen-containing layer extending from a surface of the article to a depth of layer. The hydrogen-containing layer includes a hydrogen concentration that decreases from a maximum hydrogen concentration of the glass-based article to the depth of layer. In some embodiments, the maximum hydrogen concentration may be located at the surface of the glass-based article.

The glass-based articles may be formed by exposing glass-based substrates to environments containing water vapor, thereby allowing hydrogen species to penetrate the glass-based substrates and form the glass-based articles having a hydrogen-containing layer and/or a compressive stress layer. As utilized herein, hydrogen species includes molecular water, hydroxyl, hydrogen ions, and hydronium. The composition of the glass-based substrates may be selected to promote the interdiffusion of hydrogen species into the glass. As utilized herein, the term "glass-based substrate" refers to the precursor prior to exposure to a water vapor containing environment for the formation of a glass-based article that includes hydrogen-containing layers and/or compressive stress layers. Similarly, the term "glass-based article" refers to the post exposure article that includes a hydrogen-containing layer and/or a compressive stress layer.

The glass-based articles disclosed herein may exhibit a compressive stress layer without undergoing conventional ion exchange, thermal tempering, or lamination treatments. Ion exchange processes produces significant waste in the form of expended molten salt baths that require costly disposal, and also are applicable to only some glass compositions. Thermal tempering requires thich glass specimens as a practical matter, as thermal tempering of thin sheets utilizes small air gap quenching processes which results in sheet scratching damage that reduces performance and yield. Additionally, it is difficult to achieve uniform compressive stress across surface and edge regions when thermal tempering thin glass sheets. Laminate processes result in exposed tensile stress regions when large sheets are cut to usable sizes, which is undesirable.

The water vapor treatment utilized to form the glass-based articles allows for reduced waste and lower cost when compared to ion exchange treatments as molten salts are not utilized. The water vapor treatment is also capable of strengthening thin (<2 mm) low-cost glass that would not be suitable for thermal tempering at such thicknesses. Additionally, the water vapor treatment may be performed at the part level, avoiding the undesirable exposed tensile stress regions associated with laminate processes. In sum, the glass-based articles disclosed herein may be produced with a low thickness and at a low cost while exhibiting a high compressive stress and deep depth of compression.

A representative cross-section of a glass-based article 100 according to some embodiments is depicted in FIG. 1. The glass-based article 100 has a thickness t that extends between a first surface 110 and a second surface 112. A first compressive stress layer 120 extends from the first surface 110 to a first depth of compression, where the first depth of compression has a depth $d_1$ measured from the first surface 110 into the glass-based article 100. A second compressive stress layer 122 extends from the second surface 112 to a second depth of compression, where the second depth of compression has a depth $d_2$ measured from the second surface 112 into the glass-based article 100. A tensile stress region 130 is present between the first depth of compression and the second depth of compression. In embodiments, the first depth of compression $d_1$ may be substantially equivalent or equivalent to the second depth of compression $d_2$.

In some embodiments, the compressive stress layer of the glass-based article may include a compressive stress of at greater than or equal to 10 MPa, such as greater than or equal to 20 MPa, greater than or equal to 30 MPa, greater than or equal to 40 MPa, greater than or equal to 50 MPa, greater than or equal to 60 MPa, greater than or equal to 70 MPa, greater than or equal to 80 MPa, greater than or equal to 90 MPa, greater than or equal to 100 MPa, greater than or equal to 110 MPa, greater than or equal to 120 MPa, greater than or equal to 130 MPa, greater than or equal to 140 MPa, greater than or equal to 145 MPa, greater than or equal to 150 MPa, greater than or equal to 160 MPa, greater than or equal to 170 MPa, greater than or equal to 180 MPa, greater than or equal to 190 MPa, greater than or equal to 200 MPa, greater than or equal to 210 MPa, greater than or equal to 220 MPa, greater than or equal to 230 MPa, greater than or equal to 240 MPa, greater than or equal to 250 MPa, greater than or equal to 260 MPa, greater than or equal to 270 MPa, greater than or equal to 280 MPa, greater than or equal to 290 MPa, greater than or equal to 300 MPa, greater than or equal to 310 MPa, greater than or equal to 320 MPa, greater than or equal to 330 MPa, greater than or equal to 340 MPa, greater than or equal to 350 MPa, greater than or equal to 360 MPa, greater than or equal to 370 MPa, greater than or equal to 380 MPa, greater than or equal to 390 MPa, greater than or equal to 400 MPa, greater than or equal to 410 MPa, greater than or equal to 420 MPa, greater than or equal to 430 MPa, greater than or equal to 440 MPa, greater than or equal to 450 MPa, or more. In some embodiments, the compressive stress layer may include a compressive stress of from greater than or equal to 10 MPa to less than or equal to 500 MPa, such as from greater than or equal to 20 MPa to less than or equal to 490 MPa, from greater than or equal to 20 MPa to less than or equal to 480 MPa, from greater than or equal to 30 MPa to less than or equal to 470 MPa, from greater than or equal to 40 MPa to less than or equal to 460 MPa, from greater than or equal to 50 MPa to less than or equal to 450 MPa, from greater than or equal to 60 MPa to less than or equal to 440 MPa, from greater than or equal to 70 MPa to less than or equal to 430 MPa, from greater than or equal to 80 MPa to less than or equal to 420 MPa, from greater than or equal to 90 MPa to less than or equal to 410 MPa, from greater than or equal to 100 MPa to less than or equal to 400 MPa, from greater than or equal to 110 MPa to less than or equal to 390 MPa, from greater than or equal to 120 MPa to less than or equal to 380 MPa, from greater than or equal to 130 MPa to less than or equal to 370 MPa, from greater than or equal to 140 MPa to less than or equal to 360 MPa, from greater than or equal to 150 MPa to less than or equal to 350 MPa, from greater than or equal to 160 MPa to less than or equal to 340 MPa, from greater than or equal to 170 MPa to less than or equal to 330 MPa, from greater than or equal to 180 MPa to less than or equal to 320 MPa, from greater than or equal to 190 MPa to less than or equal to 310 MPa, from greater than or equal to 200 MPa to less than or equal to 300 MPa, from greater than or equal to 210 MPa to less than or equal to 290 MPa, from greater than or equal to 220 MPa to less than or equal to 280 MPa, from greater than or equal to 230 MPa to less than or equal to 270 MPa, from greater than or equal to 240 MPa to less than or equal to 260 MPa, 250 MPa, or any sub-ranges formed from any of these endpoints.

In some embodiments, the DOC of the compressive stress layer may be greater than or equal to 5 μm, such as greater than or equal to 7 μm, greater than or equal to 10 μm, greater than or equal to 15 μm, greater than or equal to 20 μm, greater than or equal to 25 μm, greater than or equal to 30 μm, greater than or equal to 35 μm, greater than or equal to 40 μm, greater than or equal to 45 μm, greater than or equal to 50 μm, greater than or equal to 55 μm, greater than or equal to 60 μm, greater than or equal to 65 μm, greater than or equal to 70 μm, greater than or equal to 75 μm, greater than or equal to 80 μm, greater than or equal to 85 μm, greater than or equal to 90 μm, greater than or equal to 95 μm, greater than or equal to 100 μm, greater than or equal to 105 μm, greater than or equal to 110 μm, greater than or equal to 115 μm, greater than or equal to 120 μm, greater than or equal to 125 μm, greater than or equal to 130 μm, greater than or equal to 135 μm, greater than or equal to 140 μm, greater than or equal to 145 μm, greater than or equal to 150 μm, greater than or equal to 155 μm, greater than or equal to 160 μm, greater than or equal to 165 μm, greater than or equal to 170 μm, greater than or equal to 175 μm, greater than or equal to 180 μm, greater than or equal to 185 μm, greater than or equal to 190 μm, greater than or equal to 195 μm, or more. In some embodiments, the DOC of the compressive stress layer may be from greater than or equal to 5 μm to less than or equal to 200 μm, such as from greater than or equal to 7 μm to less than or equal to 195 μm, from greater than or equal to 10 μm to less than or equal to 190 μm, from greater than or equal to 15 μm to less than or equal to 185 μm, from greater than or equal to 20 μm to less than or equal to 180 μm, from greater than or equal to 25 μm to less than or equal to 175 μm, from greater than or equal to 30 μm to less than or equal to 170 μm, from greater than or equal to 35 μm to less than or equal to 165 μm, from greater than or equal to 40 μm to less than or equal to 160 μm, from greater than or equal to 45 μm to less than or equal to 155 μm, from greater than or equal to 50 μm to less than or equal to 150 μm, from greater than or equal to 55 μm to less than or equal to 145 nm, from greater than or equal to 60 μm to less than or equal to 140 μm, from greater than or equal to 65 μm to less than or equal to 135 μm, from greater than or equal to 70 μm to less than or equal to 130 μm, from greater than or equal to 75 μm to less than or equal to 125 μm, from greater than or equal to 80 μm to less than or equal to 120 μm, from greater than or equal to 85 μm to less than or equal to 115 μm, from greater than or equal to 90 μm to less than or equal to 110 μm, 100 μm, or any sub-ranges that may be formed from any of these endpoints.

In some embodiments, the glass-based articles may have a DOC greater than or equal to 0.05t, wherein t is the thickness of the glass-based article, such as greater than or equal to 0.06t, greater than or equal to 0.07t, greater than or equal to 0.08t, greater than or equal to 0.09t, greater than or equal to 0.10t, greater than or equal to 0.11 t, greater than or equal to 0.12t, greater than or equal to 0.13t, greater than or equal to 0.14t, greater than or equal to 0.15t, greater than or equal to 0.16t, greater than or equal to 0.17t, greater than or equal to 0.18t, greater than or equal to 0.19t, or more. In some embodiments, the glass-based articles may have a DOC from greater than or equal to 0.05t to less than or equal to 0.20t, such as from greater than or equal to 0.06t to less than or equal to 0.19t, from greater than or equal to 0.07t to less than or equal to 0.18t, from greater than or equal to 0.08t to less than or equal to 0.17t, from greater than or equal to 0.09t to less than or equal to 0.16t, from greater than or equal to 0.10t to less than or equal to 0.15t, from greater than or equal to 0.11t to less than or equal to 0.14t, from greater than or equal to 0.12t to less than or equal to 0.13t, or any sub-ranges formed from any of these endpoints.

In some embodiments, the maximum central tension (CT) of the glass-based article may be greater than or equal to 10 MPa, such as greater than or equal to 11 MPa, greater than or equal to 12 MPa, greater than or equal to 13 MPa, greater than or equal to 14 MPa, greater than or equal to 15 MPa, greater than or equal to 16 MPa, greater than or equal to 17 MPa, greater than or equal to 18 MPa, greater than or equal to 19 MPa, greater than or equal to 20 MPa, greater than or equal to 22 MPa, greater than or equal to 24 MPa, greater than or equal to 26 MPa, greater than or equal to 28 MPa, greater than or equal to 30 MPa, greater than or equal to 32 MPa, or more. In some embodiments, the CT of the glass-based article may be from greater than or equal to 10 MPa to less than or equal to 35 MPa, such as from greater than or equal to 11 MPa to less than or equal to 34 MPa, from greater than or equal to 12 MPa to less than or equal to 33 MPa, from greater than or equal to 13 MPa to less than or equal to 32 MPa, from greater than or equal to 14 MPa to less than or equal to 32 MPa, from greater than or equal to 15 MPa to less than or equal to 31 MPa, from greater than or equal to 16 MPa to less than or equal to 30 MPa, from greater than or equal to 17 MPa to less than or equal to 28 MPa, from greater than or equal to 18 MPa to less than or equal to 26 MPa, from greater than or equal to 19 MPa to less than or equal to 24 MPa, from greater than or equal to 20 MPa to less than or equal to 22 MPa, or any sub-ranges formed from any of these endpoints.

Compressive stress (including surface CS) is measured by surface stress meter using commercially available instruments such as the FSM-6000 (FSM), manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. DOC is measured by FSM. The maximum central tension (CT) values are measured using a scattered light polariscope (SCALP) technique known in the art.

The hydrogen-containing layer of the glass-based articles may have a depth of layer (DOL) greater than 5 µm. In some embodiments, the depth of layer may be greater than or equal to 10 µm, such as greater than or equal to 15 µm, greater than or equal to 20 µm, greater than or equal to 25 µm, greater than or equal to 30 µm, greater than or equal to 35 µm, greater than or equal to 40 µm, greater than or equal to 45 µm, greater than or equal to 50 µm, greater than or equal to 55 µm, greater than or equal to 60 µm, greater than or equal to 65 µm, greater than or equal to 70 µm, greater than or equal to 75 µm, greater than or equal to 80 µm, greater than or equal to 85 µm, greater than or equal to 90 µm, greater than or equal to 95 µm, greater than or equal to 100 µm, greater than or equal to 105 µm, greater than or equal to 110 µm, greater than or equal to 115 µm, greater than or equal to 120 µm, greater than or equal to 125 µm, greater than or equal to 130 µm, greater than or equal to 135 µm, greater than or equal to 140 µm, greater than or equal to 145 µm, greater than or equal to 150 µm, greater than or equal to 155 µm, greater than or equal to 160 µm, greater than or equal to 165 µm, greater than or equal to 170 µm, greater than or equal to 175 µm, greater than or equal to 180 µm, greater than or equal to 185 µm, greater than or equal to 190 µm, greater than or equal to 195 µm, greater than or equal to 200 µm, or more. In some embodiments, the depth of layer may be from greater than 5 nm to less than or equal to 205 µm, such as from greater than or equal to 10 µm to less than or equal to 200 µm, from greater than or equal to 15 µm to less than or equal to 200 µm, from greater than or equal to 20 µm to less than or equal to 195 µm, from greater than or equal to 25 µm to less than or equal to 190 µm, from greater than or equal to 30 µm to less than or equal to 185 µm, from greater than or equal to 35 µm to less than or equal to 180 µm, from greater than or equal to 40 µm to less than or equal to 175 µm, from greater than or equal to 45 µm to less than or equal to 170 µm, from greater than or equal to 50 µm to less than or equal to 165 µm, from greater than or equal to 55 µm to less than or equal to 160 µm, from greater than or equal to 60 µm to less than or equal to 155 µm, from greater than or equal to 65 µm to less than or equal to 150 µm, from greater than or equal to 70 µm to less than or equal to 145 µm, from greater than or equal to 75 µm to less than or equal to 140 µm, from greater than or equal to 80 µm to less than or equal to 135 µm, from greater than or equal to 85 µm to less than or equal to 130 µm, from greater than or equal to 90 µm to less than or equal to 125 µm, from greater than or equal to 95 µm to less than or equal to 120 µm, from greater than or equal to 100 µm to less than or equal to 115 µm, from greater than or equal to 105 µm to less than or equal to 110 µm, or any sub-ranges formed by any of these endpoints. In general, the depth of layer exhibited by the glass-based articles is greater than the depth of layer that may be produced by exposure to the ambient environment.

The hydrogen-containing layer of the glass-based articles may have a depth of layer (DOL) greater than 0.005t, wherein t is the thickness of the glass-based article. In some embodiments, the depth of layer may be greater than or equal to 0.010t, such as greater than or equal to 0.015t, greater than or equal to 0.020t, greater than or equal to 0.025t, greater than or equal to 0.030t, greater than or equal to 0.035t, greater than or equal to 0.040t, greater than or equal to 0.045t, greater than or equal to 0.050t, greater than or equal to 0.055t, greater than or equal to 0.060t, greater than or equal to 0.065t, greater than or equal to 0.070t, greater than or equal to 0.075t, greater than or equal to 0.080t, greater than or equal to 0.085t, greater than or equal to 0.090t, greater than or equal to 0.095t, greater than or equal to 0.10t, greater than or equal to 0.15t, greater than or equal to 0.20t, or more. In some embodiments, the DOL may be from greater than 0.005t to less than or equal to 0.205t, such as from greater than or equal to 0.010t to less than or equal to 0.200t, from greater than or equal to 0.015t to less than or equal to 0.195t, from greater than or equal to 0.020t to less than or equal to 0.190t, from greater than or equal to 0.025t to less than or equal to 0.185t, from greater than or equal to 0.030t to less than or equal to 0.180t, from greater than or equal to 0.035t to less than or equal to 0.175t, from greater than or equal to 0.040t to less than or equal to 0.170t, from greater than or equal to 0.045t to less than or equal to 0.165t, from greater than or equal to 0.050t to less than or equal to 0.160t, from greater than or equal to 0.055t to less than or equal to 0.155t, from greater than or equal to 0.060t to less than or equal to 0.150t, from greater than or equal to 0.065t to less than or equal to 0.145t, from greater than or equal to 0.070t to less than or equal to 0.140t, from greater than or equal to 0.075t to less than or equal to 0.135t, from greater than or equal to 0.080t to less than or equal to 0.130t, from greater than or equal to 0.085t to less than or equal to 0.125t, from greater than or equal to 0.090t to less than or equal to 0.120t, from greater than or equal to 0.095t to less than or equal to 0.115t, from greater than or equal to 0.100t to less than or equal to 0.110t, or any sub-ranges formed by any of these endpoints.

The depth of layer and hydrogen concentration are measured by a secondary ion mass spectrometry (SIMS) technique that is known in the art. The SIMS technique is capable of measuring the hydrogen concentration at a given depth, but is not capable of distinguishing the hydrogen species present in the glass-based article. For this reason, all hydrogen species contribute to the SIMS measured hydrogen concentration. As utilized herein, the depth of layer (DOL) refers to the first depth below the surface of the glass-based article where the hydrogen concentration is equal to the hydrogen concentration at the center of the glass-based article. This definition accounts for the hydrogen concentration of the glass-based substrate prior to treatment, such that the depth of layer refers to the depth of the hydrogen added by the treatment process. As a practical matter, the hydrogen concentration at the center of the glass-based article may be approximated by the hydrogen concentration at the depth from the surface of the glass-based article where the hydrogen concentration becomes substantially constant, as the hydrogen concentration is not expected to change between such a depth and the center of the glass-based article. This approximation allows for the determination of the DOL without measuring the hydrogen concentration throughout the entire depth of the glass-based article.

Without wishing to be bound by any particular theory, the hydrogen-containing layer of the glass-based articles may be the result of an interdiffusion of hydrogen species for ions contained in the compositions of the glass-based substrate. Hydrogen-containing species, such as $H_3O^+$, $H_2O$, and/or $H^+$, may diffuse into the glass-based substrate, and replace alkali ions and/or phosphorous contained in the glass-based substrate to form the glass-based article. Additionally, phosphorous appears to play a significant role in the formation of a compressive stress layer when the glass-based substrates are exposed to a water vapor containing environment, and may have a particularly pronounced effect when the glass-based substrate contains both phosphorous and alkali metal oxides. Glass-based substrates containing potassium exhibit enhanced strengthening when exposed to water vapor containing environments in contrast to glass-based substrates containing sodium, indicating that lower cationic field strength allows enhanced strengthening through such treatments. Glass-based substrates containing lower cationic field strength alkali ions may have a lower oxygen packing density, and this may allow greater ease of hydrogen species, such as water, diffusion into the glass-based substrates. The incorporation of lower cationic field strength alklai ions may also assist in the extraction of phosphorous from the glass-based substrates when exposed to water containing environments, consistent with the depletion of phosphorous in the hydrogen containing layers observed experimentally. One potential mechanism would at least partially explain such a behavior, is that $Q_0(PO_4^{3-})$ units are less strongly bound to the glass network when lower cationic field strength alkali metals are employed. $Q_0(PO_4^{3-})$ units contain four non-bridging oxygens, such that the unit consists of one doubly bonded oxygen atom and three oxygen anions that form ionic bonds with modifier ions.

Figure 2A:
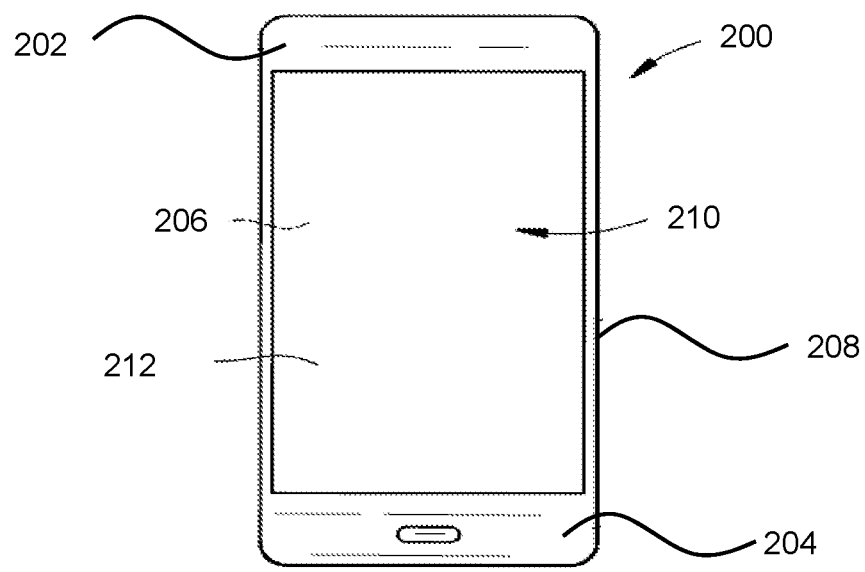
FIG. 2A is a plan view of an exemplary electronic device incorporating any of the glass-based articles disclosed herein.
Figure 2B:
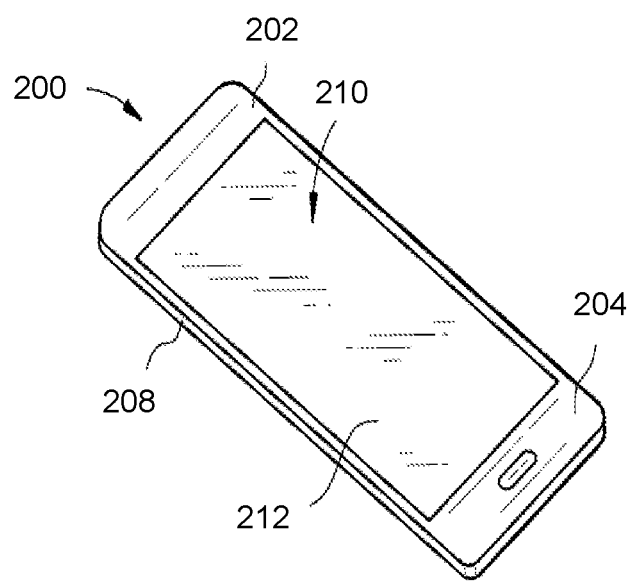
FIG. 2B is a perspective view of the exemplary electronic device of FIG. 2A.

The glass-based articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of at least one of the cover substrate 212 and the housing 202 may include any of the glass-based articles disclosed herein.

The glass-based articles may be formed from glass-based substrates having any appropriate composition. The composition of the glass-based substrate may be specifically selected to promote the diffusion of hydrogen-containing species, such that a glass-based article including a hydrogen-containing layer and a compressive stress layer may be formed efficiently. In some embodiments, the glass-based substrates may have a composition that includes $SiO_2$, $Al_2O_3$, and $P_2O_5$. In some embodiments, the glass-based substrates may additionally include an alkali metal oxide, such as at least one of $Li_2O$, $Na_2O$, $K_2O$, $Rb_2O$, and $Cs_2O$. In some embodiments, the glass-based substrates may be substantially free, or free, of at least one of lithium and sodium. In some embodiments, the glass-based substrates may be substantially free, or free, of lithium and sodium. In some embodiments, the hydrogen species does not diffuse to the center of the glass-based article. Stated differently, the center of the glass-based article is the area least affected by the water vapor treatment. For this reason, the center of the glass-based article may have a composition that is substantially the same, or the same, as the composition of the glass-based substrate prior to treatment in the water containing environment.

The glass-based substrate may include any appropriate amount of $SiO_2$. $SiO_2$ is the largest constituent and, as such, $SiO_2$ is the primary constituent of the glass network formed from the glass composition. If the concentration of $SiO_2$ in the glass composition is too high, the formability of the glass composition may be diminished as higher concentrations of $SiO_2$ increase the difficulty of melting the glass, which, in turn, adversely impacts the formability of the glass. In some embodiments, the glass-based substrate may include $SiO_2$ in an amount from greater than or equal to 47 mol % to less than or equal to 70 mol %, such as from greater than or equal to 48 mol % to less than or equal to 69 mol %, from greater than or equal to 49 mol % to less than or equal to 68 mol %, from greater than or equal to 50 mol % to less than or equal to 67 mol %, from greater than or equal to 51 mol % to less than or equal to 66 mol %, from greater than or equal to 52 mol % to less than or equal to 65 mol %, from greater than or equal to 53 mol % to less than or equal to 64 mol %, from greater than or equal to 54 mol % to less than or equal to 63 mol %, from greater than or equal to 55 mol % to less than or equal to 62 mol %, from greater than or equal to 56 mol % to less than or equal to 61 mol %, from greater than or equal to 57 mol % to less than or equal to 60 mol %, from greater than or equal to 58 mol % to less than or equal to 59 mol %, or any sub-ranges formed by any of these endpoints.

The glass-based substrate may include any appropriate amount of $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. The inclusion of $Al_2O_3$ in the glass-based substrate prevents phase separation and reduces the number of non-bridging oxygens (NBOs) in the glass. Additionally, $Al_2O_3$ can improve the effectiveness of ion exchange. In some embodiments, the glass-based substrate may include $Al_2O_3$ in an amount of from greater than or equal to 1 mol % to less than or equal to 17 mol %, such as from greater than or equal to 2 mol % to less than or equal to 16 mol %, from greater than or equal to 3 mol % to less than or equal to 15 mol %, from greater than or equal to 4 mol % to less than or equal to 14 mol %, from greater than or equal to 5 mol % to less than or equal to 13 mol %, from greater than or equal to 6 mol % to less than or equal to 12 mol %, from greater than or equal to 7 mol % to less than or equal to 11 mol %, from greater than or equal to 8 mol % to less than or equal to 10 mol %, 9 mol %, or any sub-ranges formed by any of these endpoints. In some embodiments, the glass-based substrate may include $Al_2O_3$ in an amount of from greater than or equal to 2.5 mol % to less than or equal to 17 mol %, such as from greater than or equal to 5 mol % to less than or equal to 17 mol %, or any sub-ranges formed from any of the aforedescribed endpoints.

The glass-based substrate may include any amount of $P_2O_5$ sufficient to produce the desired hydrogen diffusivity. The inclusion of phosphorous in the glass-based substrate promotes faster interdiffusion, regardless of the exchanging ionic pair. Thus, the phosphorous containing glass-based substrates allow the efficient formation of glass-based articles including a hydrogen-containing layer. The inclusion of $P_2O_5$ also allows for the production of a glass-based article with a deep depth of layer (e.g., greater than about 10 µm) in a relatively short treatment time. In some embodiments, the glass-based substrate may include $P_2O_5$ in an amount of from greater than or equal to 3 mol % to less than or equal to 15 mol %, such as from greater than or equal to 4 mol % to less than or equal to 15 mol %, from greater than or equal to 5 mol % to less than or equal to 14 mol %, from greater than or equal to 6 mol % to less than or equal to 13 mol %, from greater than or equal to 7 mol % to less than or equal to 12 mol %, from greater than or equal to 8 mol % to less than or equal to 11 mol %, from greater than or equal to 9 mol % to less than or equal to 10 mol %, or any sub-ranges formed by any of these endpoints.

The glass-based substrates include $K_2O$. The inclusion of $K_2O$ allows, at least in part, the efficient exchange of hydrogen species into the glass substrate upon exposure to a water containing environment. In embodiments, the glass-based substrate may include $K_2O$ in an amount of from greater than 0 mol % to less than or equal to 23 mol %, such as from greater than or equal to 1 mol % to less than or equal to 22 mol %, from greater than or equal to 2 mol % to less than or equal to 21 mol %, from greater than or equal to 3 mol % to less than or equal to 20 mol %, from greater than or equal to 4 mol % to less than or equal to 19 mol %, from greater than or equal to 5 mol % to less than or equal to 18 mol %, from greater than or equal to 6 mol % to less than or equal to 17 mol %, from greater than or equal to 7 mol % to less than or equal to 16 mol %, from greater than or equal to 8 mol % to less than or equal to 15 mol %, from greater than or equal to 9 mol % to less than or equal to 14 mol %, from greater than or equal to 10 mol % to less than or equal to 13 mol %, from greater than or equal to 11 mol % to less than or equal to 12 mol %, or any sub-ranges formed from any of these endpoints. In some embodiments, the glass-based substrate may include $K_2O$ in an amount of from greater than or equal to 4.5 mol % to less than or equal to 23 mol %, such as from greater than or equal to 10 mol % to less than or equal to 23 mol %, or any sub-ranges formed from any of the aforedescribed endpoints. In embodiments, the glass-based substrates may be substantially free or free of alkali metal oxides other than $K_2O$, such as $Li_2O$, $Na_2O$, $Cs_2O$, and $Rb_2O$.

The glass-based substrate may include $Na_2O$ in any appropriate amount. In some embodiments, the glass-based substrate may include $Na_2O$ in an amount of from greater than or equal to 0 mol % to less than or equal to 19 mol %, such as from greater than 0 mol % to less than or equal to 18 mol %, from greater than or equal to 1 mol % to less than or equal to 17 mol %, from greater than or equal to 2 mol % to less than or equal to 16 mol %, from greater than or equal to 3 mol % to less than or equal to 15 mol %, from greater than or equal to 4 mol % to less than or equal to 14 mol %, from greater than or equal to 5 mol % to less than or equal to 13 mol %, from greater than or equal to 6 mol % to less than or equal to 12 mol %, from greater than or equal to 7 mol % to less than or equal to 11 mol %, from greater than or equal to 8 mol % to less than or equal to 10 mol %, 9 mol %, or any and all sub-ranges formed from these endpoints. In embodiments, the glass-based substrate may be substantially free or free of $Na_2O$.

The glass-based substrate may include $Li_2O$ in any appropriate amount. In some embodiments, the glass-based substrate may include $Li_2O$ in an amount of from greater than or equal to 0 mol % to less than or equal to 5 mol %, such as from greater than 0 mol % to less than or equal to 4 mol %, from greater than or equal to 1 mol % to less than or equal to 3 mol %, 2 mol %, or any and all sub-ranges formed from any of these endpoints. In embodiments, the glass-based substrate may be substantially free or free of $Li_2O$.

The glass-based substrate may include $Rb_2O$ in any appropriate amount. In some embodiments, the glass-based substrate may include $Rb_2O$ in an amount of from greater than or equal to 0 mol % to less than or equal to 2 mol %, such as from greater than 0 mol % to less than or equal to 1 mol %, or any sub-range formed from any of these endpoints. In embodiments, the glass-based substrate may be substantially free or free of $Rb_2O$.

The glass-based substrate may include $Cs_2O$ in any appropriate amount. In some embodiments, the glass-based substrate may include $Cs_2O$ in an amount of from greater than or equal to 0 mol % to less than or equal to 10 mol %, such as from greater than or equal to 1 mol % to less than or equal to 9 mol %, from greater than or equal to 2 mol % to less than or equal to 8 mol %, from greater than or equal to 3 mol % to less than or equal to 7 mol %, from greater than or equal to 4 mol % to less than or equal to 6 mol %, 5 mol %, or any sub-range formed from any of these endpoints. In embodiments, the glass-based substrate may be substantially free or free of $Cs_2O$.

The glass-based substrate may additionally include $B_2O_3$. The inclusion of $B_2O_3$ in the glass-based substrates may increase the damage resistance of the glass-based substrates, and thereby increase the damage resistance of the glass-based articles formed therefrom. In some embodiments, the glass-based substrates may include $B_2O_3$ in an amount from greater than or equal to 0 mol % to less than or equal to 6 mol %, such as from greater than or equal to 1 mol % to less than or equal to 5 mol %, from greater than or equal to 2 mol % to less than or equal to 4 mol %, 3 mol %, or any and all sub-ranges formed from these endpoints. In embodiments, the glass-based substrates may be substantially free or free of $B_2O_3$.

The glass-based substrate may additionally include MgO. In some embodiments, the glass-based substrates may include MgO in an amount from greater than or equal to 0 mol % to less than or equal to 6 mol %, such as from greater than or equal to 1 mol % to less than or equal to 5 mol %, from greater than or equal to 2 mol % to less than or equal to 4 mol %, 3 mol %, or any and all sub-ranges formed from these endpoints. In embodiments, the glass-based substrates may be substantially free or free of MgO.

The glass-based substrate may additionally include ZnO. In some embodiments, the glass-based substrates may include ZnO in an amount from greater than or equal to 0 mol % to less than or equal to 5 mol %, such as from greater than or equal to 1 mol % to less than or equal to 4 mol %, from greater than or equal to 2 mol % to less than or equal to 3 mol %, or any and all sub-ranges formed from these endpoints. In embodiments, the glass-based substrates may be substantially free or free of ZnO.

The glass-based substrates may additionally include a fining agent. In some embodiments, the fining agent may include tin. In embodiments, the glass-based substrate may include $SnO_2$ in an amount from greater than or equal to 0 mol % to less than or equal to 0.5 mol %, such as from greater than 0 mol % to less than or equal to 0.1 mol %.

In some embodiments, the glass-based substrate may have a composition including: from greater than or equal to 47 mol % to less than or equal to 70 mol % $SiO_2$, from greater than or equal to 1 mol % to less than or equal to 17 mol % $Al_2O_3$, from greater than or equal to 3 mol % to less than or equal to 15 mol % $P_2O_5$, and from greater than 0 mol % to less than or equal to 23 mol % $K_2O$.

In some embodiments, the glass-based substrate may have a composition including: from greater than or equal to 47 mol % to less than or equal to 70 mol % $SiO_2$, from greater than or equal to 5 mol % to less than or equal to 17 mol % $Al_2O_3$, from greater than or equal to 4 mol % to less than or equal to 15 mol % $P_2O_5$, and from greater than or equal to 4.5 mol % to less than or equal to 23 mol % $K_2O$.

In some embodiments, the glass-based substrate may have a composition including: from greater than or equal to 47 mol % to less than or equal to 70 mol % $SiO_2$, from greater than or equal to 2.5 mol % to less than or equal to 17 mol % $Al_2O_3$, from greater than or equal to 4 mol % to less than or equal to 15 mol % $P_2O_5$, and from greater than 10 mol % to less than or equal to 23 mol % $K_2O$.

The glass-based substrate may have any appropriate geometry. In some embodiments, the glass-based substrate may have a thickness of less than or equal to 2 mm, such as less than or equal to 1.9 mm, less than or equal to 1.8 mm, less than or equal to 1.7 mm, less than or equal to 1.6 mm, less than or equal to 1.5 mm, less than or equal to 1.4 mm, less than or equal to 1.3 mm, less than or equal to 1.2 mm, less than or equal to 1.1 mm, less than or equal to 1 mm, less than or equal to 900 µm, less than or equal to 800 µm, less than or equal to 700 µm, less than or equal to 600 µm, less than or equal to 500 µm, less than or equal to 400 µm, less than or equal to 300 µm, or less. In embodiments, the glass-based substrate may have a thickness from greater than or equal to 300 µm to less than or equal to 2 mm, such as from greater than or equal to 400 µm to less than or equal to 1.9 mm, from greater than or equal to 500 µm to less than or equal to 1.8 mm, from greater than or equal to 600 µm to less than or equal to 1.7 mm, from greater than or equal to 700 µm to less than or equal to 1.6 mm, from greater than or equal to 800 µm to less than or equal to 1.5 mm, from greater than or equal to 900 µm to less than or equal to 1.4 mm, from greater than or equal to 1 mm to less than or equal to 1.3 mm, from greater than or equal to 1.1 mm to less than or equal to 1.2 mm, or any and all sub-ranges formed from these endpoints. In some embodiments, the glass-based substrate may have be plate or sheet shaped. In some other embodiments, the glass-based substrates may have a 2.5D or 3D shape. As utilized herein, a "2.5D shape" refers to a sheet shaped article with at least one major surface being at least partially nonplanar, and a second major surface being substantially planar. As utilized herein, a "3D shape" refers to an article with first and second opposing major surfaces that are at least partially nonplanar. The glass-based articles may have dimensions and shapes substantially similar or the same as the glass-based substrates from which they are formed.

The glass-based articles may be produced from the glass-based substrate by exposure to water vapor under any appropriate conditions. The exposure may be carried out in any appropriate device, such as a furnace with relative humidity control. The exposure may also be carried out at an elevated pressure, such as a furnace or autoclave with relative humidity and pressure control.

In one embodiment, the glass-based articles may be produced by exposing a glass-based substrate to an environment with a pressure greater than ambient pressure and containing water vapor. The environment may have a pressure greater than 0.1 MPa and a water partial pressure of greater than or equal to 0.05 MPa. The elevated pressure allows in the exposure environment allows for a higher concentration of water vapor in the environment, especially as temperatures are increased. For example, Table 1 below provides the concentration of water in the vapor phase at atmospheric pressure (0.1 MPa) for various temperatures.

TABLE I

| T (° C.) | Volume of 1 kg Water Vapor (m³) | Grams of Water per m³ |
|---|---|---|
| 100 | 1.6960 | 598 |
| 200 | 2.1725 | 460 |
| 300 | 2.6389 | 379 |
| 400 | 3.1027 | 322 |

At atmospheric pressure, the water vapor saturation condition is 99.61° C. As demonstrated by Table I, as the temperature increases the amount of water available for diffusion into the glass-based substrates to form glass-based articles decreases for a fixed volume, such as the interior of a furnace or autoclave. Thus, while increasing the temperature of the water vapor treatment environment may increase the rate of diffusion of hydrogen species into the glass-based substrate, reduced total water vapor concentration and stress relaxation at higher temperatures produce decreased compressive stress when pressure is constant.

As temperatures increase, such as those above the atmospheric pressure saturation condition, applying increased pressure to reach the saturation condition increases the concentration of water vapor in the environment significantly. Table II below provides the staturation condition pressurse for various temperatures and the associated concentration of water in the vapor phrase.

TABLE II

| T (° C.) | Pressure (MPa) | Volume of 1 kg Water Vapor (m³) | Grams of Water per m³ |
|---|---|---|---|
| 100 | 0.101 | 1.6719 | 598 |
| 200 | 1.555 | 0.1272 | 7862 |
| 300 | 8.5877 | 0.0217 | 46083 |
| 373.5 | 21.945 | 0.0037 | 270270 |

Figure 3:
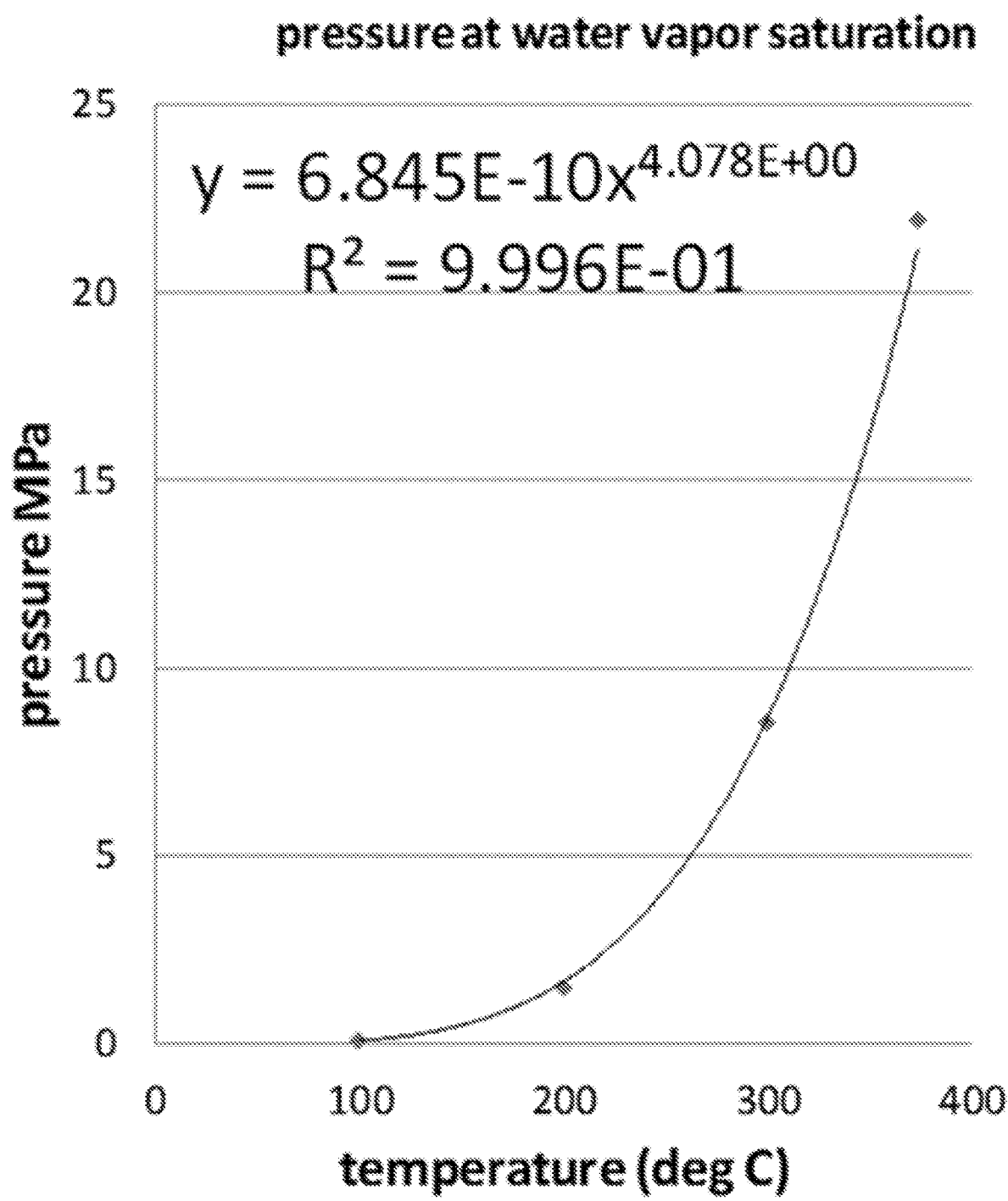
FIG. 3 is a plot of the saturation condition for water as a function or pressure and temperature.

The saturation condition for water vapor as a function of pressure and temperature is shown in FIG. 3. As shown in FIG. 3, the regions above the curve will result in condensation of water vapor into liquid which is undesirable. Thus, the water vapor treatment conditions utilized herein will fall on or under the curve in FIG. 3, with preferred conditions being on or just under the curve to maximize water vapor content. For these reasons, the water vapor treatment of the glass-based substrates may be carried out at elevated pressure.

In some embodiments, the glass-based substrates may be exposed to an environment at a pressure greater than 0.1 MPa, such as greater than or equal to 0.2 MPa, greater than or equal to 0.3 MPa, greater than or equal to 0.4 MPa, greater than or equal to 0.5 MPa, greater than or equal to 0.6 MPa, greater than or equal to 0.7 MPa, greater than or equal to 0.8 MPa, greater than or equal to 0.9 MPa, greater than or equal to 1.0 MPa, greater than or equal to 1.1 MPa, greater than or equal to 1.2 MPa, greater than or equal to 1.3 MPa, greater than or equal to 1.4 MPa, greater than or equal to 1.5 MPa, greater than or equal to 1.6 MPa, greater than or equal to 1.7 MPa, greater than or equal to 1.8 MPa, greater than or equal to 1.9 MPa, greater than or equal to 2.0 MPa, greater than or equal to 2.1 MPa, greater than or equal to 2.2 MPa, greater than or equal to 2.3 MPa, greater than or equal to 2.4 MPa, greater than or equal to 2.5 MPa, greater than or equal to 2.6 MPa, greater than or equal to 2.7 MPa, greater than or equal to 2.8 MPa, greater than or equal to 2.9 MPa, greater than or equal to 3.0 MPa, greater than or equal to 3.1 MPa, greater than or equal to 3.2 MPa, greater than or equal to 3.3 MPa, greater than or equal to 3.4 MPa, greater than or equal to 3.5 MPa, greater than or equal to 1.6 MPa, greater than or equal to 3.7 MPa, greater than or equal to 3.8 MPa, greater than or equal to 3.9 MPa, greater than or equal to 4.0 MPa, greater than or equal to 4.1 MPa, greater than or equal to 4.2 MPa, greater than or equal to 4.3 MPa, greater than or equal to 4.4 MPa, greater than or equal to 4.5 MPa, greater than or equal to 4.6 MPa, greater than or equal to 4.7 MPa, greater than or equal to 4.8 MPa, greater than or equal to 4.9 MPa, greater than or equal to 5.0 MPa, greater than or equal to 5.1 MPa, greater than or equal to 5.2 MPa, greater than or equal to 5.3 MPa, greater than or equal to 5.4 MPa, greater than or equal to 5.5 MPa, greater than or equal to 5.6 MPa, greater than or equal to 5.7 MPa, greater than or equal to 5.8 MPa, greater than or equal to 5.9 MPa, greater than or equal to 6.0 MPa, or more. In embodiments, the glass-based substrates may be exposed to an environment at a pressure of from greater 0.1 MPa to less than or equal to 25 MPa, such as from greater than or equal to 0.2 MPa to less than or equal to 24 MPa, from greater than or equal to 0.3 MPa to less than or equal to 23 MPa, from greater than or equal to 0.4 MPa to less than or equal to 22 MPa, from greater than or equal to 0.5 MPa to less than or equal to 21 MPa, from greater than or equal to 0.6 MPa to less than or equal to 20 MPa, from greater than or equal to 0.7 MPa to less than or equal to 19 MPa, from greater than or equal to 0.8 MPa to less than or equal to 18 MPa, from greater than or equal to 0.9 MPa to less than or equal to 17 MPa, from greater than or equal to 1.0 MPa to less than or equal to 16 MPa, from greater than or equal to 1.1 MPa to less than or equal to 15 MPa, from greater than or equal to 1.2 MPa to less than or equal to 14 MPa, from greater than or equal to 1.3 MPa to less than or equal to 13 MPa, from greater than or equal to 1.4 MPa to less than or equal to 12 MPa, from greater than or equal to 1.5 MPa to less than or equal to 11 MPa, from greater than or equal to 1.6 MPa to less than or equal to 10 MPa, from greater than or equal to 1.7 MPa to less than or equal to 9 MPa, from greater than or equal to 1.8 MPa to less than or equal to 8 MPa, from greater than or equal to 1.9 MPa to less than or equal to 7 MPa, from greater than or equal to 1.9 MPa to less than or equal to 6.9 MPa, from greater than or equal to 2.0 MPa to less than or equal to 6.8 MPa, from greater than or equal to 2.1 MPa to less than or equal to 6.7 MPa, from greater than or equal to 2.2 MPa to less than or equal to 6.6 MPa, from greater than or equal to 2.3 MPa to less than or equal to 6.5 MPa, from greater than or equal to 2.4 MPa to less than or equal to 6.4 MPa, from greater than or equal to 2.5 MPa to less than or equal to 6.3 MPa, from greater than or equal to 2.6 MPa to less than or equal to 6.2 MPa, from greater than or equal to 2.7 MPa to less than or equal to 6.1 MPa, from greater than or equal to 2.8 MPa to less than or equal to 6.0 MPa, from greater than or equal to 2.9 MPa to less than or equal to 5.9 MPa, from greater than or equal to 3.0 MPa to less than or equal to 5.8 MPa, from greater than or equal to 3.1 MPa to less than or equal to 5.7 MPa, from greater than or equal to 3.2 MPa to less than or equal to 5.6 MPa, from greater than or equal to 3.3 MPa to less than or equal to 5.5 MPa, from greater than or equal to 3.4 MPa to less than or equal to 5.4 MPa, from greater than or equal to 3.5 MPa to less than or equal to 5.3 MPa, from greater than or equal to 3.6 MPa to less than or equal to 5.2 MPa, from greater than or equal to 3.7 MPa to less than or equal to 5.1 MPa, from greater than or equal to 3.8 MPa to less than or equal to 5.0 MPa, from greater than or equal to 3.9 MPa to less than or equal to 4.9 MPa, from greater than or equal to 4.0 MPa to less than or equal to 4.8 MPa, from greater than or equal to 4.1 MPa to less than or equal to 4.7 MPa, from greater than or equal to 4.2 MPa to less than or equal to 4.6 MPa, from greater than or equal to 4.3 MPa to less than or equal to 4.5 MPa, 4.4 MPa, or any and all sub-ranges formed from any of these endpoints.

In some embodiments, the glass-based substrates may be exposed to an environment with a water partial pressure greater than or equal to 0.05 MPa, such as greater than or equal to 0.075 MPa, greater than or equal to 0.1 MPa, greater than or equal to 0.2 MPa, greater than or equal to 0.3 MPa, greater than or equal to 0.4 MPa, greater than or equal to 0.5 MPa, greater than or equal to 0.6 MPa, greater than or equal to 0.7 MPa, greater than or equal to 0.8 MPa, greater than or equal to 0.9 MPa, greater than or equal to 1.0 MPa, greater than or equal to 1.1 MPa, greater than or equal to 1.2 MPa, greater than or equal to 1.3 MPa, greater than or equal to 1.4 MPa, greater than or equal to 1.5 MPa, greater than or equal to 1.6 MPa, greater than or equal to 1.7 MPa, greater than or equal to 1.8 MPa, greater than or equal to 1.9 MPa, greater than or equal to 2.0 MPa, greater than or equal to 2.1 MPa, greater than or equal to 2.2 MPa, greater than or equal to 2.3 MPa, greater than or equal to 2.4 MPa, greater than or equal to 2.5 MPa, greater than or equal to 2.6 MPa, greater than or equal to 2.7 MPa, greater than or equal to 2.8 MPa, greater than or equal to 2.9 MPa, greater than or equal to 3.0 MPa, greater than or equal to 3.1 MPa, greater than or equal to 3.2 MPa, greater than or equal to 3.3 MPa, greater than or equal to 3.4 MPa, greater than or equal to 3.5 MPa, greater than or equal to 3.7 MPa, greater than or equal to 3.8 MPa, greater than or equal to 3.9 MPa, greater than or equal to 4.0 MPa, greater than or equal to 4.1 MPa, greater than or equal to 4.2 MPa, greater than or equal to 4.3 MPa, greater than or equal to 4.4 MPa, greater than or equal to 4.5 MPa, greater than or equal to 4.6 MPa, greater than or equal to 4.7 MPa, greater than or equal to 4.8 MPa, greater than or equal to 4.9 MPa, greater than or equal to 5.0 MPa, greater than or equal to 5.1 MPa, greater than or equal to 5.2 MPa, greater than or equal to 5.3 MPa, greater than or equal to 5.4 MPa, greater than or equal to 5.5 MPa, greater than or equal to 5.6 MPa, greater than or equal to 5.7 MPa, greater than or equal to 5.8 MPa, greater than or equal to 5.9 MPa, greater than or equal to 6.0 MPa, greater than or equal to 7.0 MPa, greater than or equal to 8.0 MPa, greater than or equal to 9.0 MPa, greater than or equal to 10.0 MPa, greater than or equal to 11.0 MPa, greater than or equal to 12.0 MPa, greater than or equal to 13.0 MPa, greater than or equal to 14.0 MPa, greater than or equal to 15.0 MPa, greater than or equal to 16.0 MPa, greater than or equal to 17.0 MPa, greater than or equal to 18.0 MPa, greater than or equal to 19.0 MPa, greater than or equal to 20.0 MPa, greater than or equal to 21.0 MPa, greater than or equal to 22.0 MPa, or more. In embodiments, the glass-based substrates may be exposed to an environment with a water partial pressure from greater than or equal to 0.05 MPa to less than or equal to 22 MPa, such as from greater than or equal to 0.075 MPa to less than or equal to 22 MPa, from greater than or equal to 0.1 MPa to less than or equal to 21 MPa, from greater than or equal to 0.2 MPa to less than or equal to 20 MPa, from greater than or equal to 0.3 MPa to less than or equal to 19 MPa, from greater than or equal to 0.4 MPa to less than or equal to 18 MPa, from greater than or equal to 0.5 MPa to less than or equal to 17 MPa, from greater than or equal to 0.6 MPa to less than or equal to 16 MPa, from greater than or equal to 0.7 MPa to less than or equal to 15 MPa, from greater than or equal to 0.8 MPa to less than or equal to 14 MPa, from greater than or equal to 0.9 MPa to less than or equal to 13 MPa, from greater than or equal to 1.0 MPa to less than or equal to 12 MPa, from greater than or equal to 1.1 MPa to less than or equal to 11 MPa, from greater than or equal to 1.2 MPa to less than or equal to 10 MPa, from greater than or equal to 1.3 MPa to less than or equal to 9 MPa, from greater than or equal to 1.4 MPa to less than or equal to 8 MPa, from greater than or equal to 1.5 MPa to less than or equal to 7 MPa, from greater than or equal to 1.6 MPa to less than or equal to 6.9 MPa, from greater than or equal to 1.7 MPa to less than or equal to 6.8 MPa, from greater than or equal to 1.8 MPa to less than or equal to 6.7 MPa, from greater than or equal to 1.9 MPa to less than or equal to 6.6 MPa, from greater than or equal to 2.0 MPa to less than or equal to 6.5 MPa, from greater than or equal to 2.1 MPa to less than or equal to 6.4 MPa, from greater than or equal to 2.2 MPa to less than or equal to 6.3 MPa, from greater than or equal to 2.3 MPa to less than or equal to 6.2 MPa, from greater than or equal to 2.4 MPa to less than or equal to 6.1 MPa, from greater than or equal to 2.5 MPa to less than or equal to 6.0 MPa, from greater than or equal to 2.6 MPa to less than or equal to 5.9 MPa, from greater than or equal to 2.7 MPa to less than or equal to 5.8 MPa, from greater than or equal to 2.8 MPa to less than or equal to 5.7 MPa, from greater than or equal to 2.9 MPa to less than or equal to 5.6 MPa, from greater than or equal to 3.0 MPa to less than or equal to 5.5 MPa, from greater than or equal to 3.1 MPa to less than or equal to 5.4 MPa, from greater than or equal to 3.2 MPa to less than or equal to 5.3 MPa, from greater than or equal to 3.3 MPa to less than or equal to 5.2 MPa, from greater than or equal to 3.4 MPa to less than or equal to 5.1 MPa, from greater than or equal to 3.5 MPa to less than or equal to 5.0 MPa, from greater than or equal to 3.6 MPa to less than or equal to 4.9 MPa, from greater than or equal to 3.7 MPa to less than or equal to 4.8 MPa, from greater than or equal to 3.8 MPa to less than or equal to 4.7 MPa, from greater than or equal to 3.9 MPa to less than or equal to 4.6 MPa, from greater than or equal to 4.0 MPa to less than or equal to 4.5 MPa, from greater than or equal to 4.1 MPa to less than or equal to 4.4 MPa, from greater than or equal to 4.2 MPa to less than or equal to 4.3 MPa, or any and all sub-ranges formed from any of these endpoints.

In some embodiments, the glass-based substrates may be exposed to an environment with a relative humidity of greater than or equal to 75%, such as greater than or equal to 80%, greater than or equal to 85%, greater than or equal to 90%, greater than or equal to 95%, greater than or equal to 99%, or more. In some embodiments, the glass-based substrate may be exposed to an environment with 100% relative humidity.

In some embodiments, the glass-based substrates may be exposed to an environment at with a temperature of greater than or equal to 100° C., such as greater than or equal to 105° C., greater than or equal to 110° C., greater than or equal to 115° C., greater than or equal to 120° C., greater than or equal to 125° C., greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 165° C., greater than or equal to 170° C., greater than or equal to 175° C., greater than or equal to 180° C., greater than or equal to 185° C., greater than or equal to 190° C., greater than or equal to 195° C., greater than or equal to 200° C., greater than or equal to 205° C., greater than or equal to 210° C., greater than or equal to 215° C., greater than or equal to 220° C., greater than or equal to 225° C., greater than or equal to 230° C., greater than or equal to 235° C., greater than or equal to 240° C., greater than or equal to 245° C., greater than or equal to 250° C., greater than or equal to 255° C., greater than or equal to 260° C., greater than or equal to 265° C., greater than or equal to 270° C., greater than or equal to 275° C., greater than or equal to 280° C., greater than or equal to 285° C., greater than or equal to 290° C., greater than or equal to 295° C., greater than or equal to 300° C., or more. In some embodiments, the glass-based substrates may be exposed to an environment with a temperature from greater than or equal to 100° C. to less than or equal to 400° C., such as from greater than or equal to 105° C. to less than or equal to 390° C., from greater than or equal to 110° C. to less than or equal to 380° C., from greater than or equal to 115° C. to less than or equal to 370° C., from greater than or equal to 120° C. to less than or equal to 360° C., from greater than or equal to 125° C. to less than or equal to 350° C., from greater than or equal to 130° C. to less than or equal to 340° C., from greater than or equal to 135° C. to less than or equal to 330° C., from greater than or equal to 140° C. to less than or equal to 320° C., from greater than or equal to 145° C. to less than or equal to 310° C., from greater than or equal to 150° C. to less than or equal to 300° C., from greater than or equal to 155° C. to less than or equal to 295° C., from greater than or equal to 160° C. to less than or equal to 290° C., from greater than or equal to 165° C. to less than or equal to 285° C., from greater than or equal to 170° C. to less than or equal to 280° C., from greater than or equal to 175° C. to less than or equal to 275° C., from greater than or equal to 180° C. to less than or equal to 270° C., from greater than or equal to 185° C. to less than or equal to 265° C., from greater than or equal to 190° C. to less than or equal to 260° C., from greater than or equal to 195° C. to less than or equal to 255° C., from greater than or equal to 200° C. to less than or equal to 250° C., from greater than or equal to 205° C. to less than or equal to 245° C., from greater than or equal to 210° C. to less than or equal to 240° C., from greater than or equal to 215° C. to less than or equal to 235° C., from greater than or equal to 220° C. to less than or equal to 230° C., 225° C., or any and all sub-ranges formed from any of these endpoints.

In some embodiments, the glass-based substrate may be exposed to the water vapor containing environment for a time period sufficient to produce the desired degree of hydrogen-containing species diffusion and the desired compressive stress layer. In some embodiments, the glass-based substrate may be exposed to the water vapor containing environment for greater than or equal to 2 hours, such as greater than or equal to 4 hours, greater than or equal to 6 hours, greater than or equal to 8 hours, greater than or equal to 10 hours, greater than or equal to 12 hours, greater than or equal to 14 hours, greater than or equal to 16 hours, greater than or equal to 18 hours, greater than or equal to 20 hours, greater than or equal to 22 hours, greater than or equal to 24 hours, greater than or equal to 30 hours, greater than or equal to 36 hours, greater than or equal to 42 hours, greater than or equal to 48 hours, greater than or equal to 54 hours, greater than or equal to 60 hours, greater than or equal to 66 hours, greater than or equal to 72 hours, greater than or equal to 78 hours, greater than or equal to 84 hours, greater than or equal to 90 hours, greater than or equal to 96 hours, greater than or equal to 102 hours, greater than or equal to 108 hours, greater than or equal to 114 hours, greater than or equal to 120 hours, greater than or equal to 126 hours, greater than or equal to 132 hours, greater than or equal to 138 hours, greater than or equal to 144 hours, greater than or equal to 150 hours, greater than or equal to 156 hours, greater than or equal to 162 hours, greater than or equal to 168 hours, or more. In some embodiments, the glass-based substrate may be exposed to the water vapor containing environment for a time period from greater than or equal to 2 hours to less than or equal to 10 days, such as from greater than or equal to 4 hours to less than or equal to 9 days, from greater than or equal to 6 hours to less than or equal to 8 days, from greater than or equal to 8 hours to less than or equal to 168 hours, from greater than or equal to 10 hours to less than or equal to 162 hours, from greater than or equal to 12 hours to less than or equal to 156 hours, from greater than or equal to 14 hours to less than or equal to 150 hours, from greater than or equal to 16 hours to less than or equal to 144 hours, from greater than or equal to 18 hours to less than or equal to 138 hours, from greater than or equal to 20 hours to less than or equal to 132 hours, from greater than or equal to 22 hours to less than or equal to 126 hours, from greater than or equal to 24 hours to less than or equal to 120 hours, from greater than or equal to 30 hours to less than or equal to 114 hours, from greater than or equal to 36 hours to less than or equal to 108 hours, from greater than or equal to 42 hours to less than or equal to 102 hours, from greater than or equal to 48 hours to less than or equal to 96 hours, from greater than or equal to 54 hours to less than or equal to 90 hours, from greater than or equal to 60 hours to less than or equal to 84 hours, from greater than or equal to 66 hours to less than or equal to 78 hours, 72 hours, or any and all sub-ranges formed from any of these endpoints.

In some embodiments, the glass-based substrates may be exposed to multiple water vapor containing environments. In embodiments, the glass-based substrate may be exposed to a first environment to form a first glass-based article with a first compressive stress layer extending from a surface of the first glass-based article to a first depth of compression, and the first glass-based article may then be exposed to a second environment to form a second glass-based article with a second compressive stress layer extending from a surface of the second glass-based article to a second depth of compression. The first environment has a first water partial pressure and a first temperature, and the glass-based substrate is exposed to the first environment for a first time period. The second environment has a second water partial pressure and a second temperature, and the first glass-based article is exposed to the second environment for a second time period.

The first water partial pressure and the second water partial pressure may be any appropriate partial pressure, such as greater than or equal to 0.05 MPa or greater than or equal to 0.075 MPa. The first and second partial pressure may be any of the values disclosed herein with respect to the water partial pressures employed in the elevated pressure method. In embodiments, the first and second environments may have, independently, a relative humidity of greater than or equal to 75%, such as greater than or equal to 80%, greater than or equal to 90%, greater than or equal to 95%, or equal to 100%. In some embodiments, at least one of the first environment and the second environment has a relative humidity of 100%.

The first compressive stress layer includes a first maximum compressive stress, and the second compressive stress layer includes a second maximum compressive stress. In embodiments, the first maximum compressive stress is less than the second maximum compressive stress. The second maximum compressive stress may be compared to a compressive stress "spike" of the type formed through multi-step or mixed bath ion exchange techniques. The first and second maximum compressive stress may have any of the values disclosed herein with respect to the compressive stress of the glass-based article. In embodiments, the second maximum compressive stress may be greater than or equal to 50 MPa.

The first depth of compression may be less than or equal to the second depth of compression. In some embodiments, the first depth of compression is less than the second depth of compression. The first depth of compression and the second depth of compression may have any of the values disclosed herein with respect to the depth of compression. In embodiments, the second depth of compression is greater than 5 μm.

The first temperature may be greater than or equal to the second temperature. In embodiments, the first temperature is greater than the second temperature. The first and second temperatures may be any of the temperatures disclosed in connection with the elevated pressure method.

The first time period may be less than or equal to the second time period. In embodiments, the first time period is less than the second time period. The first and second time periods may be any of the time periods disclosed in connection with the elevated pressure method.

In embodiments, any or all of the multiple exposures to a water vapor containing environment may be performed at an elevated pressure. For example, at least one of the first environment and the second environment may have a pressure greater than 0.1 MPa. The first and second environments may have any pressure disclose in connection with the elevated pressure method.

In some embodiments, the multiple water vapor environment exposure technique may include more than two exposure environments. In embodiments, the second glass-based article may be exposed to a third environment to form a third glass-based article. The third environment has a third water partial pressure and a third temperature, and the second glass-based article is exposed to the third environment for a third time period. The third glass-based article includes a third compressive stress layer extending from a surface of the article to a third depth of compression and having a third maximum compressive stress. The third water partial pressure may be greater than or equal to 0.05 MPa, such as greater than or equal to 0.075 MPa. The values of any of the properties of the third environment and third glass-based article may be selected from those disclosed for the corresponding properties in connection with the elevated pressure method.

In some embodiments, the first glass-based article may be cooled to ambient temperature or otherwise removed from the first environment after the conclusion of the first time period and prior to being exposed to the second environment. In some embodiments, the first glass-based article may remain in the first environment after the conclusion of the first time period, and the first environment conditions may be changed to the second environment conditions without cooling to ambient temperature or removing the first glass-based article from the water vapor containing environment.

The methods of producing the glass-based articles disclosed herein may be free of an ion exchange treatment with an alkali ion source. In embodiments, the glass-based articles are produced by methods that do not include an ion exchange with an alkali ion source.

The exposure conditions may be modified to reduce the time necessary to produce the desired amount of hydrogen-containing species diffusion into the glass-based substrate. For example, the temperature and/or relative humidity may be increased to reduce the time required to achieve the desired degree of hydrogen-containing species diffusion and depth of layer into the glass-based substrate.

Exemplary Embodiments

Glass compositions that are particularly suited for formation of the glass-based articles described herein were formed into glass-based substrates, and the glass compositions are provided in Table III below. The density of the glass compositions was determined using the buoyancy method of ASTM C693-93(2013). The linear coefficient of thermal expansion (CTE) over the temperature range 25° C. to 300° C. is expressed in terms of $10^{-7}/°$ C. and was determined using a push-rod dilatometer in accordance with ASTM E228-11. The strain point and anneal point were determined using the beam bending viscosity method of ASTM C598-93(2013). The softening point was determined using the parallel plate viscosity method of ASTM C1351M-96 (2012). SOC was measured according to Procedure C (Glass Disc Method) described in ASTM standard C770-16, entitled "Standard Test Method for Measurement of Glass Stress-Optical Coefficient." Where the SOC and refractive index (RI) are not reported in Table III default values of these properties were utilized for those compositions, with a SOC of 3.0 nm/mm/MPa and a RI of 1.5.

TABLE III

| | Glass Composition | | | | | | |
|---|---|---|---|---|---|---|---|
| | A | B | C | D | E | F | G |
| $SiO_2$ | 61.09 | 61.05 | 61.50 | 61.58 | 59.20 | 56.99 | 60.90 |
| $Al_2O_3$ | 10.90 | 11.07 | 11.11 | 11.08 | 12.97 | 13.03 | 13.00 |
| $P_2O_5$ | 9.51 | 9.39 | 9.49 | 9.57 | 9.94 | 9.92 | 6.01 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Na_2O$ | 0.06 | 18.48 | 9.42 | 0.17 | 0.16 | 0.18 | 0.17 |
| $K_2O$ | 18.44 | 0.01 | 8.47 | 15.58 | 17.73 | 19.88 | 19.92 |
| $Rb_2O$ | 0.00 | 0.00 | 0.00 | 2.01 | 0.00 | 0.00 | 0.00 |
| MgO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| Density (g/cm³) | 2.376 | 2.389 | 2.384 | 2.415 | 2.374 | 2.389 | 2.404 |
| CTE *$10^{-7}$ (1/° C.) | 110 | 93.7 | 105.1 | 109.8 | 102.4 | 113.8 | 109.2 |
| Strain Pt. (° C.) | 538 | 503 | 503 | 534 | | 559 | |
| Anneal Pt. (° C.) | 592 | 552 | 554 | 590 | | 618 | |
| Softening Pt. (° C.) | 892.3 | 845.4 | 874.2 | 903.2 | | 914 | |
| Stress optical coefficient (nm/mm/MPa) | 2.946 | 3.057 | 3.022 | 2.958 | 2.979 | 2.845 | 2.873 |
| Refractive index at 589.3 nm | 1.481 | 1.4824 | 1.4816 | 1.4813 | 1.4811 | 1.4831 | 1.4888 |

| | Glass Composition | | | | | | |
|---|---|---|---|---|---|---|---|
| | H | I | J | K | L | M | N |
| $SiO_2$ | 61.83 | 60.64 | 59.70 | 61.77 | 60.82 | 59.79 | 56.25 |
| $Al_2O_3$ | 14.91 | 16.03 | 17.02 | 15.01 | 16.09 | 17.06 | 11.02 |
| $P_2O_5$ | 4.98 | 4.99 | 5.00 | 4.97 | 4.94 | 4.95 | 9.87 |
| $B_2O_3$ | 0.00 | 0.00 | 0.00 | 0.00 | 0.00 | 0.00 | 0.00 |
| $Li_2O$ | 0.00 | 0.00 | 0.00 | 5.02 | 5.04 | 5.04 | 0.00 |
| $Na_2O$ | 0.17 | 0.17 | 0.17 | 0.13 | 0.14 | 0.13 | 0.20 |
| $K_2O$ | 18.05 | 18.10 | 18.05 | 13.04 | 12.93 | 12.97 | 22.66 |
| $Rb_2O$ | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| $SnO_2$ | 0.06 | 0.05 | 0.05 | 0.05 | 0.05 | 0.06 | 0.00 |
| Density (g/cm³) | 2.397 | 2.398 | 2.4 | 2.395 | 2.399 | 2.402 | 2.403 |
| CTE *$10^{-7}$ (1/° C.) | 96 | 95.1 | 95.1 | 89.8 | 89.5 | 88.9 | 127.3 |
| Strain Pt. (° C.) | | | | 632 | 600 | 607 | 516 |
| Anneal Pt. (° C.) | | | | 690 | 657 | 670 | 564 |

TABLE III-continued

| | | | | | | | |
|---|---|---|---|---|---|---|---|
| Softening Pt. (° C.) | 1076.4 | | | 943 | 950.5 | 960 | 850.6 |
| Stress optical coefficient (nm/mm/MPa) | 3.01 | 3.028 | 3.046 | 2.916 | 2.934 | 2.925 | |
| Refractive index at 589.3 nm | 1.4885 | 1.4893 | 1.4895 | 1.4942 | 1.4951 | 1.4965 | 1.4847 |

| | Glass Composition | | | | | | |
|---|---|---|---|---|---|---|---|
| | O | P | Q | R | S | T | U |
| $SiO_2$ | 51.11 | 46.90 | 64.14 | 66.96 | 63.94 | 66.96 | 63.90 |
| $Al_2O_3$ | 11.27 | 16.14 | 11.09 | 11.20 | 11.01 | 11.06 | 11.03 |
| $P_2O_5$ | 14.73 | 14.57 | 7.02 | 4.03 | 6.98 | 3.96 | 6.98 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Na_2O$ | 0.20 | 0.21 | 0.15 | 0.14 | 0.12 | 0.12 | 0.28 |
| $K_2O$ | 22.68 | 22.18 | 17.60 | 17.67 | 13.90 | 13.89 | 13.91 |
| $Rb_2O$ | 0.00 | 0.00 | 0.00 | 0.00 | 0.00 | 0.00 | 0.00 |
| MgO | 0.00 | 0.00 | 0.00 | 0.00 | 4.05 | 4.01 | 0.00 |
| ZnO | 0.00 | 0.00 | 0.00 | 0.00 | 0.00 | 0.00 | 3.90 |
| $SnO_2$ | 0.00 | 0.00 | 0.00 | 0.00 | 0.00 | 0.00 | 0.00 |
| Density (g/cm$^3$) | 2.392 | 2.397 | 2.38 | 2.393 | 2.369 | 2.372 | 2.42 |
| CTE *10$^{-7}$ (1/° C.) | | | 103.2 | 111.3 | 87.7 | 91.5 | 87.4 |
| Strain Pt. (° C.) | | | 576 | | 654 | 718 | 666 |
| Anneal Pt. (° C.) | | | 636 | | 719 | 791 | 740 |
| Softening Pt. (° C.) | | | 944.1 | 961.5 | 1055 | | 1000.9 |
| Stress optical coefficient (nm/mm/MPa) | | | 3.043 | 2.982 | 3.108 | 3.312 | 3.278 |
| Refractive index at 589.3 nm | 1.4802 | 1.4822 | 1.4833 | | | 1.4863 | |

| | Glass Composition | | | | | | |
|---|---|---|---|---|---|---|---|
| | V | W | X | Y | Z | AA | BB |
| $SiO_2$ | 66.81 | 63.67 | 67.14 | 63.84 | 62.85 | 62.10 | 67.44 |
| $Al_2O_3$ | 11.01 | 10.02 | 10.09 | 10.03 | 11.00 | 12.06 | 10.12 |
| $P_2O_5$ | 3.98 | 6.89 | 3.76 | 6.98 | 6.95 | 6.86 | 3.70 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Na_2O$ | 0.27 | 0.11 | 0.10 | 0.14 | 0.14 | 0.15 | 0.13 |
| $K_2O$ | 13.98 | 13.16 | 12.89 | 14.01 | 14.03 | 13.84 | 13.82 |
| $Rb_2O$ | 0.00 | 0.00 | 0.00 | 0.00 | 0.00 | 0.00 | 0.00 |
| MgO | 0.00 | 6.15 | 6.02 | 0.00 | 0.00 | 0.00 | 0.00 |
| ZnO | 3.95 | 0.00 | 0.00 | 4.95 | 4.98 | 4.94 | 4.74 |
| $SnO_2$ | 0.00 | 0.00 | 0.00 | 0.06 | 0.05 | 0.06 | 0.05 |
| Density (g/cm$^3$) | 2.432 | 2.365 | 2.379 | 2.441 | 2.444 | 2.443 | 2.458 |
| CTE *10$^{-7}$ (1/° C.) | 88.2 | | 95.2 | 91.7 | 89.4 | 86.6 | 90.9 |
| Strain Pt. (° C.) | 714 | 706.7 | 767 | 663 | 665 | | 703 |
| Anneal Pt. (° C.) | 782 | 779.2 | 845 | 735 | 733 | | 769 |
| Softening Pt. (° C.) | 1040.8 | 1094.1 | 1161 | 1031.3 | | 1014.8 | 1073.3 |
| Stress optical coefficient (nm/mm/MPa) | 3.088 | 3.047 | 3.09 | 3.286 | 3.296 | 3.314 | 3.272 |
| Refractive index at 589.3 nm | 1.4918 | 1.4822 | 1.4866 | 1.4898 | 1.4904 | 1.4909 | 1.4945 |

| | Glass Composition | | | | | | |
|---|---|---|---|---|---|---|---|
| | CC | DD | EE | FF | GG | HH | II |
| $SiO_2$ | 65.78 | 65.03 | 63.99 | 63.24 | 62.03 | 66.84 | 66.15 |
| $Al_2O_3$ | 11.06 | 12.09 | 10.06 | 11.15 | 12.06 | 10.11 | 11.14 |
| $P_2O_5$ | 3.95 | 3.88 | 6.82 | 6.64 | 6.80 | 3.88 | 3.73 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Na_2O$ | 0.14 | 0.14 | 4.91 | 4.86 | 4.91 | 4.90 | 4.86 |
| $K_2O$ | 14.06 | 13.93 | 9.18 | 9.15 | 9.16 | 9.27 | 9.21 |
| $Rb_2O$ | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |

TABLE III-continued

| | | | | | | | |
|---|---|---|---|---|---|---|---|
| ZnO | 4.96 | 4.87 | 4.98 | 4.90 | 4.97 | 4.95 | 4.86 |
| $SnO_2$ | 0.06 | 0.05 | 0.06 | 0.06 | 0.06 | 0.05 | 0.05 |
| Density (g/cm³) | 2.459 | 2.458 | 2.449 | 2.454 | 2.454 | 2.468 | 2.472 |
| CTE *10⁻⁷ (1/° C.) | 86.9 | 90.7 | 92.3 | 91 | 88.7 | 90.8 | 91.1 |
| Strain Pt. (° C.) | | 752 | 650 | 646 | 644 | 635 | 658 |
| Anneal Pt. (° C.) | | 821 | 727 | 724 | 719 | 708 | 733 |
| Softening Pt. (° C.) | | 1049 | 1010.6 | 996.7 | 984 | 100.8 | 1008.2 |
| Stress optical coefficient (nm/mm/MPa) | 3.265 | 3.309 | 3.242 | 3.224 | 3.244 | 3.304 | 3.31 |
| Refractive index at 589.3 nm | 1.4944 | 1.4951 | 1.4907 | 1.4921 | 1.4928 | 1.4956 | 1.4972 |

| | Glass Composition | | | | | | |
|---|---|---|---|---|---|---|---|
| | JJ | KK | LL | MM | NN | OO | PP |
| $SiO_2$ | 64.93 | 65.68 | 62.95 | 60.95 | 64.95 | 62.95 | 60.95 |
| $Al_2O_3$ | 12.11 | 10.00 | 10.00 | 10.00 | 8.00 | 8.00 | 8.00 |
| $P_2O_5$ | 3.89 | 6.96 | 7.00 | 7.00 | 7.00 | 7.00 | 7.00 |
| $B_2O_3$ | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Na_2O$ | 4.90 | 0.20 | 2.00 | 4.00 | 2.00 | 4.00 | 6.00 |
| $K_2O$ | 9.20 | 14.18 | 15.00 | 15.00 | 15.00 | 15.00 | 15.00 |
| $Rb_2O$ | 0.00 | 0.00 | 0.00 | 0.00 | 0.00 | 0.00 | 0.00 |
| MgO | 0.00 | 0.02 | 0.00 | 0.00 | 0.00 | 0.00 | 0.00 |
| ZnO | 4.92 | 2.91 | 3.00 | 3.00 | 3.00 | 3.00 | 3.00 |
| $SnO_2$ | 0.06 | 0.05 | 0.05 | 0.05 | 0.05 | 0.05 | 0.05 |
| Density (g/cm³) | 2.475 | 2.403 | | | | | |
| CTE *10⁻⁷ (1/° C.) | 89.6 | | | | | | |
| Strain Pt. (° C.) | 684 | 595 | | | | | |
| Anneal Pt. (° C.) | 758 | 654 | | | | | |
| Softening Pt. (° C.) | 1001.8 | 979.6 | | | | | |
| Stress optical coefficient (nm/mm/MPa) | | | | | | | |
| Refractive index at 589.3 nm | 1.498 | | | | | | |

| | Glass Composition | | | | | | |
|---|---|---|---|---|---|---|---|
| | QQ | RR | SS | TT | UU | VV | WW |
| $SiO_2$ | 64.12 | 62.23 | 60.52 | 66.10 | 64.31 | 62.63 | 69.95 |
| $Al_2O_3$ | 10.07 | 10.06 | 10.10 | 8.02 | 8.07 | 8.10 | 5.00 |
| $P_2O_5$ | 6.79 | 6.78 | 6.71 | 6.80 | 6.77 | 6.75 | 7.00 |
| $B_2O_3$ | 1.95 | 3.84 | 5.83 | 1.96 | 3.87 | 5.71 | 0.00 |
| $Li_2O$ | 0.00 | 0.00 | 0.00 | 0.00 | 0.00 | 0.00 | 0.00 |
| $Na_2O$ | 0.14 | 0.14 | 0.14 | 0.14 | 0.14 | 0.14 | 0.00 |
| $K_2O$ | 14.03 | 14.02 | 13.76 | 14.05 | 13.88 | 13.72 | 15.00 |
| $Rb_2O$ | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| ZnO | 2.85 | 2.88 | 2.89 | 2.88 | 2.90 | 2.91 | 3.00 |
| $SnO_2$ | 0.05 | 0.05 | 0.05 | 0.05 | 0.05 | 0.06 | 0.05 |
| Density (g/cm³) | 2.404 | 2.407 | 2.402 | 2.403 | 2.408 | 2.406 | |
| CTE *10⁻⁷ (1/° C.) | 86.5 | 86.8 | 86.4 | 88.6 | 87.3 | 86.9 | |
| Strain Pt. (° C.) | 560 | | | | 545 | | |
| Anneal Pt. (° C.) | 614 | | | | 595 | | |
| Softening Pt. (° C.) | 921.5 | 877.6 | 843.5 | 946.1 | 888.1 | 858.9 | |

TABLE III-continued

| | | | | | | |
|---|---|---|---|---|---|---|
| Stress optical coefficient (nm/mm/MPa) | 3.373 | 3.331 | 3.257 | 3.445 | 3.339 | 3.29 |
| Refractive index at 589.3 nm | 1.4868 | 1.488 | 1.4886 | 1.4856 | 1.4877 | 1.4888 |

| | Glass Composition | | | | | | |
|---|---|---|---|---|---|---|---|
| | XX | YY | ZZ | AAA | BBB | CCC | DDD |
| SiO$_2$ | 69.95 | 69.95 | 69.95 | 69.95 | 69.95 | 62.54 | 63.56 |
| Al$_2$O$_3$ | 3.00 | 1.00 | 3.00 | 1.00 | 4.00 | 11.02 | 10.52 |
| P$_2$O$_5$ | 7.00 | 7.00 | 7.00 | 7.00 | 7.00 | 8.46 | 8.47 |
| B$_2$O$_3$ | 2.00 | 4.00 | 0.00 | 0.00 | 0.00 | 0.00 | 0.00 |
| Li$_2$O | 0.00 | 0.00 | 0.00 | 0.00 | 0.00 | 0.00 | 0.00 |
| Na$_2$O | 0.00 | 0.00 | 2.00 | 4.00 | 0.00 | 0.20 | 0.18 |
| K$_2$O | 15.00 | 15.00 | 15.00 | 15.00 | 15.00 | 15.75 | 15.74 |
| Rb$_2$O | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| ZnO | 3.00 | 3.00 | 3.00 | 3.00 | 4.00 | 1.97 | 1.47 |
| SnO$_2$ | 0.05 | 0.05 | 0.05 | 0.05 | 0.05 | 0.05 | 0.05 |
| Density (g/cm$^3$) | | | | | | 2.397 | 2.388 |
| CTE *10$^{-7}$ (1/° C.) | | | | | | 93.7 | 94.6 |
| Strain Pt. (° C.) | | | | | | 565 | 555 |
| Anneal Pt. (° C.) | | | | | | 625 | 615 |
| Softening Pt. (° C.) | | | | | | 946.8 | |
| Stress optical coefficient (nm/mm/MPa) | | | | | | 3.092 | 3.028 |
| Refractive index at 589.3 nm | | | | | | 1.4845 | 1.4833 |

| | Glass Composition | | | | | | |
|---|---|---|---|---|---|---|---|
| | EEE | FFF | GGG | HHH | III | JJJ | KKK |
| SiO$_2$ | 62.18 | 64.05 | 63.49 | 63.05 | 59.67 | 60.85 | 59.26 |
| Al$_2$O$_3$ | 11.07 | 10.53 | 11.02 | 11.55 | 11.05 | 10.56 | 11.09 |
| P$_2$O$_5$ | 8.39 | 6.96 | 6.97 | 6.96 | 8.40 | 8.38 | 8.39 |
| B$_2$O$_3$ | 0.00 | 0.00 | 0.00 | 0.00 | 2.95 | 2.96 | 2.93 |
| Li$_2$O | 0.00 | 0.00 | 0.00 | 0.00 | 0.00 | 0.00 | 0.00 |
| Na$_2$O | 0.22 | 0.22 | 0.22 | 0.21 | 0.20 | 0.18 | 0.22 |
| K$_2$O | 15.68 | 15.75 | 15.80 | 15.76 | 15.71 | 15.55 | 15.61 |
| Rb$_2$O | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| ZnO | 2.40 | 2.43 | 2.44 | 2.42 | 1.96 | 1.47 | 2.45 |
| SnO$_2$ | 0.05 | 0.05 | 0.05 | 0.05 | 0.06 | 0.05 | 0.05 |
| Density (g/cm$^3$) | 2.406 | 2.411 | 2.411 | 2.414 | 2.403 | 2.396 | 2.41 |
| CTE *10$^{-7}$ (1/° C.) | 93 | 93.1 | 92.7 | 91.8 | 93.3 | 93.4 | 93.3 |
| Strain Pt. (° C.) | 569 | 579 | 595 | 595 | | | |
| Anneal Pt. (° C.) | 629 | 638 | 658 | 658 | | | |
| Softening Pt. (° C.) | | 956.8 | 963.3 | 973.3 | | | |
| Stress optical coefficient (nm/mm/MPa) | 3.121 | 3.091 | 3.114 | | 3.188 | 3.126 | 3.258 |
| Refractive index at 589.3 nm | 1.485 | 1.4865 | 1.4869 | 1.4874 | 1.4872 | 1.486 | 1.4877 |

| | Glass Composition | | | | | | |
|---|---|---|---|---|---|---|---|
| | LLL | MMM | NNN | OOO | PPP | QQQ | RRR |
| SiO$_2$ | 61.27 | 60.86 | 60.12 | 60.11 | 59.05 | 60.87 | 60.43 |
| Al$_2$O$_3$ | 10.59 | 11.10 | 11.56 | 11.05 | 11.40 | 10.92 | 11.43 |
| P$_2$O$_5$ | 6.89 | 6.87 | 6.92 | 8.41 | 8.29 | 6.90 | 6.89 |
| B$_2$O$_3$ | 2.96 | 2.94 | 2.96 | 2.00 | 1.99 | 1.97 | 2.02 |
| Li$_2$O | 0.00 | 0.00 | 0.00 | 0.00 | 0.00 | 0.00 | 0.00 |
| Na$_2$O | 0.22 | 0.21 | 0.22 | 0.21 | 0.17 | 0.17 | 0.17 |
| K$_2$O | 15.57 | 15.54 | 15.72 | 15.72 | 16.62 | 16.69 | 16.60 |
| Rb$_2$O | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| ZnO | 2.45 | 2.43 | 2.45 | 2.44 | 2.42 | 2.43 | 2.41 |
| SnO$_2$ | 0.05 | 0.05 | 0.05 | 0.05 | 0.05 | 0.05 | 0.05 |

TABLE III-continued

|  |  |  |  |  |  |  |  |
|---|---|---|---|---|---|---|---|
| Density (g/cm³) | 2.415 | 2.413 | 2.414 | 2.411 | 2.418 | 2.423 | 2.422 |
| CTE *10⁻⁷ (1/° C.) | 93.2 | 92.2 | 92.7 |  |  |  |  |
| Strain Pt. (° C.) |  |  |  | 548.2 | 548 | 573.8 | 573.1 |
| Anneal Pt. (° C.) |  |  |  | 605.7 | 606.1 | 632.6 | 632.1 |
| Softening Pt. (° C.) |  |  |  |  |  |  |  |
| Stress optical coefficient (nm/mm/MPa) | 3.237 | 3.213 | 3.285 | 3.171 | 3.139 | 3.159 | 3.146 |
| Refractive index at 589.3 nm | 1.4892 | 1.4897 | 1.4895 | 1.475 | 1.4884 | 1.49 | 1.4903 |

|  | Glass Composition | | | | | | |
|---|---|---|---|---|---|---|---|
|  | SSS | TTT | UUU | VVV | WWW | XXX | YYY |
| SiO₂ | 62.44 | 61.97 | 61.52 | 63.44 | 60.95 | 61.00 | 64.14 |
| Al₂O₃ | 10.94 | 11.46 | 14.94 | 10.98 | 12.99 | 11.01 | 11.58 |
| P₂O₅ | 5.40 | 5.37 | 4.83 | 6.56 | 5.65 | 6.72 | 3.92 |
| B₂O₃ | 2.01 | 2.01 | 0.00 | 0.00 |  | 2.33 | 1.96 |
| Li₂O | 0.00 | 0.00 | 4.98 | 2.48 | 1.98 |  |  |
| Na₂O | 0.16 | 0.17 | 0.03 | 0.05 |  | 0.08 | 0.10 |
| K₂O | 16.57 | 16.56 | 13.63 | 16.44 | 18.43 | 16.35 | 15.75 |
| Rb₂O | 0.00 | 0.00 | 0.00 | 0.00 |  |  |  |
| MgO | 0.00 | 0.00 | 0.00 | 0.00 |  |  | 0.02 |
| ZnO | 2.41 | 2.41 | 0.00 | 0.00 |  | 2.47 | 2.48 |
| SnO₂ | 0.05 | 0.05 | 0.06 | 0.05 |  | 0.05 | 0.06 |
| Density (g/cm³) | 2.431 | 2.429 | 2.398 | 2.384 | 2.405 | 2.489 | 2.43 |
| CTE *10⁻⁷ (1/° C.) |  |  |  |  |  |  |  |
| Strain Pt. (° C.) | 593.6 | 598.7 |  | 641.7 | 651.2 | 564 | 618.5 |
| Anneal Pt. (° C.) | 651.3 | 656.9 |  | 704.1 | 713.3 | 622 | 678.5 |
| Softening Pt. (° C.) |  |  |  |  |  |  |  |
| Stress optical coefficient (nm/mm/MPa) | 3.131 | 3.679 |  | 2.897 | 2.888 | 3.147 |  |
| Refractive index at 589.3 nm | 1.4923 | 1.492 |  | 1.487 | 1.4905 | 1.4905 |  |

|  | Glass Composition ZZZ |
|---|---|
| SiO₂ | 64.09 |
| Al₂O₃ | 11.57 |
| P₂O₅ | 3.91 |
| B₂O₃ | 0.00 |
| Li₂O |  |
| Na₂O | 0.10 |
| K₂O | 15.78 |
| Rb₂O |  |
| MgO | 2.26 |
| ZnO | 2.23 |
| SnO₂ | 0.06 |
| Density (g/cm³) | 2.44 |
| CTE *10⁻⁷ (1/° C.) |  |
| Strain Pt. (° C.) | 706.1 |
| Anneal Pt. (° C.) | 770.5 |
| Softening Pt. (° C.) |  |
| Stress optical coefficient (nm/mm/MPa) |  |
| Refractive index at 589.3 nm |  |

Samples having the compositions shown in Table III were exposed to water vapor containing environments to form glass articles having compressive stress layers. The sample composition and thickness as well as the environment the samples were exposed to, including the temperature, pressure, and exposure time are shown in Table IV below. Each of the treatment environments were saturated with water vapor. The resulting maximum compressive stress and depth of compression as measured by surface stress meter (FSM) is also reported in Table IV.

TABLE IV

| Glass Composition | Thickness (mm) | Temperature (° C.) | Pressure (MPa) | Time (h) | Compressive Stress (MPa) | Depth of Compression (microns) |
|---|---|---|---|---|---|---|
| A | 0.5 | 150 | 0.1 | 168 | 275 | 42 |
|   | 1 | 200 | 0.1 | 168 | 137 | 99 |
|   | 1 | 200 | 0.1 | 121 | 170 | 75 |
|   | 1 | 200 | 0.1 | 72 | 159 | 68 |
|   | 1 | 250 | 0.6 | 15 | 203 | 80 |
|   | 1 | 300 | 0.1 | 168 | 10 | 84 |
|   | 1 | 300 | 0.1 | 72 | 33 | 131 |
|   | 1 | 150 | 0.5 | 6 | 433 | 11 |
| B | 1 | 150 | 0.1 | 168 | 267 | 7 |
|   | 1 | 200 | 0.1 | 72 | 145 | 14 |
|   | 1 | 250 | 0.6 | 15 | 201 | 16 |
|   | 1 | 300 | 0.1 | 168 | 61 | 59 |
|   | 1 | 300 | 0.1 | 72 | 63 | 48 |
| C | 1 | 150 | 0.1 | 168 | 291 | 10 |
|   | 1 | 200 | 0.1 | 72 | 102 | 23 |
|   | 1 | 200 | 1.6 | 6 | 304 | 12 |
|   | 1 | 250 | 0.6 | 15 | 288 | 28 |
|   | 1 | 300 | 0.1 | 168 | 24 | 102 |
|   | 1 | 300 | 0.1 | 72 | 19 | 94 |
| D | 1 | 150 | 0.1 | 168 | 272 | 38 |
|   | 1 | 200 | 0.1 | 72 | 161 | 62 |
|   | 1 | 300 | 0.1 | 168 | 19 | 101 |
|   | 1 | 300 | 0.1 | 72 | 42 | 187 |
| E | 1 | 200 | 0.1 | 168 | 140 | 92 |
| F | 1 | 200 | 0.1 | 168 | 162 | 100 |
| G | 1 | 200 | 0.1 | 168 | 182 | 72 |
| H | 1 | 200 | 0.1 | 168 | 196 | 57 |
|   | 1 | 150 | 0.5 | 4 | 471 | 10 |
|   | 1 | 175 | 0.76 | 72 | 390 | 36 |
|   | 1 | 175 | 1 | 2 | 426 | 13 |
|   | 1 | 175 | 1 | 4 | 428 | 17 |
|   | 1 | 175 | 1 | 16 | 404 | 23 |
|   | 1 | 175 | 1 | 72 | 360 | 44 |
|   | 1 | 200 | 1.6 | 4 | 400 | 20 |
|   | 1 | 200 | 1.6 | 6 | 394 | 22 |
|   | 1 | 200 | 1.6 | 16 | 358 | 33 |
| J | 1 | 200 | 0.1 | 168 | 201 | 52 |
|   | 1 | 175 | 0.76 | 72 | 407 | 34 |
|   | 1 | 175 | 0.76 | 240 | 369 | 55 |
|   | 1 | 175 | 1 | 6 | 414 | 11.1 |
|   | 1 | 175 | 1 | 9 | 414 | 18 |
|   | 1 | 175 | 1 | 16 | 397 | 21 |
|   | 1 | 175 | 1 | 72 | 372 | 39 |
|   | 1 | 200 | 1.6 | 4 | 403 | 18 |
|   | 1 | 200 | 1.6 | 6 | 408 | 20 |
|   | 1 | 200 | 1.6 | 9 | 403 | 24 |
|   | 1 | 200 | 1.6 | 16 | 373 | 30 |
| K | 1 | 200 | 0.1 | 168 | 167 | 21 |
|   | 1 | 175 | 1 | 6 | 324 | 5.1 |
|   | 1 | 150 | 0.4 | 16 | 443 | 5 |
|   | 1 | 150 | 0.4 | 64 | 397 | 8 |
|   | 1 | 175 | 0.76 | 72 | 396 | 15 |
|   | 1 | 175 | 1 | 9 | 375 | 8 |
|   | 1 | 175 | 1 | 16 | 351 | 10 |
|   | 1 | 200 | 1.6 | 6 | 397 | 8 |
|   | 1 | 200 | 1.6 | 9 | 342 | 11 |
|   | 1 | 200 | 1.6 | 16 | 355 | 15 |
|   | 1 | 250 | 0.6 | 15 | 258 | 22 |
|   | 1 | 250 | 4 | 4 | 371 | 17 |
|   | 1 | 250 | 4 | 6 | 358 | 18 |
|   | 1 | 250 | 4 | 9 | 350 | 25 |
|   | 1 | 250 | 4 | 15 | 350 | 28 |
|   | 1 | 250 | 4 | 16 | 336 | 31 |
|   | 1 | 275 | 6 | 6 | 326 | 27 |
|   | 1 | 275 | 6 | 9 | 298 | 35 |
|   | 1 | 300 | 2.6 | 98 | 209 | 99 |
| L | 1 | 200 | 0.1 | 168 | 184 | 18 |
|   | 1 | 175 | 0.76 | 72 | 408 | 10 |
|   | 1 | 200 | 1.6 | 6 | 375 | 7 |

TABLE IV-continued

| Glass Composition | Thickness (mm) | Temperature (° C.) | Pressure (MPa) | Time (h) | Compressive Stress (MPa) | Depth of Compression (microns) |
|---|---|---|---|---|---|---|
| | 1 | 200 | 1.6 | 9 | 353 | 9 |
| | 1 | 250 | 4 | 6 | 352 | 15 |
| | 1 | 250 | 4 | 15 | 347 | 23 |
| | 1 | 275 | 6 | 6 | 351 | 22 |
| M | 1 | 200 | 0.1 | 168 | 175 | 14 |
| | 1 | 175 | 0.76 | 72 | 447 | 8 |
| | 1 | 200 | 1.6 | 6 | 397 | 8 |
| | 1 | 200 | 1.6 | 9 | 427 | 6 |
| | 1 | 250 | 4 | 6 | 364 | 12 |
| | 1 | 250 | 4 | 15 | 344 | 20 |
| | 1 | 275 | 6 | 6 | 310 | 21 |
| | 1 | 275 | 6 | 9 | 287 | 24 |
| N | 1 | 200 | 0.1 | 168 | 95 | 95 |
| O | 1 | 200 | 0.1 | 168 | 52 | 100 |
| P | 1 | 200 | 0.1 | 168 | 117 | 100 |
| | 1 | 150 | 0.5 | 4 | 310 | 18 |
| Q | 1 | 200 | 0.1 | 168 | 165 | 84 |
| R | 1 | 200 | 0.1 | 168 | 202 | 40 |
| | 1 | 200 | 1.6 | 6 | 330 | 17 |
| | 1 | 225 | 2.6 | 6 | 178 | 16 |
| S | 1 | 200 | 0.1 | 168 | 129 | 62 |
| | 1 | 150 | 0.4 | 4 | 369 | 8 |
| | 1 | 150 | 0.4 | 169 | 351 | 32 |
| | 1 | 150 | 0.5 | 9 | 379 | 11 |
| | 1 | 200 | 1.46 | 4 | 347 | 19 |
| | 1 | 200 | 1.46 | 6 | 369 | 20 |
| | 1 | 200 | 1.6 | 6 | 321 | 21 |
| | 1 | 225 | 2.6 | 6 | 285 | 27 |
| | 1 | 225 | 2.6 | 48 | 187 | 75 |
| | 1 | 250 | 0.6 | 15 | 297 | 42 |
| | 1 | 250 | 1.1 | 15 | 263 | 48 |
| | 1 | 250 | 4 | 6 | 198 | 42 |
| | 1 | 250 | 4 | 6 | 217 | 44 |
| T | 1 | 200 | 0.1 | 168 | 137 | 47 |
| | 1 | 150 | 0.4 | 4 | 345 | 7 |
| | 1 | 150 | 0.4 | 169 | 332 | 26 |
| | 1 | 150 | 0.5 | 9 | 334 | 9 |
| | 1 | 150 | 0.5 | 16 | 302 | 13 |
| | 1 | 175 | 0.76 | 4 | 357 | 10 |
| | 1 | 175 | 0.76 | 6 | 334 | 12 |
| | 1 | 175 | 0.76 | 16 | 338 | 17 |
| | 1 | 175 | 0.76 | 32 | 338 | 20 |
| | 1 | 175 | 0.76 | 72 | 344 | 29 |
| | 1 | 175 | 1 | 9 | 342 | 15 |
| | 1 | 175 | 1 | 72 | 305 | 34 |
| | 1 | 200 | 1.46 | 4 | 363 | 15 |
| | 1 | 200 | 1.46 | 6 | 343 | 17 |
| | 1 | 200 | 1.6 | 4 | 318 | 16 |
| | 1 | 200 | 1.6 | 6 | 332 | 17 |
| | 1 | 200 | 1.6 | 9 | 314 | 20 |
| | 1 | 200 | 1.6 | 16 | 304 | 26 |
| | 1 | 225 | 2.6 | 6 | 318 | 23 |
| | 1 | 225 | 2.6 | 48 | 241 | 55 |
| | 1 | 250 | 0.6 | 15 | 256 | 34 |
| | 1 | 250 | 1.1 | 15 | 270 | 38 |
| | 1 | 250 | 4 | 4 | 278 | 30 |
| | 1 | 250 | 4 | 6 | 266 | 32 |
| | 1 | 250 | 4 | 15 | 236 | 52 |
| U | 1 | 200 | 0.1 | 168 | 130 | 64 |
| | 1 | 150 | 0.4 | 4 | 377 | 11 |
| | 1 | 150 | 0.5 | 9 | 378 | 13 |
| | 1 | 200 | 1.46 | 4 | 335 | 22 |
| | 1 | 200 | 1.46 | 6 | 331 | 25 |
| | 1 | 200 | 1.6 | 6 | 327 | 22 |
| | 1 | 225 | 2.6 | 6 | 305 | 29 |
| | 1 | 250 | 0.6 | 15 | 272 | 44 |
| | 1 | 250 | 1.1 | 15 | 268 | 52 |
| | 1 | 250 | 4.1 | 6 | 265 | 43 |
| V | 1 | 200 | 0.1 | 168 | 172 | 42 |
| | 1 | 150 | 0.4 | 4 | 357 | 6 |
| | 1 | 150 | 0.4 | 169 | 393 | 23 |
| | 1 | 150 | 0.5 | 9 | 428 | 8 |
| | 1 | 150 | 0.5 | 16 | 346 | 12 |
| | 1 | 175 | 0.76 | 72 | 385 | 26 |
| | 1 | 175 | 0.76 | 240 | 369 | 42 |
| | 1 | 175 | 1 | 9 | 395 | 14 |

TABLE IV-continued

| Glass Composition | Thickness (mm) | Temperature (° C.) | Pressure (MPa) | Time (h) | Compressive Stress (MPa) | Depth of Compression (microns) |
|---|---|---|---|---|---|---|
| | 1 | 175 | 1 | 72 | 360 | 30 |
| | 1 | 200 | 1.46 | 4 | 408 | 14 |
| | 1 | 200 | 1.46 | 6 | 395 | 15 |
| | 1 | 200 | 1.6 | 6 | 395 | 13 |
| | 1 | 200 | 1.6 | 16 | 351 | 23 |
| | 1 | 225 | 2.6 | 6 | 381 | 20 |
| | 1 | 225 | 2.6 | 48 | 305 | 49 |
| | 1 | 250 | 0.6 | 15 | 321 | 31 |
| | 1 | 250 | 1.1 | 15 | 330 | 33 |
| | 1 | 250 | 4 | 4 | 332 | 26 |
| | 1 | 250 | 4 | 6 | 327 | 27 |
| | 1 | 250 | 4 | 15 | 291 | 46 |
| W | 1 | 200 | 0.1 | 168 | 119 | 58 |
| | 1 | 175 | 1 | 4 | 304 | 17 |
| | 1 | 175 | 1 | 9 | 330 | 19 |
| | 1 | 200 | 1.6 | 6 | 304 | 22 |
| | 1 | 200 | 1.6 | 16 | 277 | 34 |
| X | 1 | 200 | 0.1 | 168 | 131 | 44 |
| | 1 | 175 | 1 | 9 | 328 | 13 |
| | 1 | 200 | 1.6 | 6 | 342 | 16 |
| CC | 1 | 150 | 0.4 | 16 | 339 | 9 |
| | 1 | 150 | 0.4 | 64 | 368 | 15 |
| | 1 | 175 | 0.76 | 72 | 322 | 25 |
| | 1 | 175 | 1 | 16 | 340 | 16 |
| | 1 | 175 | 1 | 72 | 339 | 28 |
| | 1 | 200 | 1.6 | 16 | 346 | 22 |
| | 1 | 250 | 4 | 4 | 312 | 27 |
| | 1 | 250 | 4 | 9 | 313 | 34 |
| | 1 | 250 | 4 | 16 | 284 | 43 |
| DD | 1 | 175 | 1 | 4 | 343 | 11 |
| EE | 1 | 175 | 0.76 | 16 | 352 | 11 |
| | 1 | 175 | 0.76 | 32 | 349 | 14 |
| | 1 | 175 | 0.76 | 240 | 327 | 34 |
| | 1 | 175 | 1 | 4 | 343 | 9 |
| | 1 | 175 | 1 | 16 | 331 | 13 |
| | 1 | 200 | 1.6 | 4 | 348 | 12 |
| | 1 | 200 | 1.6 | 9 | 313 | 16 |
| | 1 | 200 | 1.6 | 16 | 312 | 20 |
| | 1 | 250 | 4 | 4 | 250 | 24 |
| | 1 | 300 | 2.6 | 24 | 156 | 62 |
| FF | 1 | 175 | 0.76 | 16 | 354 | 10 |
| | 1 | 175 | 0.76 | 32 | 359 | 13 |
| | 1 | 175 | 0.76 | 240 | 291 | 33 |
| | 1 | 175 | 1 | 4 | 341 | 8 |
| | 1 | 175 | 1 | 16 | 350 | 12 |
| | 1 | 200 | 1.6 | 9 | 332 | 15 |
| | 1 | 200 | 1.6 | 16 | 324 | 18 |
| | 1 | 250 | 4 | 4 | 266 | 24 |
| | 1 | 300 | 2.6 | 24 | 180 | 63 |
| GG | 1 | 175 | 0.76 | 16 | 361 | 9 |
| | 1 | 175 | 0.76 | 32 | 371 | 12 |
| | 1 | 175 | 0.76 | 240 | 352 | 27 |
| | 1 | 175 | 1 | 4 | 351 | 7 |
| | 1 | 175 | 1 | 16 | 328 | 11 |
| | 1 | 200 | 1.6 | 9 | 363 | 10 |
| | 1 | 200 | 1.6 | 16 | 346 | 13 |
| | 1 | 250 | 4 | 4 | 338 | 16 |
| | 1 | 300 | 2.6 | 24 | 194 | 58 |
| HH | 1 | 175 | 0.76 | 16 | 376 | 7 |
| | 1 | 175 | 0.76 | 32 | 365 | 9 |
| | 1 | 175 | 0.76 | 72 | 369 | 13 |
| | 1 | 175 | 0.76 | 240 | 357 | 22 |
| | 1 | 175 | 1 | 4 | 345 | 5 |
| | 1 | 175 | 1 | 16 | 350 | 8 |
| | 1 | 200 | 1.6 | 4 | 348 | 8 |
| | 1 | 200 | 1.6 | 9 | 349 | 10 |
| | 1 | 200 | 1.6 | 16 | 343 | 12 |
| | 1 | 250 | 4 | 4 | 306 | 16 |
| | 1 | 300 | 2.6 | 24 | 159 | 49 |
| II | 0.7 | 150 | 0.4 | 64 | 399 | 7 |
| | 0.7 | 175 | 0.76 | 72 | 381 | 12 |
| | 0.7 | 175 | 1 | 16 | 345 | 8 |
| | 0.7 | 200 | 1.6 | 16 | 360 | 12 |
| | 0.7 | 225 | 2.6 | 16 | 335 | 18 |
| | 0.7 | 250 | 4 | 4 | 322 | 16 |
| | 0.7 | 250 | 4 | 9 | 305 | 22 |

TABLE IV-continued

| Glass Composition | Thickness (mm) | Temperature (° C.) | Pressure (MPa) | Time (h) | Compressive Stress (MPa) | Depth of Compression (microns) |
|---|---|---|---|---|---|---|
| | 0.7 | 250 | 4 | 16 | 270 | 29 |
| JJ | 1 | 175 | 0.76 | 16 | 361 | 7 |
| | 1 | 175 | 0.76 | 32 | 395 | 9 |
| | 1 | 175 | 0.76 | 72 | 392 | 12 |
| | 1 | 175 | 0.76 | 240 | 380 | 20 |
| | 1 | 175 | 1 | 4 | 358 | 5 |
| | 1 | 175 | 1 | 16 | 362 | 8 |
| | 1 | 200 | 1.6 | 4 | 343 | 8 |
| | 1 | 200 | 1.6 | 9 | 356 | 10 |
| | 1 | 200 | 1.6 | 16 | 358 | 12 |
| | 1 | 225 | 2.6 | 9 | 366 | 14 |
| | 1 | 225 | 2.6 | 16 | 356 | 18 |
| | 1 | 250 | 4 | 4 | 345 | 16 |
| | 1 | 275 | 6 | 9 | 285 | 33 |
| | 1 | 275 | 6 | 16 | 275 | 39 |
| | 1 | 300 | 2.6 | 24 | 244 | 43 |
| KK | 1 | 150 | 0.5 | 16 | 424 | 15 |
| | 1 | 175 | 1 | 9 | 376 | 20 |
| | 1 | 175 | 1 | 16 | 335 | 23 |
| QQ | 1 | 150 | 0.5 | 16 | 324 | 11 |
| | 1 | 150 | 0.5 | 72 | 330 | 18 |
| | 1 | 175 | 1 | 16 | 281 | 19 |
| | 1 | 200 | 1.6 | 18 | 280 | 24 |
| RR | 1 | 150 | 0.5 | 16 | 326 | 9 |
| | 1 | 150 | 0.5 | 72 | 334 | 14 |
| | 1 | 175 | 1 | 16 | 291 | 15 |
| | 1 | 200 | 1.6 | 18 | 287 | 19 |
| SS | 1 | 150 | 0.5 | 16 | 327 | 8 |
| | 1 | 150 | 0.5 | 72 | 354 | 10 |
| | 1 | 175 | 1 | 16 | 277 | 13 |
| | 1 | 200 | 1.6 | 18 | 297 | 16 |
| TT | 1 | 150 | 0.5 | 16 | 373 | 10 |
| | 1 | 150 | 0.5 | 72 | 353 | 15 |
| | 1 | 175 | 1 | 16 | 280 | 15 |
| | 1 | 200 | 1.6 | 18 | 245 | 20 |
| UU | 1 | 150 | 0.5 | 16 | 353 | 8 |
| | 1 | 150 | 0.5 | 72 | 279 | 12 |
| | 1 | 175 | 1 | 16 | 314 | 13 |
| | 1 | 200 | 1.6 | 18 | 276 | 17 |
| VV | 1 | 150 | 0.5 | 72 | 342 | 11 |
| | 1 | 175 | 1 | 16 | 273 | 11 |
| | 1 | 200 | 1.6 | 18 | 281 | 14 |
| CCC | 1 | 150 | 0.5 | 4 | 390 | 11 |
| | 1 | 150 | 0.5 | 16 | 291 | 22 |
| | 1 | 150 | 0.5 | 32 | 351 | 23 |
| | 1 | 150 | 0.5 | 72 | 337 | 28 |
| | 1 | 175 | 0.76 | 2 | 386 | 11 |
| | 1 | 175 | 0.76 | 4 | 363 | 15 |
| | 1 | 175 | 0.76 | 6 | 375 | 17 |
| | 1 | 175 | 0.76 | 16 | 323 | 24 |
| | 1 | 175 | 0.76 | 32 | 295 | 32 |
| | 1 | 175 | 1 | 2 | 374 | 15 |
| | 1 | 175 | 1 | 4 | 320 | 21 |
| | 1 | 200 | 1.6 | 18 | 178 | 32 |
| DDD | 1 | 150 | 0.5 | 4 | 372 | 12 |
| | 1 | 150 | 0.5 | 16 | 296 | 22 |
| | 1 | 150 | 0.5 | 32 | 359 | 23 |
| | 1 | 150 | 0.5 | 72 | 333 | 28 |
| | 1 | 175 | 0.76 | 2 | 392 | 12 |
| | 1 | 175 | 0.76 | 4 | 365 | 16 |
| | 1 | 175 | 0.76 | 6 | 342 | 18 |
| | 1 | 175 | 0.76 | 16 | 260 | 26 |
| | 1 | 175 | 0.76 | 32 | 139 | 44 |
| | 1 | 175 | 1 | 2 | 355 | 16 |
| | 1 | 175 | 1 | 4 | 295 | 22 |
| EEE | 1 | 150 | 0.5 | 16 | 316 | 20 |
| | 1 | 150 | 0.5 | 72 | 362 | 26 |
| | 1 | 175 | 0.76 | 2 | 394 | 11 |
| | 1 | 175 | 0.76 | 4 | 385 | 14 |
| | 1 | 175 | 0.76 | 6 | 368 | 16 |
| | 1 | 175 | 0.76 | 16 | 321 | 24 |
| | 1 | 175 | 0.76 | 32 | 290 | 31 |

TABLE IV-continued

| Glass Composition | Thickness (mm) | Temperature (° C.) | Pressure (MPa) | Time (h) | Compressive Stress (MPa) | Depth of Compression (microns) |
|---|---|---|---|---|---|---|
| | 1 | 175 | 1 | 2 | 363 | 14 |
| | 1 | 175 | 1 | 4 | 325 | 19 |
| | 1 | 200 | 1.6 | 18 | 279 | 35 |
| FFF | 1 | 200 | 1.6 | 18 | 294 | 32 |
| GGG | 1 | 150 | 0.5 | 4 | 365 | 12 |
| | 1 | 150 | 0.5 | 16 | 379 | 18 |
| | 1 | 150 | 0.5 | 32 | 390 | 20 |
| | 1 | 150 | 0.5 | 72 | 399 | 24 |
| | 1 | 175 | 0.76 | 2 | 450 | 9 |
| | 1 | 175 | 0.76 | 4 | 406 | 13 |
| | 1 | 175 | 1 | 2 | 394 | 13 |
| | 1 | 175 | 1 | 4 | 389 | 17 |
| | 1 | 200 | 1.6 | 18 | 299 | 33 |
| HHH | 1 | 150 | 0.5 | 72 | 394 | 24 |
| III | 1 | 150 | 0.5 | 16 | 349 | 11 |
| | 1 | 150 | 0.5 | 72 | 343 | 17 |
| | 1 | 175 | 1 | 2 | 343 | 11 |
| | 1 | 175 | 1 | 16 | 310 | 19 |
| | 1 | 200 | 1.6 | 18 | 262 | 26 |
| JJJ | 1 | 150 | 0.5 | 4 | 320 | 7 |
| | 1 | 150 | 0.5 | 16 | 382 | 10 |
| | 1 | 150 | 0.5 | 72 | 323 | 20 |
| | 1 | 175 | 0.76 | 2 | 388 | 8 |
| | 1 | 175 | 0.76 | 4 | 374 | 10 |
| | 1 | 175 | 0.76 | 6 | 338 | 12 |
| | 1 | 175 | 0.76 | 16 | 312 | 17 |
| | 1 | 175 | 0.76 | 32 | 322 | 22 |
| | 1 | 175 | 0.76 | 240 | 224 | 52 |
| | 1 | 200 | 1.6 | 16 | 188 | 26 |
| | 1 | 200 | 1.6 | 18 | 176 | 22 |
| | 1 | 300 | 2.6 | 96 | 77 | 48 |
| KKK | 1 | 150 | 0.5 | 72 | 334 | 17 |
| | 1 | 175 | 1 | 2 | 324 | 10 |
| | 1 | 175 | 1 | 4 | 332 | 14 |
| | 1 | 175 | 1 | 16 | 312 | 18 |
| | 1 | 200 | 1.6 | 4 | 294 | 17 |
| | 1 | 200 | 1.6 | 18 | 256 | 25 |
| LLL | 1 | 150 | 0.5 | 72 | 370 | 16 |
| | 1 | 175 | 1 | 2 | 364 | 10 |
| | 1 | 175 | 1 | 4 | 332 | 12 |
| | 1 | 175 | 1 | 16 | 336 | 16 |
| | 1 | 200 | 1.6 | 4 | 302 | 15 |
| | 1 | 200 | 1.6 | 18 | 289 | 22 |
| MMM | 1 | 150 | 0.5 | 16 | 338 | 10 |
| | 1 | 150 | 0.5 | 72 | 370 | 16 |
| | 1 | 175 | 1 | 2 | 355 | 10 |
| | 1 | 175 | 1 | 9 | 338 | 14 |
| | 1 | 175 | 1 | 16 | 343 | 17 |
| | 1 | 200 | 1.6 | 18 | 296 | 22 |
| NNN | 1 | 150 | 0.5 | 72 | 353 | 15 |
| | 1 | 175 | 1 | 2 | 348 | 12 |
| | 1 | 175 | 1 | 16 | 333 | 17 |
| | 1 | 200 | 1.6 | 18 | 300 | 22 |
| OOO | 1 | 150 | 0.4 | 9 | 379 | 9 |
| | 1 | 150 | 0.4 | 16 | 383 | 11 |
| | 1 | 150 | 0.4 | 64 | 346 | 19 |
| | 1 | 150 | 0.4 | 168 | 335 | 28 |
| | 1 | 175 | 1 | 2 | 365 | 11 |
| | 1 | 175 | 1 | 9 | 292 | 17 |
| | 1 | 175 | 1 | 16 | 308 | 21 |
| | 1 | 175 | 1 | 32 | 294 | 27 |
| | 1 | 200 | 1.6 | 4 | 289 | 19 |
| | 1 | 200 | 1.6 | 9 | 290 | 23 |
| | 1 | 200 | 1.6 | 16 | 243 | 31 |
| PPP | 1 | 150 | 0.4 | 9 | 399 | 9 |
| | 1 | 150 | 0.4 | 16 | 379 | 11 |
| | 1 | 150 | 0.4 | 64 | 356 | 20 |
| | 1 | 150 | 0.4 | 168 | 329 | 29 |
| | 1 | 150 | 0.5 | 4 | 342 | 9 |
| | 1 | 175 | 1 | 2 | 341 | 12 |
| | 1 | 175 | 1 | 4 | 310 | 16 |
| | 1 | 175 | 1 | 9 | 309 | 18 |
| | 1 | 175 | 1 | 16 | 307 | 21 |
| | 1 | 175 | 1 | 32 | 299 | 27 |
| | 1 | 175 | 1 | 72 | 229 | 41 |
| | 1 | 200 | 1.6 | 4 | 298 | 19 |

TABLE IV-continued

| Glass Composition | Thickness (mm) | Temperature (° C.) | Pressure (MPa) | Time (h) | Compressive Stress (MPa) | Depth of Compression (microns) |
|---|---|---|---|---|---|---|
| | 1 | 200 | 1.6 | 9 | 272 | 26 |
| | 1 | 200 | 1.6 | 16 | 263 | 32 |
| QQQ | 1 | 150 | 0.4 | 9 | 437 | 9 |
| | 1 | 150 | 0.4 | 16 | 417 | 9 |
| | 1 | 150 | 0.4 | 64 | 378 | 18 |
| | 1 | 200 | 1.6 | 4 | 325 | 17 |
| | 1 | 200 | 1.6 | 9 | 291 | 23 |
| | 1 | 200 | 1.6 | 16 | 274 | 29 |
| RRR | 1 | 150 | 0.4 | 9 | 447 | 9 |
| | 1 | 150 | 0.4 | 16 | 411 | 10 |
| | 1 | 150 | 0.4 | 64 | 373 | 18 |
| | 1 | 150 | 0.4 | 168 | 358 | 27 |
| | 1 | 175 | 0.76 | 2 | 385 | 8 |
| | 1 | 175 | 0.76 | 4 | 392 | 11 |
| | 1 | 175 | 0.76 | 6 | 377 | 12 |
| | 1 | 175 | 0.76 | 16 | 357 | 17 |
| | 1 | 175 | 0.76 | 32 | 338 | 22 |
| | 1 | 175 | 1 | 2 | 385 | 10 |
| | 1 | 175 | 1 | 4 | 365 | 14 |
| | 1 | 175 | 1 | 9 | 329 | 17 |
| | 1 | 175 | 1 | 16 | 337 | 20 |
| | 1 | 175 | 1 | 32 | 319 | 26 |
| | 1 | 175 | 1 | 72 | 263 | 36 |
| | 1 | 200 | 1.6 | 4 | 316 | 17 |
| | 1 | 200 | 1.6 | 9 | 316 | 22 |
| | 1 | 200 | 1.6 | 16 | 283 | 29 |
| SSS | 1 | 150 | 0.4 | 9 | 418 | 7 |
| | 1 | 150 | 0.4 | 16 | 427 | 9 |
| | 1 | 150 | 0.4 | 64 | 390 | 16 |
| | 1 | 150 | 0.4 | 168 | 382 | 24 |
| | 1 | 175 | 1 | 9 | 354 | 15 |
| | 1 | 175 | 1 | 16 | 372 | 17 |
| | 1 | 175 | 1 | 72 | 302 | 32 |
| | 1 | 200 | 1.6 | 4 | 343 | 16 |
| | 1 | 200 | 1.6 | 9 | 331 | 20 |
| | 1 | 200 | 1.6 | 16 | 300 | 25 |
| TTT | 1 | 150 | 0.4 | 9 | 378 | 7 |
| | 1 | 150 | 0.4 | 16 | 436 | 9 |
| | 1 | 150 | 0.4 | 64 | 396 | 16 |
| | 1 | 175 | 1 | 9 | 307 | 14 |
| | 1 | 200 | 1.6 | 4 | 351 | 15 |
| | 1 | 200 | 1.6 | 9 | 337 | 20 |
| | 1 | 200 | 1.6 | 16 | 314 | 25 |
| UUU | 1 | 150 | 0.4 | 16 | 443 | 5 |
| | 1 | 150 | 0.4 | 64 | 397 | 8 |
| | 1 | 150 | 0.4 | 168 | 408 | 12 |
| | 1 | 175 | 0.76 | 72 | 396 | 15 |
| | 1 | 175 | 1 | 6 | 324 | 5 |
| | 1 | 175 | 1 | 9 | 375 | 8 |
| | 1 | 175 | 1 | 16 | 351 | 10 |
| | 1 | 200 | 1.6 | 6 | 397 | 8 |
| | 1 | 200 | 1.6 | 9 | 342 | 11 |
| | 1 | 200 | 1.6 | 16 | 355 | 15 |
| | 1 | 200 | 1.6 | 32 | 373 | 18 |
| | 1 | 250 | 0.6 | 15 | 258 | 22 |
| | 1 | 250 | 4 | 4 | 371 | 17 |
| | 1 | 250 | 4 | 6 | 358 | 18 |
| | 1 | 250 | 4 | 9 | 350 | 25 |
| | 1 | 250 | 4 | 15 | 350 | 28 |
| | 1 | 250 | 4 | 16 | 336 | 31 |
| | 1 | 275 | 6 | 6 | 326 | 27 |
| | 1 | 275 | 6 | 9 | 298 | 35 |
| VVV | 1 | 150 | 0.4 | 16 | 473 | 7 |
| | 1 | 150 | 0.4 | 64 | 386 | 14 |
| | 1 | 150 | 0.4 | 169 | 404 | 21 |
| | 1 | 150 | 0.5 | 4 | 462 | 7 |
| | 1 | 175 | 0.76 | 4 | 375 | 5 |
| | 1 | 175 | 0.76 | 6 | 428 | 6 |
| | 1 | 175 | 0.76 | 16 | 384 | 8 |
| | 1 | 175 | 0.76 | 32 | 395 | 11 |
| | 1 | 175 | 0.76 | 72 | 407 | 15 |
| | 1 | 175 | 0.76 | 240 | 292 | 54 |
| | 1 | 175 | 1 | 4 | 364 | 12 |
| | 1 | 175 | 1 | 16 | 372 | 9 |
| | 1 | 175 | 1 | 32 | 327 | 27 |
| | 1 | 200 | 1.6 | 4 | 345 | 17 |

TABLE IV-continued

| Glass Composition | Thickness (mm) | Temperature (° C.) | Pressure (MPa) | Time (h) | Compressive Stress (MPa) | Depth of Compression (microns) |
|---|---|---|---|---|---|---|
|  | 1 | 200 | 1.6 | 9 | 296 | 24 |
|  | 1 | 200 | 1.6 | 16 | 302 | 29 |
|  | 1 | 225 | 2.6 | 4 | 304 | 24 |
|  | 1 | 225 | 2.6 | 16 | 247 | 36 |
|  | 1 | 250 | 4 | 4 | 178 | 31 |
|  | 1 | 300 | 2.6 | 96 | 212 | 99 |
| WWW | 1 | 150 | 0.4 | 16 | 472 | 7 |
|  | 1 | 150 | 0.4 | 64 | 442 | 14 |
|  | 1 | 175 | 0.76 | 72 | 418 | 14 |
|  | 1 | 175 | 1 | 16 | 357 | 9 |
|  | 1 | 200 | 1.6 | 9 | 352 | 22 |
|  | 1 | 200 | 1.6 | 16 | 320 | 26 |
|  | 1 | 225 | 2.6 | 4 | 375 | 13 |
|  | 1 | 225 | 2.6 | 16 | 373 | 20 |
|  | 1 | 250 | 4 | 4 | 169 | 27 |
|  | 1 | 300 | 2.6 | 24 | 72 | 98 |
| XXX | 1 | 150 | 0.4 | 169 | 361 | 25 |
|  | 1 | 150 | 0.5 | 4 | 381 | 7 |
|  | 1 | 175 | 0.76 | 2 | 369 | 8 |
|  | 1 | 175 | 0.76 | 72 | 330 | 29 |
|  | 1 | 175 | 0.76 | 240 | 297 | 50 |
|  | 1 | 175 | 1 | 2 | 402 | 10 |
|  | 1 | 175 | 1 | 4 | 351 | 14 |
|  | 1 | 175 | 1 | 9 | 340 | 15 |
|  | 1 | 175 | 1 | 16 | 341 | 19 |
|  | 1 | 175 | 1 | 32 | 322 | 24 |
|  | 1 | 175 | 1 | 72 | 285 | 34 |
|  | 1 | 200 | 1.6 | 4 | 332 | 17 |
|  | 1 | 200 | 1.6 | 9 | 296 | 22 |
|  | 1 | 200 | 1.6 | 16 | 275 | 28 |
|  | 1 | 250 | 0.6 | 32 | 196 | 53 |
| YYY | 1 | 150 | 0.4 | 169 | 383 | 19 |
|  | 1 | 150 | 0.5 | 32 | 377 | 12 |
|  | 1 | 175 | 0.76 | 240 | 342 | 36 |
|  | 1 | 175 | 1 | 2 | 348 | 8 |
|  | 1 | 175 | 1 | 16 | 361 | 14 |
|  | 1 | 175 | 1 | 32 | 352 | 18 |
|  | 1 | 175 | 1 | 72 | 342 | 25 |
|  | 1 | 200 | 1.6 | 4 | 358 | 13 |
|  | 1 | 200 | 1.6 | 9 | 354 | 16 |
|  | 1 | 200 | 1.6 | 16 | 346 | 21 |
|  | 1 | 225 | 2.6 | 4 | 343 | 19 |
|  | 1 | 250 | 4 | 2 | 280 | 27 |
| ZZZ | 1 | 150 | 0.4 | 169 | 384 | 20 |
|  | 1 | 150 | 0.5 | 32 | 361 | 12 |
|  | 1 | 175 | 1 | 16 | 359 | 14 |
|  | 1 | 175 | 1 | 32 | 358 | 19 |
|  | 1 | 175 | 1 | 72 | 355 | 25 |
|  | 1 | 200 | 1.6 | 4 | 370 | 13 |
|  | 1 | 200 | 1.6 | 9 | 354 | 16 |
|  | 1 | 200 | 1.6 | 16 | 344 | 20 |
|  | 1 | 225 | 2.6 | 4 | 349 | 19 |
|  | 1 | 250 | 4 | 4 | 292 | 28 |

Figure 4:
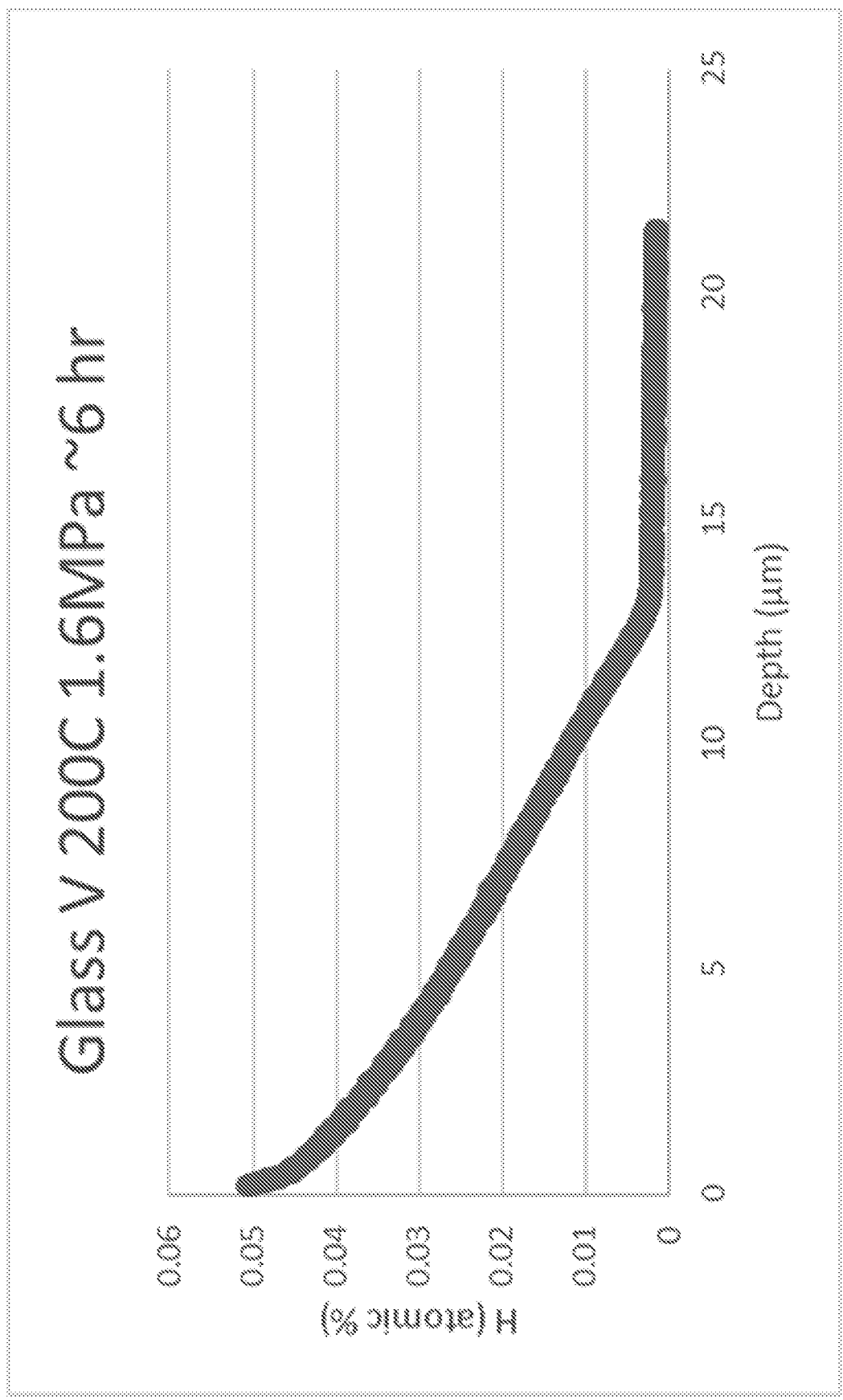
FIG. 4 is plot of hydrogen concentration as function of depth below a surface of a glass-based article according to an embodiment.
Figure 5:
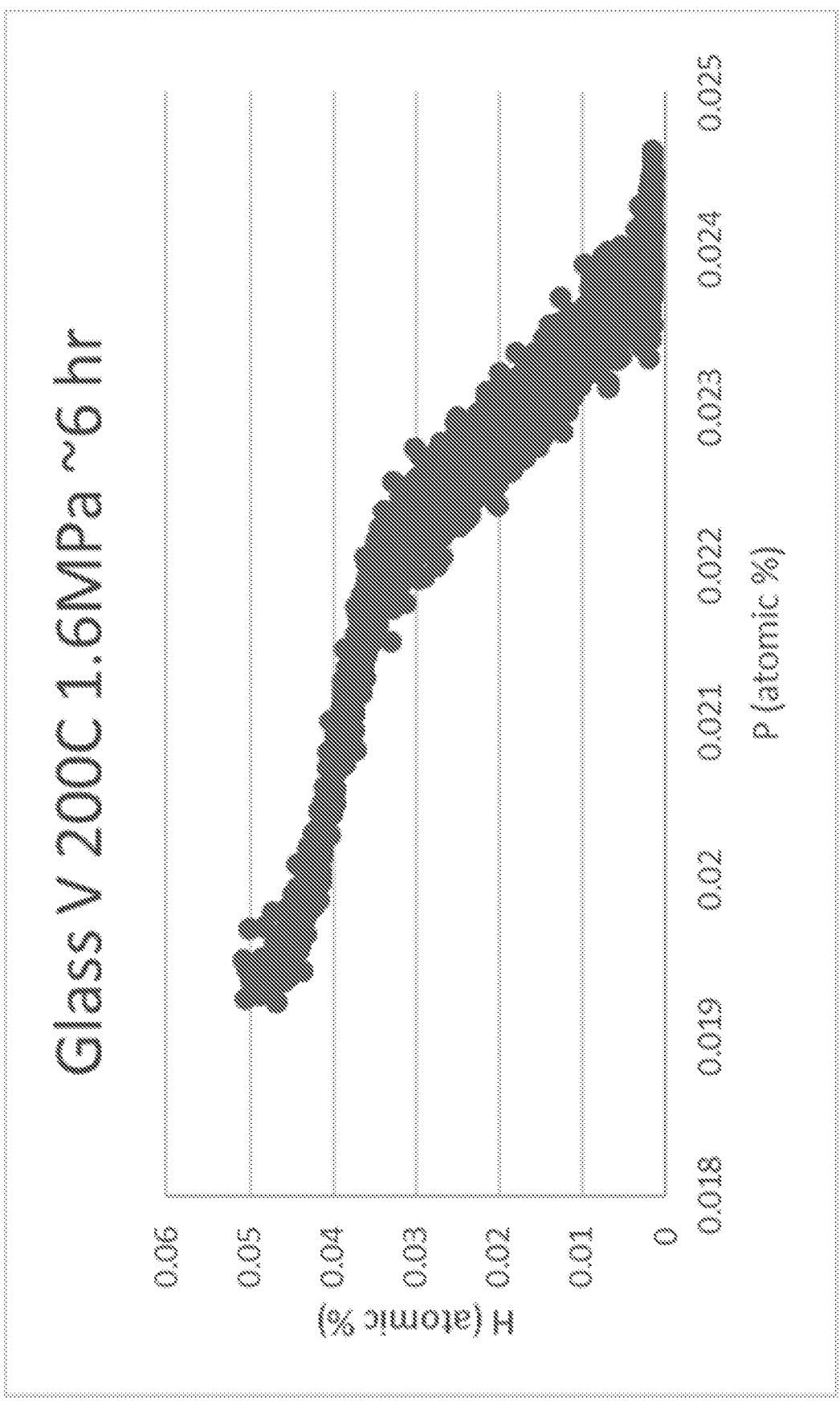
FIG. 5 is a plot of hydrogen concentration as a function of phosphorous concentration for the glass-based article of FIG. 4.

The hydrogen concentration as a function of depth for a sample having composition V that was treated in a 200° C. environment at a pressure of 1.6 MPa for 6 hours is shown in FIG. 4. The depth of compression was 13 µm and the maximum compressive stress was 395 MPa. The hydrogen concentration of the sample as a function of phosphorous concentration is shown in FIG. 5, which indicates that the region of the glass article enriched in hydrogen was depleted in phosphorous.

Figure 6:
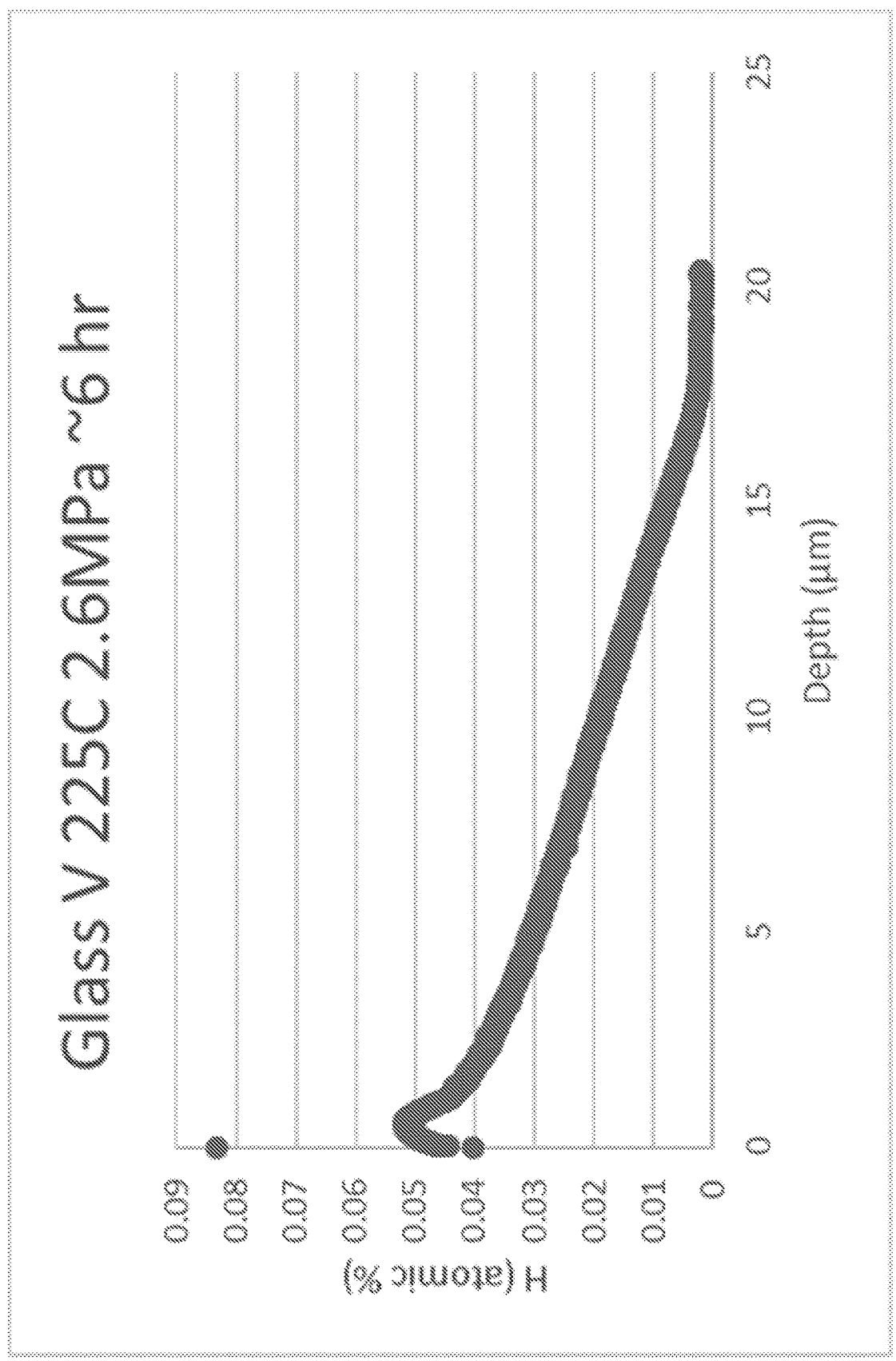
FIG. 6 is plot of hydrogen concentration as function of depth below a surface of a glass-based article according to an embodiment.
Figure 7:
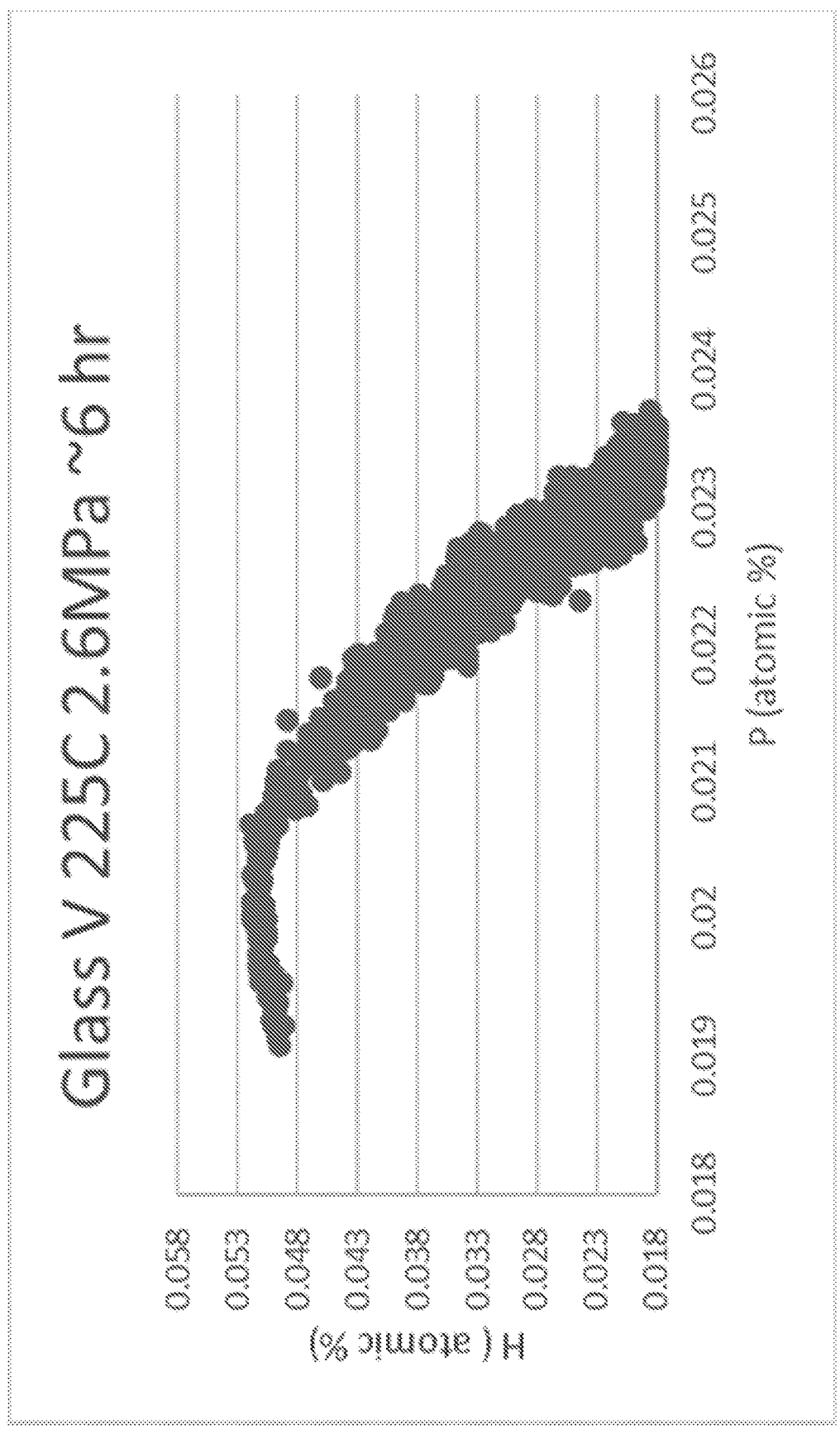
FIG. 7 is a plot of hydrogen concentration as a function of phosphorous concentration for the glass-based article of FIG. 6.

The hydrogen concentration as a function of depth for a sample having composition V that was treated in a 225° C. environment at a pressure of 2.6 MPa for 6 hours is shown in FIG. 6. The depth of compression was 20 µm and the maximum compressive stress was 381 MPa. The hydrogen concentration of the sample as a function of phosphorous concentration is shown in FIG. 7, which indicates that the region of the glass article enriched in hydrogen was depleted in phosphorous.

Figure 8:
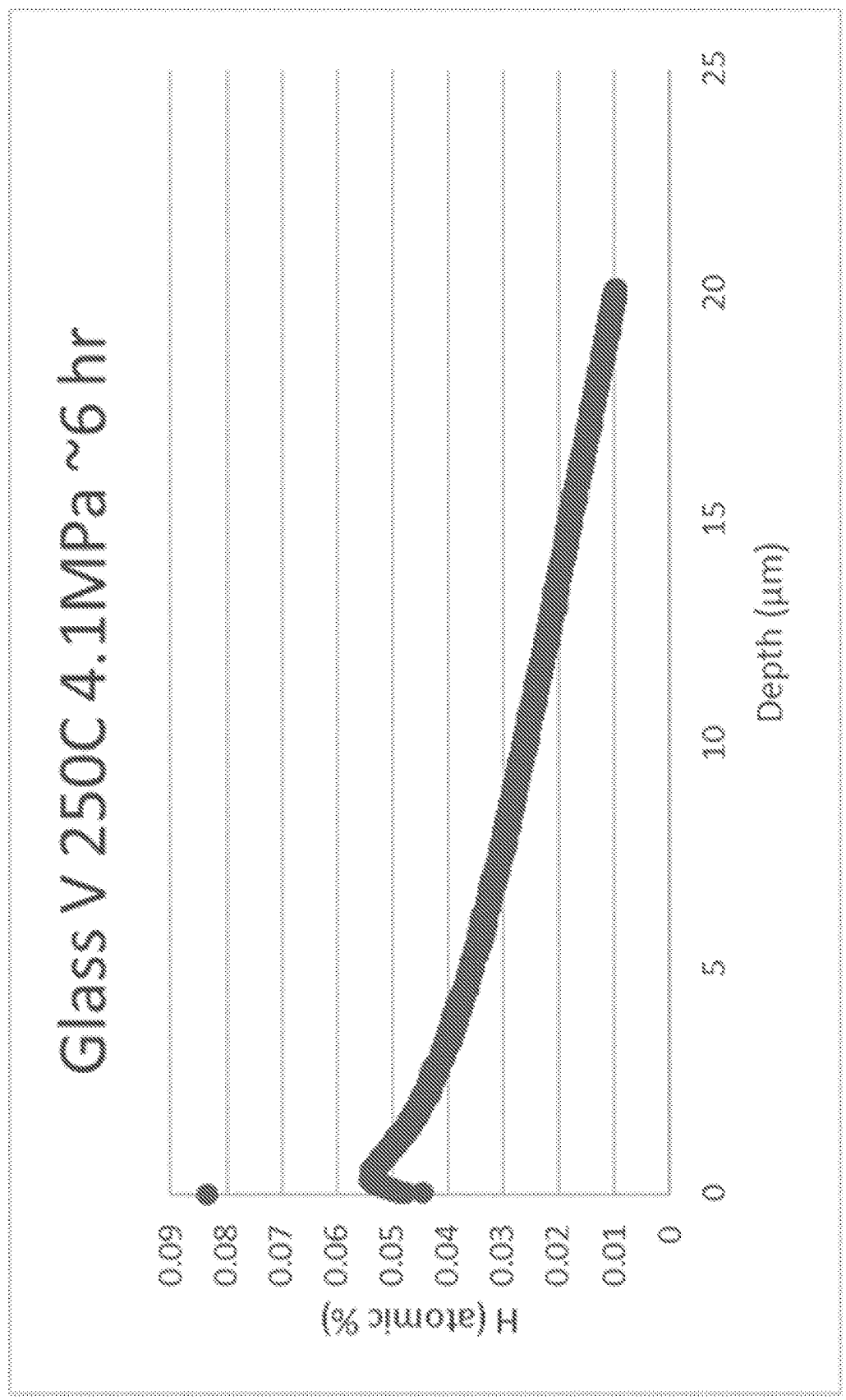
FIG. 8 is plot of hydrogen concentration as function of depth below a surface of a glass-based article according to an embodiment.
Figure 9:
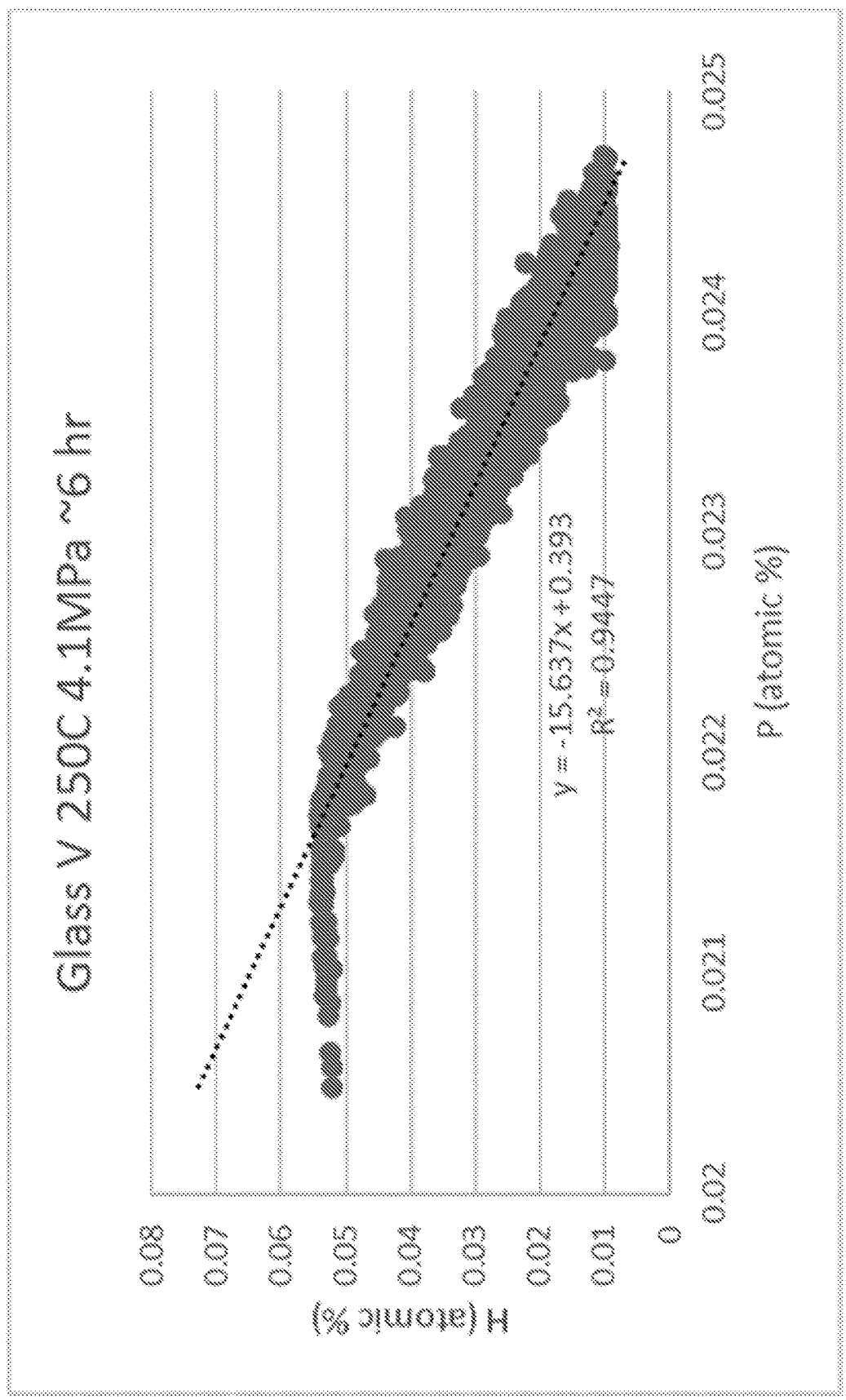
FIG. 9 is a plot of hydrogen concentration as a function of phosphorous concentration for the glass-based article of FIG. 8.

The hydrogen concentration as a function of depth for a sample having composition V that was treated in a 250° C. environment at a pressure of 4.1 MPa for 6 hours is shown in FIG. 8. The depth of compression was 27 µm and the maximum compressive stress was 327 MPa. The hydrogen concentration of the sample as a function of phosphorous concentration is shown in FIG. 9, which indicates that the region of the glass article enriched in hydrogen was depleted in phosphorous.

Figure 10:
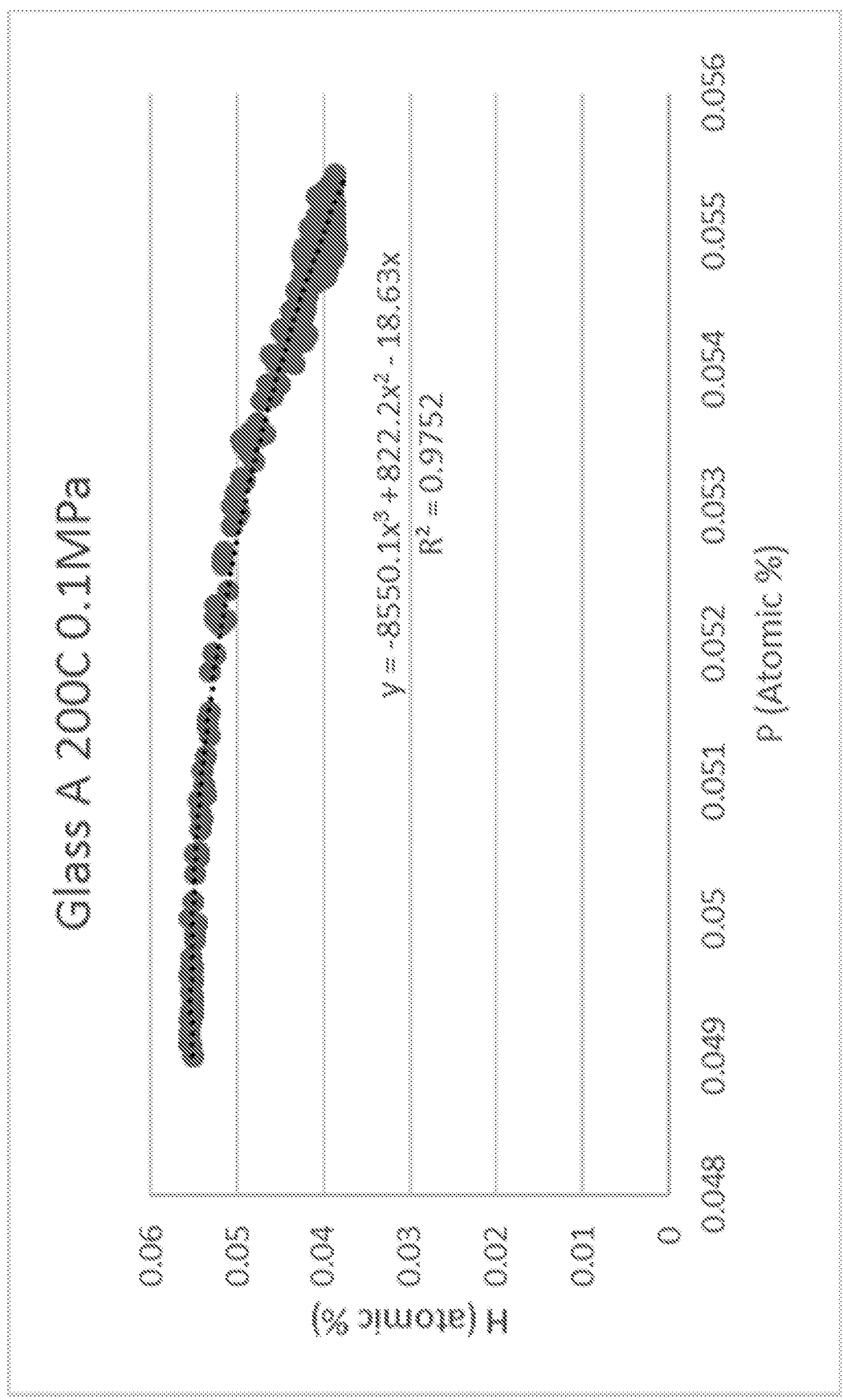
FIG. 10 is is a plot of hydrogen concentration as a function of phosphorous concentration of a glass-based article according to an embodiment.

The hydrogen concentration as a function of phosphorous concentration for a sample having composition A that was treated in a 200° C. environment at a pressure of 0.1 MPa is shown in FIG. 10. The data shown in FIG. 10 corresponds to a region extending to a depth of 4.5 µm from the surface of the glass article.

Figure 11:
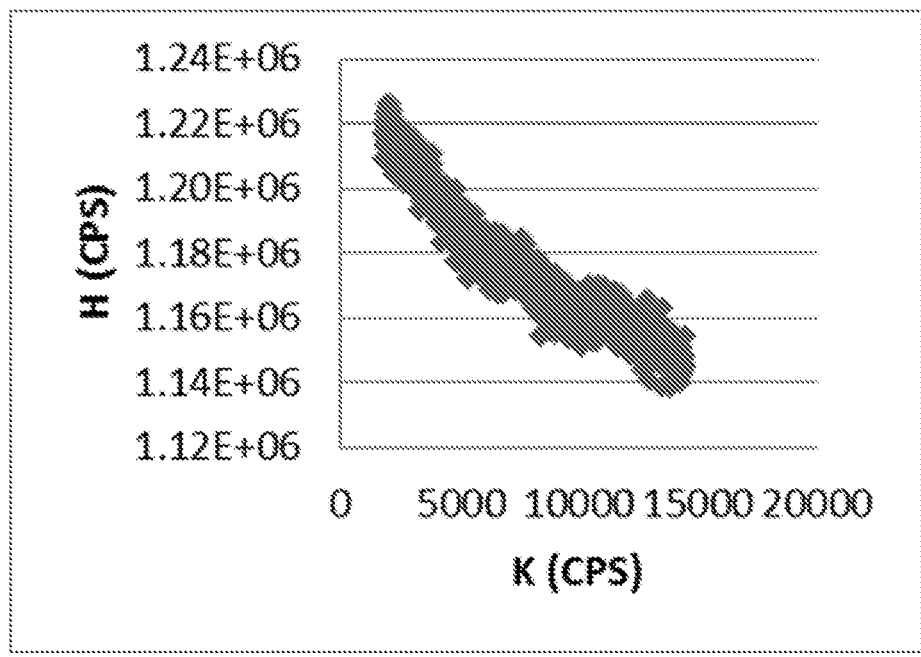
FIG. 11 is a plot of hydrogen concentration as a function of potassium concentration for the glass-based article of FIG. 10.
Figure 12:
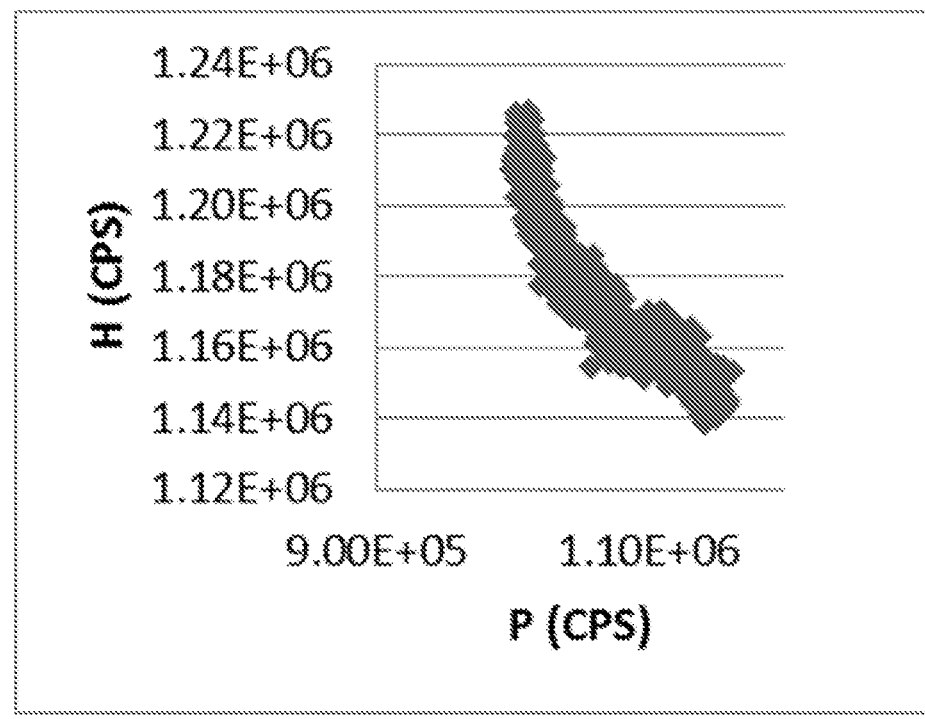
FIG. 12 is a plot of hydrogen concentration as a function of phosphorous concentration for the glass-based article of FIG. 10.

A sample having composition A was exposed to an environment at a temperature of 85° C. with a relative humidity of 85% for a time period of 60 days. The hydrogen concentration was then measured to a depth of 1 μm from the surface of the glass article as a function of the potassium concentration, shown in FIG. 11, and as a function of the phosphorous concentration, shown in FIG. 12.

Figure 13:
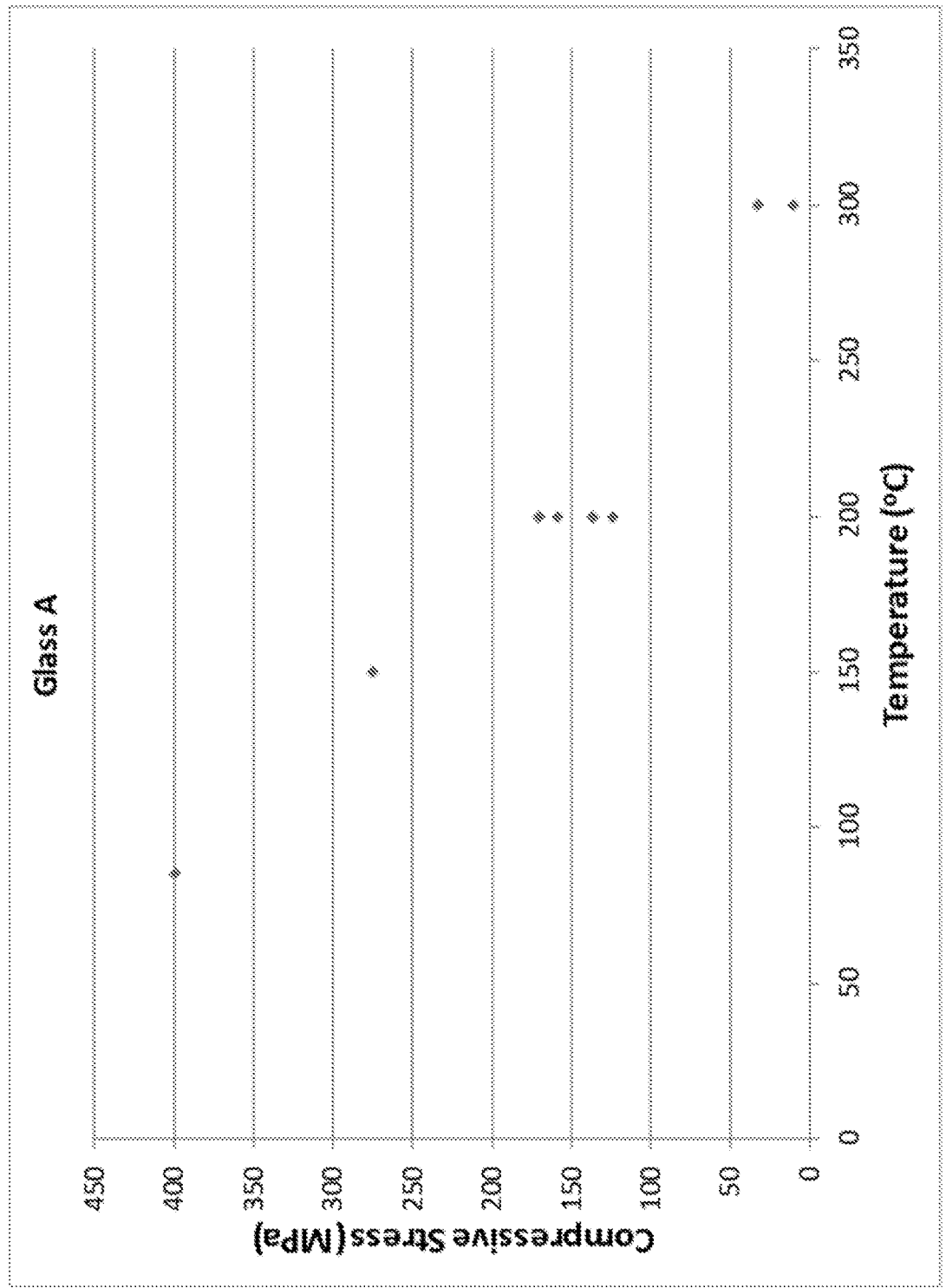
FIG. 13 is a plot of compressive stress as a function of water vapor treatment temperature for glass-based samples treated at a variety of temperatures.

A sample having composition A was exposed to environments with different temperatures at atmospheric pressure for the same time period and the resulting compressive stress was measured. The measured compressive stress is shown in FIG. 13 as a function of temperature, and indicates that increasing temperatures produce glass articles with decreased compressive stress values.

Samples having the compositions shown in Table III were exposed to water vapor containing environments in multiple steps to form glass articles having compressive stress layers. The sample composition and thickness as well as the environment the samples were exposed to, including the temperature, pressure, and exposure time are shown in Table V below. Each of the treatment environments were saturated with water vapor. The resulting maximum compressive stress and depth of compression as measured by surface stress meter (FSM) is also reported in Table V. If a compressive stress and depth of compression are not reported in Table V after step 1, the treatment was carried out continuously such that the sample was not removed from the furnace after the first step and the furnace was cooled to the desired second environment conditions.

TABLE V

| | | Glass Composition | | | | | | |
|---|---|---|---|---|---|---|---|---|
| | | A | | | | | B | |
| | Thickness (mm) | 1 | 1 | 1 | 1 | 1 | 1 | 1 |
| 1st step | Temperature (° C.) | 300 | 200 | 250 | 250 | 150 | 300 | 250 |
| | Pressure (MPa) | 0.1 | 0.1 | 0.6 | 0.6 | 0.5 | 0.1 | 0.6 |
| | Time (h) | 72 | 168 | 15 | 15 | 6 | 72 | 15 |
| | Compressive Stress (MPa) | 33 | 144 | | 203 | 311 | 63 | 201 |
| | Depth of Compression (microns) | 131 | 91 | | 80 | 18 | 48 | 16 |
| 2nd step | Temperature (° C.) | 200 | 150 | 150 | 150 | 150 | 200 | 150 |
| | Pressure (MPa) | 0.1 | 0.5 | 0.5 | 0.5 | 0.5 | 0.1 | 0.5 |
| | Time (h) | 168 | 6 | 6 | 6 | 6 | 168 | 6 |
| | Compressive Stress (MPa) | 131 | 351 | 209 | 176 | 271 | 138 | 208 |
| | Depth of Compression (microns) | 110 | 70 | 87 | 87 | 26 | 40 | 14 |
| 3rd step | Temperature (° C.) | | | | | | | 150 |
| | Pressure (MPa) | | | | | | | 0.5 |
| | Time (h) | | | | | | | 6 |
| | Compressive Stress (MPa) | | | | | | | 265 |
| | Depth of Compression (microns) | | | | | | | 15 |

| | | Glass Composition | | | | | |
|---|---|---|---|---|---|---|---|
| | | C | D | E | F | G | H |
| | Thickness (mm) | 1 | 1 | 1 | 1 | 1 | 1 |
| 1st step | Temperature (° C.) | 300 | 250 | 300 | 200 | 200 | 200 | 250 |
| | Pressure (MPa) | 0.1 | 0.6 | 0.1 | 0.1 | 0.1 | 0.1 | 0.1 |
| | Time (h) | 72 | 15 | 72 | 168 | 168 | 168 | 168 |
| | Compressive Stress (MPa) | 19 | 288 | 42 | 140 | 162 | 182 | 111 |
| | Depth of Compression (microns) | 94 | 28 | 187 | 92 | 100 | 72 | 115 |
| 2nd step | Temperature (° C.) | 200 | 150 | 200 | 150 | 150 | 150 | 150 |
| | Pressure (MPa) | 0.1 | 0.5 | 0.1 | 0.5 | 0.5 | 0.5 | 0.5 |
| | Time (h) | 168 | 6 | 168 | 6 | 6 | 6 | 6 |
| | Compressive Stress (MPa) | 79 | 295 | 118 | 339 | 378 | 424 | 386 |
| | Depth of Compression (microns) | 72 | 27 | 117 | 73 | 78 | 57 | 70 |
| 3rd step | Temperature (° C.) | | 150 | | | | | |
| | Pressure (MPa) | | 0.5 | | | | | |
| | Time (h) | | 6 | | | | | |

TABLE V-continued

|  |  |  |  |  |  |  |  |  |  |
|---|---|---|---|---|---|---|---|---|---|
|  | Compressive Stress (MPa) | 277 |  |  |  |  |  |  |  |
|  | Depth of Compression (microns) | 29 |  |  |  |  |  |  |  |

|  |  | Glass Composition |  |  |  |  |  |  |  |
|---|---|---|---|---|---|---|---|---|---|
|  |  | I |  |  |  | J | K |  |  |
|  | Thickness (mm) | 1 | 1 | 1 | 1 | 1 | 1 | 1 | 1 |
| 1st step | Temperature (° C.) | 250 | 250 | 250 | 250 | 250 | 250 | 250 | 250 |
|  | Pressure (MPa) | 0.1 | 0.6 | 1.2 | 0.6 | 0.1 | 4 | 0.6 | 1.1 |
|  | Time (h) | 168 | 15 | 15 | 15 | 168 | 15 | 15 | 15 |
|  | Compressive Stress (MPa) | 111 | 340 |  |  | 120 | 350 | 258 |  |
|  | Depth of Compression (microns) | 104 | 42 |  |  | 96 | 28 | 22 |  |
| 2nd step | Temperature (° C.) | 150 | 150 | 150 | 150 | 150 | 150 | 150 | 150 |
|  | Pressure (MPa) | 0.5 | 0.5 | 0.5 | 0.5 | 0.5 | 0.5 | 0.5 | 0.5 |
|  | Time (h) | 6 | 6 | 6 | 6 | 6 | 6 | 6 | 6 |
|  | Compressive Stress (MPa) | 370 | 347 | 323 | 327 | 358 | 357 | 407 | 337 |
|  | Depth of Compression (microns) | 66 | 42 | 37 | 43 | 64 | 28 | 19 | 17 |

|  |  | Glass Composition |  |  |  |  |  |  |
|---|---|---|---|---|---|---|---|---|
|  |  | L | M | S |  |  |  |  |
|  | Thickness (mm) | 1 | 1 | 1 | 1 | 1 | 1 | 1 |
| 1st step | Temperature (° C.) | 250 | 250 | 200 | 225 | 250 | 250 | 250 |
|  | Pressure (MPa) | 4 | 4 | 0.1 | 2.6 | 0.1 | 1.1 | 1.1 |
|  | Time (h) | 15 | 15 | 168 | 48 | 168 | 15 | 15 |
|  | Compressive Stress (MPa) | 347 | 344 | 129 | 187 | 81 |  |  |
|  | Depth of Compression (microns) | 23 | 20 | 62 | 75 | 106 |  |  |
| 2nd step | Temperature (° C.) | 150 | 150 | 150 | 150 | 150 | 150 | 150 |
|  | Pressure (MPa) | 0.5 | 0.5 | 0.5 | 0.5 | 0.5 | 0.5 | 0.5 |
|  | Time (h) | 6 | 6 | 6 | 6 | 6 | 6 | 6 |
|  | Compressive Stress (MPa) | 358 | 352 | 316 | 204 | 320 | 266 | 280 |
|  | Depth of Compression (microns) | 22 | 18 | 46 | 69 | 62 | 49 | 39 |

|  |  | Glass Composition S |  |  |  |  |  |
|---|---|---|---|---|---|---|---|
|  | Thickness (mm) | 1 | 1 | 1 | 1 | 1 | 1 |
| 1st step | Temperature (° C.) | 250 | 250 | 150 | 150 | 250 | 250 |
|  | Pressure (MPa) | 0.6 | 0.6 | 0.5 | 0.5 | 1.1 | 1.1 |
|  | Time (h) | 15 | 15 | 4 | 6 | 15 | 15 |
|  | Compressive Stress (MPa) |  | 297 | 369 | 361 | 263 | 277 |
|  | Depth of Compression (microns) |  | 42 | 8 | 10 | 48 | 45 |
| 2nd step | Temperature (° C.) | 150 | 150 | 150 | 150 | 150 | 125 |
|  | Pressure (MPa) | 0.5 | 0.5 | 0.5 | 0.5 | 0.5 | 0.23 |
|  | Time (h) | 6 | 6 | 5 | 6 | 6 | 6 |
|  | Compressive Stress (MPa) | 299 | 276 | 379 | 339 | 272 | 276 |
|  | Depth of Compression (microns) | 41 | 40 | 11 | 15 | 48 | 46 |

TABLE V-continued

| | | Glass Composition T | | | | | | |
|---|---|---|---|---|---|---|---|---|
| | Thickness (mm) | 1 | 1 | 1 | 1 | 1 | 1 | 1 |
| 1st step | Temperature (° C.) | 250 | 250 | 250 | 250 | 250 | 250 | 150 |
| | Pressure (MPa) | 0.1 | 4 | 1.1 | 1.1 | 0.6 | 0.6 | 0.5 |
| | Time (h) | 168 | 15 | 15 | 15 | 15 | 15 | 4 |
| | Compressive Stress (MPa) | 89 | 236 | | | | 256 | 345 |
| | Depth of Compression (microns) | 82 | 52 | | | | 34 | 7 |
| 2nd step | Temperature (° C.) | 150 | 150 | 150 | 150 | 150 | 150 | 150 |
| | Pressure (MPa) | 0.5 | 0.5 | 0.5 | 0.5 | 0.5 | 0.5 | 0.5 |
| | Time (h) | 6 | 6 | 6 | 6 | 6 | 6 | 5 |
| | Compressive Stress (MPa) | 317 | 241 | 271 | 292 | 255 | 265 | 334 |
| | Depth of Compression (microns) | 48 | 51 | 39 | 30 | 33 | 32 | 9 |

| | | Glass Composition | | | | | | |
|---|---|---|---|---|---|---|---|---|
| | | T | | | U | | | |
| | Thickness (mm) | 1 | 1 | 1 | 1 | 1 | 1 | 1 |
| 1st step | Temperature (° C.) | 150 | 250 | 250 | 200 | 250 | 250 | 250 |
| | Pressure (MPa) | 0.5 | 1.1 | 1.1 | 0.1 | 0.1 | 1.1 | 0.6 |
| | Time (h) | 6 | 15 | 15 | 168 | 168 | 15 | 15 |
| | Compressive Stress (MPa) | 297 | 270 | 268 | 130 | 83 | | |
| | Depth of Compression (microns) | 9 | 38 | 35 | 64 | 111 | | |
| 2nd step | Temperature (° C.) | 150 | 150 | 125 | 150 | 150 | 150 | 150 |
| | Pressure (MPa) | 0.5 | 0.5 | 0.23 | 0.5 | 0.5 | 0.5 | 0.5 |
| | Time (h) | 6 | 6 | 6 | 6 | 6 | 6 | 6 |
| | Compressive Stress (MPa) | 330 | 280 | 290 | 318 | 338 | 271 | 275 |
| | Depth of Compression (microns) | 12 | 37 | 35 | 48 | 67 | 54 | 45 |

| | | Glass Composition | | | | | | |
|---|---|---|---|---|---|---|---|---|
| | | U | | | V | | | |
| | Thickness (mm) | 1 | 1 | 1 | 1 | 1 | 1 | 1 |
| 1st step | Temperature (° C.) | 250 | 250 | 250 | 250 | 250 | 250 | 250 |
| | Pressure (MPa) | 0.6 | 1.1 | 1.1 | 0.1 | 0.1 | 4 | 1.1 |
| | Time (h) | 15 | 15 | 15 | 168 | 168 | 15 | 15 |
| | Compressive Stress (MPa) | 272 | 268 | 264 | 108 | 107 | 291 | |
| | Depth of Compression (microns) | 44 | 52 | 50 | 71 | 77 | 46 | |
| 2nd step | Temperature (° C.) | 150 | 150 | 125 | 150 | 150 | 150 | 150 |
| | Pressure (MPa) | 0.5 | 0.5 | 0.23 | 0.5 | 0.5 | 0.5 | 0.5 |
| | Time (h) | 6 | 6 | 6 | 6 | 6 | 6 | 6 |
| | Compressive Stress (MPa) | 279 | 259 | 273 | 327 | 344 | 302 | 325 |
| | Depth of Compression (microns) | 45 | 52 | 49 | 46 | 47 | 35 | 34 |

TABLE V-continued

| | | Glass Composition | | | | | | | |
|---|---|---|---|---|---|---|---|---|---|
| | | V | | | | W | | X | |
| | Thickness (mm) | 1 | 1 | 1 | 1 | 1 | 1 | 1 | 1 |
| 1st step | Temperature (° C.) | 250 | 250 | 250 | 250 | 250 | 200 | 250 | 200 |
| | Pressure (MPa) | 0.6 | 0.6 | 1.1 | 1.1 | 0.1 | 1.6 | 0.1 | 1.6 |
| | Time (h) | 15 | 15 | 15 | 15 | 168 | 6 | 168 | 6 |
| | Compressive Stress (MPa) | | 321 | 330 | 331 | 72 | 312 | 87 | 331 |
| | Depth of Compression (microns) | | 31 | 33 | 33 | 98 | 23 | 78 | 16 |
| 2nd step | Temperature (° C.) | 150 | 150 | 150 | 125 | 150 | 200 | 150 | 200 |
| | Pressure (MPa) | 0.5 | 0.5 | 0.5 | 0.23 | 0.5 | 1.6 | 0.5 | 1.6 |
| | Time (h) | 6 | 6 | 6 | 6 | 6 | 6 | 6 | 6 |
| | Compressive Stress (MPa) | 313 | 325 | 326 | 345 | 319 | 290 | 290 | 318 |
| | Depth of Compression (microns) | 31 | 30 | 33 | 31 | 46 | 29 | 48 | 21 |

| | | Glass Composition | | | | | | | | |
|---|---|---|---|---|---|---|---|---|---|---|
| | | Y | Z | | AA | CC | EE | FF | | |
| | Thickness (mm) | 1 | 1 | 1 | 1 | 1 | 1 | 1 | 1 | 1 |
| 1st step | Temperature (° C.) | 200 | 200 | 200 | 200 | 200 | 300 | 200 | 200 | 300 |
| | Pressure (MPa) | 0.1 | 0.1 | 1.6 | 0.1 | 1.6 | 2.6 | 0.1 | 1.6 | 2.6 |
| | Time (h) | 168 | 168 | 6 | 168 | 6 | 24 | 168 | 6 | 24 |
| | Compressive Stress (MPa) | 124 | 119 | 319 | 129 | 345 | 156 | 121 | 361 | 180 |
| | Depth of Compression (microns) | 69 | 68 | 24 | 63 | 16 | 62 | 36 | 13 | 63 |
| 2nd step | Temperature (° C.) | 150 | 150 | 200 | 150 | 200 | 200 | 200 | 200 | 200 |
| | Pressure (MPa) | 0.5 | 0.5 | 1.6 | 0.5 | 1.6 | 1.6 | 1.6 | 1.6 | 1.6 |
| | Time (h) | 6 | 6 | 6 | 6 | 6 | 4 | 6 | 6 | 4 |
| | Compressive Stress (MPa) | 306 | 312 | 310 | 350 | 350 | 163 | 317 | 324 | 168 |
| | Depth of Compression (microns) | 50 | 48 | 30 | 45 | 20 | 61 | 26 | 16 | 63 |

| | | Glass Composition | | | | | | | | |
|---|---|---|---|---|---|---|---|---|---|---|
| | | GG | HH | II | | CCC | DDD | EEE | FFF | GGG |
| | Thickness (mm) | 1 | 1 | 0.7 | 0.7 | 1 | 1 | 1 | 1 | 1 |
| 1st step | Temperature (° C.) | 300 | 300 | 200 | 200 | 200 | 200 | 200 | 200 | 200 |
| | Pressure (MPa) | 2.6 | 2.6 | 0.1 | 1.6 | 0.1 | 0.1 | 0.1 | 0.1 | 0.1 |
| | Time (h) | 24 | 24 | 168 | 6 | 168 | 168 | 168 | 168 | 168 |
| | Compressive Stress (MPa) | 194 | 159 | 147 | 379 | 151 | 153 | 153 | 166 | 156 |
| | Depth of Compression (microns) | 58 | 49 | 23 | 8 | 78 | 80 | 75 | 67 | 68 |
| 2nd step | Temperature (° C.) | 200 | 200 | 200 | 200 | 150 | 150 | 150 | 150 | 150 |
| | Pressure (MPa) | 1.6 | 1.6 | 1.6 | 1.6 | 0.5 | 0.5 | 0.5 | 0.5 | 0.5 |
| | Time (h) | 4 | 4 | 6 | 6 | 6 | 6 | 6 | 6 | 6 |
| | Compressive Stress (MPa) | 197 | 173 | 332 | 392 | 340 | 341 | 354 | 387 | 400 |
| | Depth of Compression (microns) | 60 | 48 | 19 | 10 | 57 | 57 | 55 | 50 | 50 |

TABLE V-continued

|  |  | Glass Composition | | | | |
|---|---|---|---|---|---|---|
|  |  | HHH | III | JJJ | KKK | |
|  | Thickness (mm) | 1 | 1 | 1 | 1 | 1 |
| 1st step | Temperature (° C.) | 200 | 200 | 200 | 200 | 150 |
|  | Pressure (MPa) | 0.1 | 0.1 | 0.1 | 0.1 | 0.5 |
|  | Time (h) | 168 | 168 | 168 | 168 | 6 |
|  | Compressive Stress (MPa) | 155 | 123 | 134 | 127 | 354 |
|  | Depth of Compression (microns) | 72 | 56 | 55 | 53 | 8 |
| 2nd step | Temperature (° C.) | 150 | 150 | 150 | 150 | 150 |
|  | Pressure (MPa) | 0.5 | 0.5 | 0.5 | 0.5 | 0.5 |
|  | Time (h) | 6 | 1.5 | 1.5 | 6 | 1.5 |
|  | Compressive Stress (MPa) | 394 | 288 | 290 | 319 | 301 |
|  | Depth of Compression (microns) | 50 | 41 | 44 | 42 | 12 |

|  |  | Glass Composition | | | | | | |
|---|---|---|---|---|---|---|---|---|
|  |  | LLL | | | MMM | | | NNN |
|  | Thickness (mm) | 1 | 1 | 1 | 1 | 1 | 1 | 1 |
| 1st step | Temperature (° C.) | 200 | 250 | 250 | 200 | 250 | 150 | 200 |
|  | Pressure (MPa) | 0.1 | 0.6 | 1.1 | 0.1 | 0.6 | 0.5 | 0.1 |
|  | Time (h) | 168 | 15 | 15 | 168 | 15 | 6 | 168 |
|  | Compressive Stress (MPa) | 136 | | | 140 | 256 | 271 | 139 |
|  | Depth of Compression (microns) | 48 | | | 49 | 36 | 7 | 46 |
| 2nd step | Temperature (° C.) | 150 | 150 | 150 | 150 | 150 | 150 | 150 |
|  | Pressure (MPa) | 0.5 | 0.5 | 0.4 | 0.5 | 0.5 | 0.5 | 0.5 |
|  | Time (h) | 1.5 | 6 | 6 | 1.5 | 6 | 6 | 1.5 |
|  | Compressive Stress (MPa) | 312 | 237 | 230 | 310 | 249 | 341 | 275 |
|  | Depth of Compression (microns) | 37 | 34 | 31 | 48 | 34 | 12 | 38 |

|  |  | Glass Composition XXX | | | | | |
|---|---|---|---|---|---|---|---|
|  | Thickness (mm) | 1 | 1 | 1 | 1 | 1 | 1 |
| 1st step | Temperature (° C.) | 200 | 200 | 200 | 300 | 300 | 300 |
|  | Pressure (MPa) | 0.1 | 0.1 | 0.1 | 0.1 | 0.1 | 0.1 |
|  | Time (h) | 168 | 168 | 168 | 168 | 168 | 168 |
|  | Compressive Stress (MPa) | 126 | 125 | 129 | 36 | 49 | 44 |
|  | Depth of Compression (microns) | 57 | 59 | 57 | 113 | 110 | 109 |
| 2nd step | Temperature (° C.) | 200 | 200 | 200 | 200 | 200 | 200 |
|  | Pressure (MPa) | 1.6 | 1.6 | 1.6 | 1.6 | 1.6 | 1.6 |
|  | Time (h) | 4 | 9 | 16 | 4 | 9 | 16 |
|  | Compressive Stress (MPa) | 308 | 305 | 275 | 307 | 320 | 312 |
|  | Depth of Compression (microns) | 45 | 48 | 49 | 50 | 74 | 54 |

TABLE V-continued

| | | Glass Composition XXX | | |
|---|---|---|---|---|
| | Thickness (mm) | 1 | 1 | 1 |
| 1st step | Temperature (° C.) | 200 | 200 | 200 |
| | Pressure (MPa) | 0.2 | 0.2 | 0.2 |
| | Time (h) | 168 | 168 | 168 |
| | Compressive Stress (MPa) | 231 | 235 | 236 |
| | Depth of Compression (microns) | 44 | 44 | 44 |
| 2nd step | Temperature (° C.) | 200 | 200 | 200 |
| | Pressure (MPa) | 1.6 | 1.6 | 1.6 |
| | Time (h) | 4 | 9 | 16 |
| | Compressive Stress (MPa) | 296 | 284 | 236 |
| | Depth of Compression (microns) | 42 | 44 | 44 |

Figure 14:
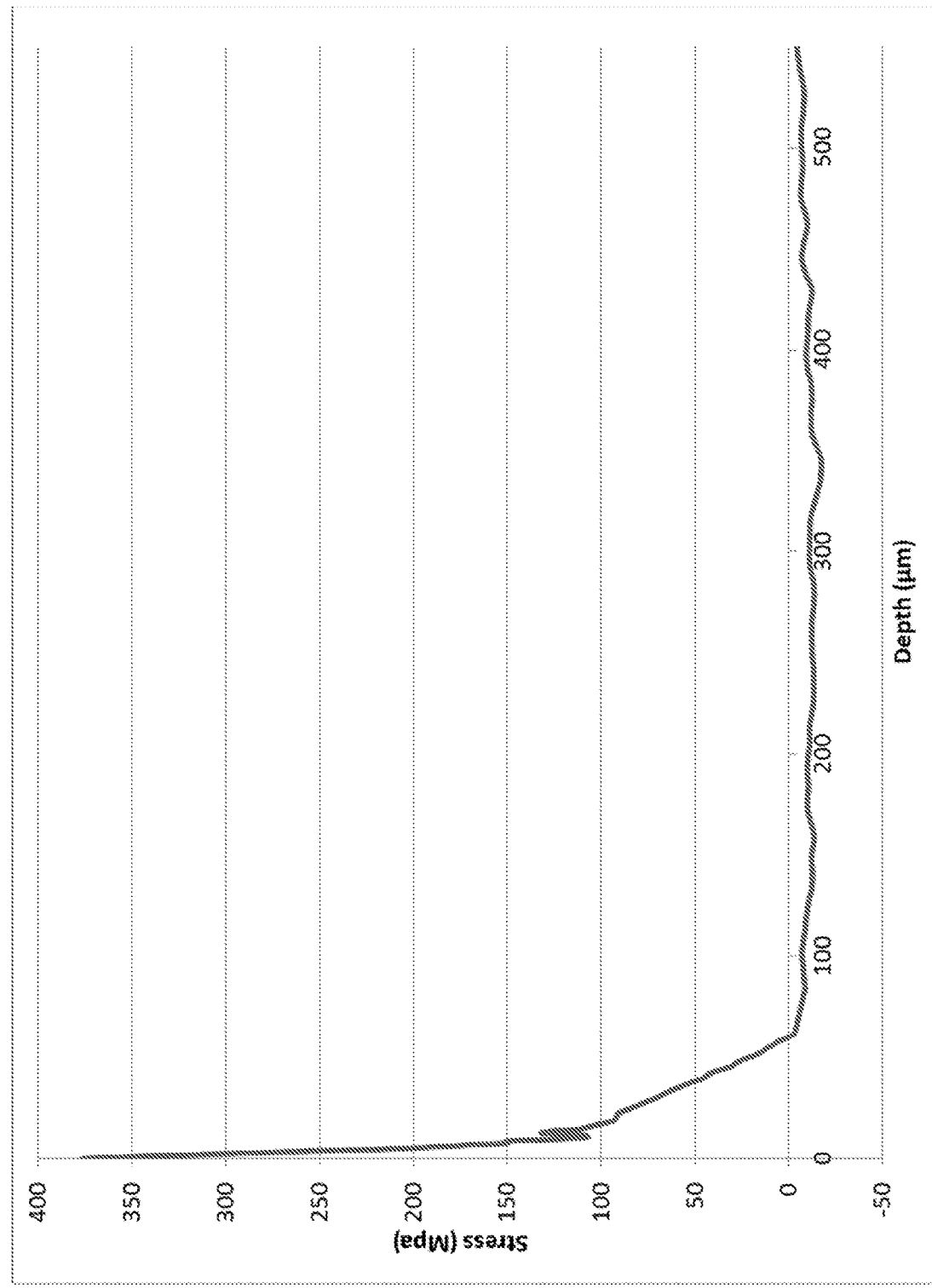
FIG. 14 is a stress profile of a glass-based article according to an environment.

A sample with composition GGG and 1.1 mm thickness was exposed to a two-step water vapor treatment. The sample was exposed to a first environment having a temperature of 200° C. at ambient pressure for 7 days. After this first step the glass article had a compressive stress of 156 MPa and a depth of compression of 68 μm. The glass article was then exposed to a second environment having a temperature of 150° C. at a pressure of 0.5 MPa for 6 hours. The resulting glass article had a compressive stress of 400 MPa and a depth of compression measured as 50 μm. The stress profile of the glass article was determined by combining measurements from RNF, FSM, and SCALP techniques to produce the stress as a function of depth profile shown in FIG. 14. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The profile shown in FIG. 14 produced by combining information from the FSM, SCALP, and RNF measurements has a depth of compression of 62.7 μm, indicating that the FSM measurement of the DOC after the second treatment step may not be accurate.

A sample of composition A was exposed to a water vapor containing environment at 200° C. for 168 hours under atmospheric pressure and saturated steam conditions. The resulting glass article had a compressive stress of 137 MPa and a depth of compression of 99 μm. The glass article was then held in a 0% relative humidity environment at 85° C. for 30 days, and the compressive stress and depth of compression were remeasured. The compressive stress and depth of compression did not change after aging in the dry environment, indicating that the compressive stress profile imparted by the water vapor treatment is not temporary or subject to "dehydration" under normal conditions.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A glass, comprising:
   greater than or equal to 47 mol % to less than or equal to 70 mol % $SiO_2$;
   greater than or equal to 5 mol % to less than or equal to 17 mol % $Al_2O_3$;
   greater than or equal to 4 mol % to less than or equal to 15 mol % $P_2O_5$; and
   greater than 12 mol % to less than or equal to 23 mol % $K_2O$.

2. The glass of claim 1, wherein the $SiO_2$ is from greater than or equal to 52 mol % to less than or equal to 65 mol %.

3. The glass of claim 2, wherein the $SiO_2$ is from greater than or equal to 55 mol % to less than or equal to 62 mol %.

4. The glass of claim 2, wherein the $Al_2O_3$ in from greater than or equal to 7 mol % to less than or equal to 16 mol %.

5. The glass of claim 1, wherein the $Al_2O_3$ in from greater than or equal to 8 mol % to less than or equal to 15 mol %.

6. The glass of claim 1, wherein the $P_2O_5$ is less than 14 mol %.

7. The glass of claim 1, wherein the $P_2O_5$ is less than 12 mol %.

8. The glass of claim 1, wherein the $P_2O_5$ is less than 10 mol %.

9. The glass of claim 1, wherein the $K_2O$ is less than 18 mol %.

10. The glass of claim 1, wherein the $K_2O$ is less than 14 mol %.

11. The glass of claim 1, further comprising greater than 0 mol % to less than 19 mol % $Na_2O$.

12. The glass of claim 11, wherein the $Na_2O$ is less than 15 mol %.

13. The glass of claim 11, wherein the $Na_2O$ is greater than 5 mol %.

14. The glass of claim 11, wherein the $Na_2O$ is greater than 8 mol %.

15. The glass of claim 1, further comprising
greater than or equal to 0 mol % to less than or equal to 5 mol $Li_2O$;
greater than or equal to 0 mol % to less than or equal to 2 mol % $Rb_2O$; and
greater than or equal to 0 mol % to less than or equal to 10 mol % $Cs_2O$.

16. The glass of claim 1, wherein the glass is substantially free of $Li_2O$ such that $Li_2O$ is optionally present in very small amounts but where $Li_2O$, if present, is in amounts of less than 0.1 mol %.

17. The glass of claim 1, wherein the glass is substantially free of $Li_2O$, $Na_2O$, $Cs_2O$ and $Rb_2O$.

18. A glass, comprising:
greater than or equal to 47 mol % to less than or equal to 70 mol % $SiO_2$;
greater than or equal to 2.5 mol % to less than or equal to 17 mol % $Al_2O_3$;
greater than or equal to 4 mol % to less than or equal to 15 mol % $P_2O_5$; and
greater than 12 mol % to less than or equal to 23 mol % $K_2O$.

19. The glass of claim 18, wherein the glass is substantially free of $Li_2O$, $Na_2O$, $Cs_2O$ and $Rb_2O$.

20. A glass, comprising:
greater than or equal to 52 mol % to less than or equal to 65 mol % $SiO_2$;
greater than or equal to 11 mol % to less than or equal to 17 mol % $Al_2O_3$;
greater than or equal to 4 mol % to less than or equal to 12 mol % $P_2O_5$; and
greater than or equal to 4.5 mol % to less than or equal to 14 mol % $K_2O$.

21. A glass, comprising:
greater than or equal to 50 mol % to less than or equal to 67 mol % $SiO_2$;
greater than or equal to 11 mol % to less than or equal to 17 mol % $Al_2O_3$;
greater than or equal to 4 mol % to less than or equal to 12 mol % $P_2O_5$;
greater than 5 mol % to less than or equal to 23 mol % $K_2O$; and
greater than 5 mol % to less than or equal to 19 mol % $Na_2O$.

22. A glass, comprising:
greater than or equal to 52 mol % to less than or equal to 65 mol % $SiO_2$;
greater than or equal to 11 mol % to less than or equal to 17 mol % $Al_2O_3$;
greater than or equal to 4 mol % to less than or equal to 15 mol % $P_2O_5$;
greater than or equal to 4.5 mol % to less than or equal to 23 mol % $K_2O$; and
greater than 0 mol % to less than or equal to 19 mol % $Na_2O$.

23. The glass of claim 22, wherein the $K_2O$ is greater than 5 mol %.

24. The glass of claim 23, wherein the $Na_2O$ is greater than 5 mol %.

25. A glass, comprising:
greater than or equal to 52 mol % to less than or equal to 65 mol % $SiO_2$;
greater than or equal to 5 mol % to less than or equal to 17 mol % $Al_2O_3$;
greater than or equal to 4 mol % to less than or equal to 12 mol % $P_2O_5$; and
greater than 12 mol % to less than or equal to 23 mol % $K_2O$.

26. The glass of claim 25, wherein the $K_2O$ is greater than 13 mol %.

* * * * *

UNITED STATES PATENT AND TRADEMARK OFFICE
CERTIFICATE OF CORRECTION

PATENT NO. : 11,767,258 B2
APPLICATION NO. : 16/682063
DATED : September 26, 2023
INVENTOR(S) : Timothy Michael Gross et al.

It is certified that error appears in the above-identified patent and that said Letters Patent is hereby corrected as shown below:

On the Title Page

Column 2, under item [56], "Other Publications", Lines 9-10, delete "soda-soda-lime-silicate glass"," and insert -- soda-lime-silicate glass", --.

On the page 2, in Column 2, under item [56], "Other Publications", Line 13, delete "Blasses"," and insert -- Glasses", --.

On the page 2, in Column 2, under item [56], "Other Publications", Line 23, delete "Phsyics" and insert -- Physics --.

On the page 2, in Column 2, under item [56], "Other Publications", Line 28, delete "Infared" and insert -- Infrared --.

On the page 3, in Column 1, under item [56], "Other Publications", Line 2, delete "350" and insert -- 650 --.

In the Claims

In Column 60, Line 60, in Claim 5, delete "$Al_2O_3$in" and insert -- $Al_2O_3$ in --.

In Column 61, Line 15, in Claim 15, delete "mol" and insert -- mol % --.

Signed and Sealed this
Seventeenth Day of December, 2024

Derrick Brent
*Acting Director of the United States Patent and Trademark Office*